United States Patent
Baba et al.

(10) Patent No.: US 11,837,881 B2
(45) Date of Patent: Dec. 5, 2023

(54) AERIAL MOVING BODY AND WIRELESS POWER TRANSMISSION SYSTEM

(71) Applicant: Mitsubishi Electric Corporation, Tokyo (JP)

(72) Inventors: Kensuke Baba, Tokyo (JP); Yukihiro Homma, Tokyo (JP); Shota Narasaki, Tokyo (JP); Noboru Kawaguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/020,653

(22) PCT Filed: Aug. 18, 2021

(86) PCT No.: PCT/JP2021/030118
§ 371 (c)(1),
(2) Date: Feb. 10, 2023

(87) PCT Pub. No.: WO2022/039181
PCT Pub. Date: Feb. 24, 2022

(65) Prior Publication Data
US 2023/0307958 A1   Sep. 28, 2023

(30) Foreign Application Priority Data
Aug. 18, 2020  (JP) .................................. 2020-137752

(51) Int. Cl.
*H02J 50/20* (2016.01)
*B64D 27/24* (2006.01)
(Continued)

(52) U.S. Cl.
CPC .............. *H02J 50/20* (2016.02); *B60L 50/52* (2019.02); *B64C 27/08* (2013.01); *B64D 27/24* (2013.01);
(Continued)

(58) Field of Classification Search
CPC . B64U 50/35; H02J 50/20; H02J 50/27; H02J 50/005
See application file for complete search history.

(56) References Cited

U.S. PATENT DOCUMENTS 11,476,714 B2 * 10/2022 Arnstein .............. H01Q 21/061
2012/0150364 A1    6/2012 Tillotson et al.
(Continued)

FOREIGN PATENT DOCUMENTS

EP      3996245 A1 *  5/2022
JP      2007-22382 A   2/2007
(Continued)

OTHER PUBLICATIONS

International Search Report and Written Opinion dated Nov. 9, 2021, received for PCT Application PCT/JP2021/030118, filed on Aug. 18, 2021, 14 pages including English Translation.
(Continued)

*Primary Examiner* — Christopher P Ellis
(74) *Attorney, Agent, or Firm* — XSENSUS LLP

(57) ABSTRACT

A flying mobile body 4 includes: a rotary blade to rotate to generate lift; an airframe in which the rotary blade is provided; a power reception antenna to include a power reception surface that receives a radio wave transmitting electric power, the power reception surface having an area larger than an area projecting the airframe onto a rotation axis perpendicular plane that is a plane perpendicular to a rotation axis direction that is a direction parallel to a rotation axis of the rotary blade, and a drag reducing structure that reduces a drag generated with respect to a descending airflow generated by rotation of the rotary blade: a converter to convert electric power of the radio wave received by the
(Continued)

power reception antenna into DC electric power; a storage battery; and an electric motor to generate power rotating the rotary blade.

27 Claims, 50 Drawing Sheets

(51) Int. Cl.
    *B64C 27/08*     (2023.01)
    *B64U 50/35*     (2023.01)
    *B60L 50/52*     (2019.01)
    *H02J 50/00*     (2016.01)

(52) U.S. Cl.
    CPC ............ *B64U 50/35* (2023.01); *H02J 50/005* (2020.01); *B60L 2200/10* (2013.01)

(56) References Cited

U.S. PATENT DOCUMENTS

| | | | |
|---|---|---|---|
| 2019/0173324 A1 | 6/2019 | Arnitz et al. | |
| 2020/0106306 A1* | 4/2020 | Logan | B60L 1/00 |
| 2020/0177029 A1 | 6/2020 | Homma | |
| 2023/0006478 A1* | 1/2023 | Scott | H02J 50/23 |
| 2023/0026315 A1* | 1/2023 | Shrivastava | H01Q 3/22 |
| 2023/0102869 A1* | 3/2023 | Scott | H04W 76/10 370/311 |

FOREIGN PATENT DOCUMENTS

| | | | |
|---|---|---|---|
| JP | 2014-500827 A | | 1/2014 |
| JP | 2015-208157 A | | 11/2015 |
| JP | 6551617 B2 | * | 7/2019 |
| JP | 2020-80635 A | | 5/2020 |
| JP | 6692566 B1 | | 5/2020 |
| JP | 7136387 B2 | * | 9/2022 |
| KR | 20180066412 A | * | 2/2017 |
| WO | 2012/078232 A1 | | 6/2012 |
| WO | WO-2018220996 A1 | * | 12/2018 |

OTHER PUBLICATIONS

"Cross-ministerial Strategic Innovation Promotion Program", Administrative Policy Controller of the cabinet office (in charge of science and technology and innovation), Oct. 2019, 4 pages including English Translation.

Sakata et al., "CFD Simulation around UAV when Hovering and Direct Advance", The 30th Computational Fluid Dynamics Symposium, 2016, pp. 1-2 (5 pages including English Translation).

Masaki Shinohara, "Solar Power Satellite/Station", The Institute of Electronics, Information and Communication Engineers (IEICE), published by Ohmsha, Ltd., Jul. 25, 2012, 5 pages including English Translation.

Notice of Reasons for Refusal dated May 24, 2022, received for JP Application 2022-521374, 6 pages including English Translation.

Decision to Grant dated Aug. 2, 2022, received for JP Application 2022-521374, 5 pages including English Translation.

* cited by examiner (A)　　　　　　　　　　(B)

AERIAL MOVING BODY AND WIRELESS POWER TRANSMISSION SYSTEM

CROSS-REFERENCE TO RELATED APPLICATION

The present application is based on PCT filing PCT/JP2021/030118, filed Aug. 18, 2021, which claims priority from JP 2020-137752, Aug. 18, 2020, the entire contents of each are incorporated herein by reference.

TECHNICAL FIELD

The present disclosure relates to an aerial moving body to which electric power is transmitted wirelessly by a radio wave, and a wireless power transmission system that transmits electric power wirelessly to the aerial moving body.

BACKGROUND ART

A wireless power transmission (WPT) system that transmits the electric power wirelessly to an aerial moving body such as a drone has been developed. As used herein, the drone is a generic term for an unmanned aircraft that can fly (move in air) by remote control or automatic control. Use of the drone to which the electric power is transmitted wirelessly is expected to be used for long-time continuous inspection and monitoring of bridges, factories, power systems, and the like (see, for example, NPL 1). It is expected that the drone to which the electric power is transmitted wirelessly implements fundamental innovation of a maintenance technology of a social infrastructure and contributes to a significant reduction in labor related to maintenance.

An unmanned aerial vehicle (UAV) is a type of drone. A technique for feeding beam power wirelessly to an unmanned vehicle including the UAV has been developed (see, for example, PTL 1).

A technique for numerically simulating a three-dimensional airflow around the UAV flying with a plurality of sets of rotors has been developed (see, for example, NPL 2).

Theoretical study of electric power transmission efficiency in wireless power transmission is a well-known technique (see, for example, NPL3).

CITATION LIST

Patent Literature

PTL 1: Japanese Patent Laid-Open No. 2014-500827

Non Patent Literatures

NPL 1: Administrative Policy Controller of the cabinet office (in charge of science and technology and innovation), "Cross-ministerial Strategic Innovation Promotion Program", October, 2019, P63

NPL 2: Sakata et al., "CFD Simulation around UAV when Hovering and Direct Advance", The 30th Computational Fluid Dynamics Symposium, 2016

NPL 3: Masaki Shinohara, Supervised, edited by The Institute of Electronics, Information and Communication Engineers (IEICE), "Solar Power Satellite/Station", published by Ohmsha, Ltd., Jul. 25, 2012, P118.

SUMMARY OF INVENTION

Technical Problem

In the drone (aerial moving body) that generates lift by an electric motor, when energy is not supplied during flight, an upper limit of a possible continuous flight time is determined by a capacity of a battery (storage battery) mounted on the drone. The continuous flight time is a time while the aerial moving body can fly continuously without landing. Battery capacity and weight are approximately proportional, and as the weight increases, the electric power required for the flight increases. Accordingly, it is difficult to increase the continuous flight time only by increasing the battery capacity. In order to increase the continuous flight time, it is expected that a technique for supplying the electric power to the aerial moving body during the flight using wireless power transmission. A power reception device mounted on the aerial moving body has a constraint that the power reception device is disposed so as to reduce drag caused by a descending airflow without disturbing the descending airflow that makes the aerial moving body to float. Consequently, the aerial moving body includes the small power reception device at a position that does not obstruct the descending airflow.

An object of the present disclosure is to obtain an aerial moving body in which an opening area of a power reception antenna can be made larger than a conventional one.

Solution to Problem

An aerial moving body according to the present disclosure includes: a rotary blade to generate lift by rotating; an airframe on which the rotary blade is provided; a power reception antenna including a power reception surface to receive a radio wave transmitting electric power, the power reception surface having an area larger than an area projecting the airframe onto a rotation axis perpendicular plane, the rotation axis perpendicular plane being a plane perpendicular to a rotation axis direction, the rotation axis direction being a direction parallel to a rotation axis of the rotary blade, and a drag reducing structure to reduce a drag caused by a descending airflow generated by rotation of the rotary blade: a converter to convert electric power of the radio wave received by the power reception antenna into DC electric power; a storage battery to store the DC electric power, and an electric motor to which the DC electric power converted by the converter or the DC electric power stored in the storage battery is supplied, and to generate power to rotate the rotary blade.

Advantageous Effects of Invention

According to the aerial moving body of the present disclosure, the opening area of the power reception antenna can be made larger than a conventional one.

DESCRIPTION OF EMBODIMENTS

First Embodiment

Figure 4:
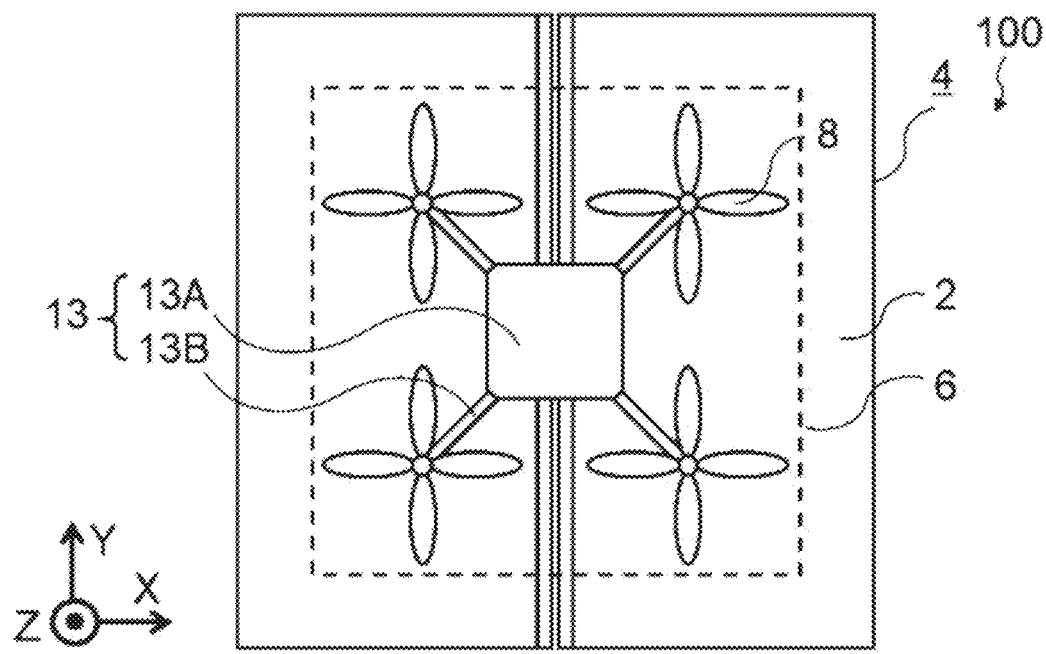
FIG. 4 is a plan view illustrating the configuration of the power transmission system to the aerial moving body according to the first embodiment.
Figure 5:
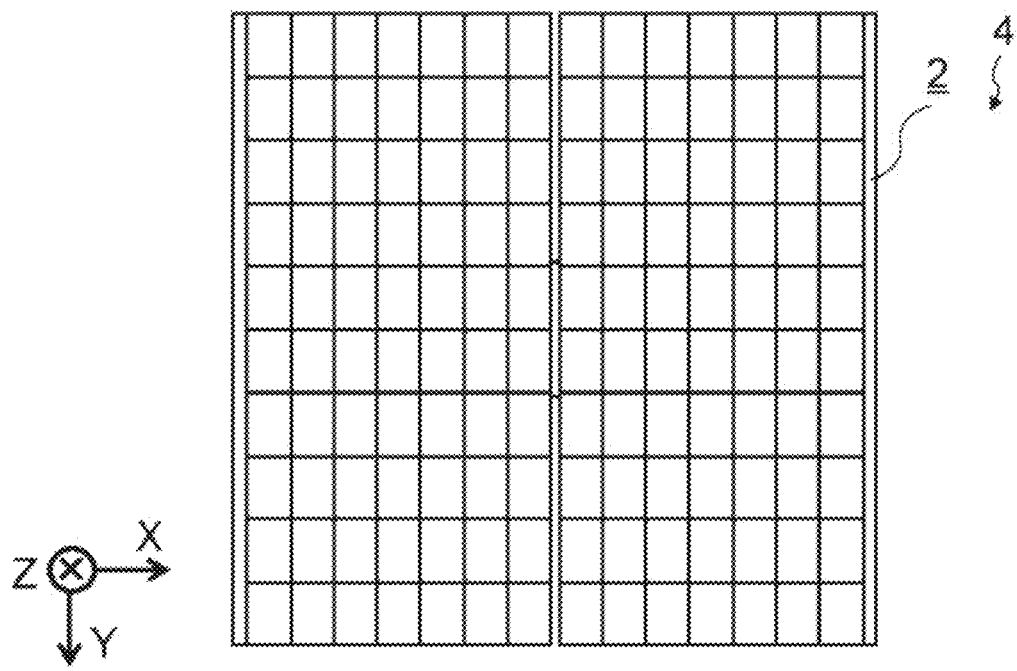
FIG. 5 is a bottom view illustrating the aerial moving body to which power is transmitted by the power transmission system to the aerial moving body according to the first embodiment.
Figure 6:
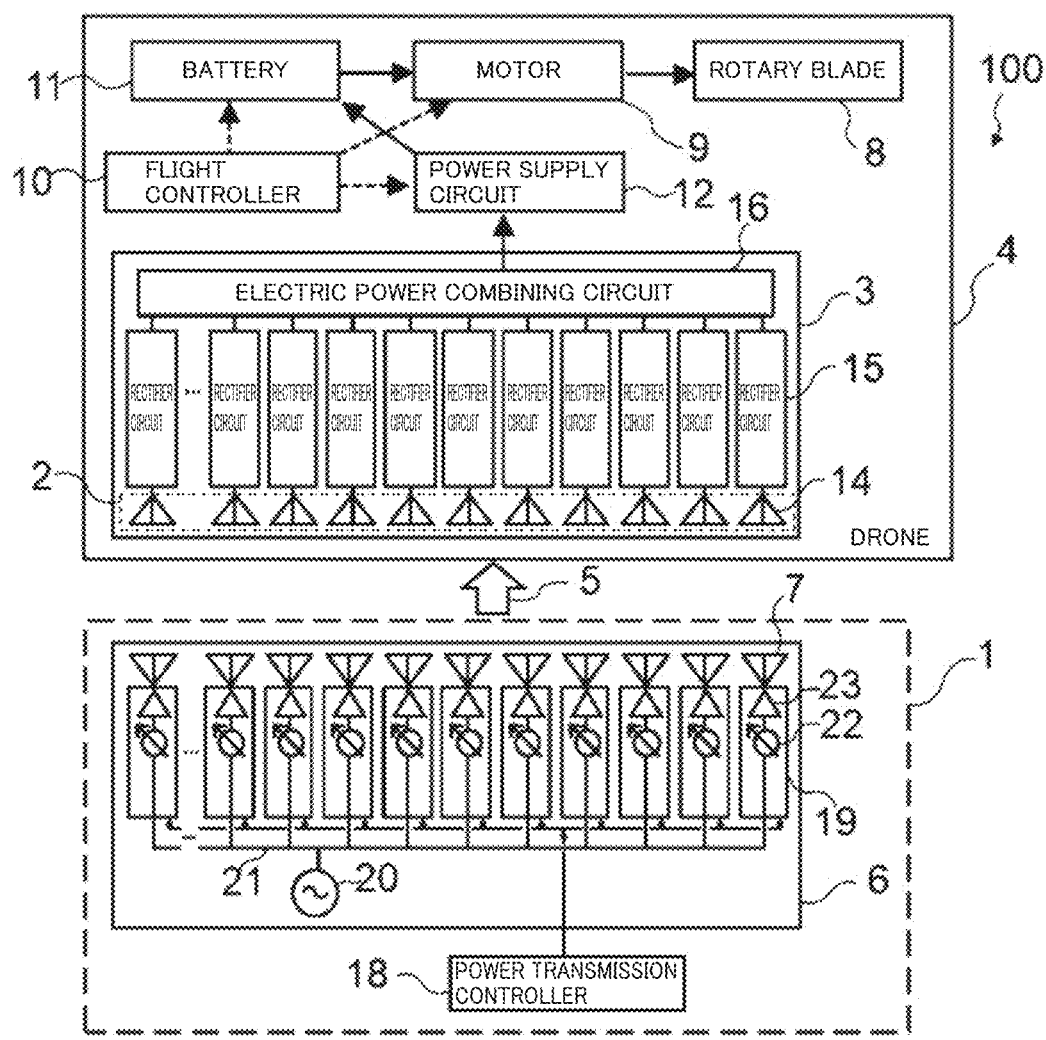
FIG. 6 is a block diagram illustrating a functional configuration of the power transmission system to the aerial moving body according to the first embodiment.

With reference to FIGS. 1 to 6, a configuration of a power transmission system to an aerial moving body according to a first embodiment is described. FIGS. 1 to 4 are a perspective view, a front view, a side view, and a plan view illustrating the configuration of the power transmission system to the aerial moving body according to the first embodiment. FIG. 5 is a bottom view illustrating the aerial moving body to which power is transmitted. FIG. 6 is a block diagram illustrating a functional configuration of the power transmission system to the aerial moving body according to the first embodiment. The aerial moving body includes a helicopter (rotary wing aircraft), a drone, an unmanned aircraft, and an unmanned aerial vehicle (UAV), and is an object that moves in the air leaving from the ground, the water surface, and the like.

A wireless power transmission system 100 includes mainly a power transmission device 1 (illustrated in FIG. 6) and a drone 4. A power reception device 3 (illustrated in FIG. 6) including power reception antenna 2 is mounted on drone 4. Power transmission device 1 radiates a power transmission radio wave 5 in a sky direction of power transmission device 1. Power transmission radio wave 5 is a radio wave radiated to transmit the electric power. Drone 4 is an aerial moving body that is a power transmission target to which the electric power is transmitted. Power transmission device 1 is installed such that an opening surface of power transmission antenna 6 is directed to a zenith. FIGS. 1 to 4 illustrate the case where drone 4 is present in a space right above power transmission antenna 6. Power transmission device 1 is installed on the ground. In some cases, power transmission device 1 is installed on a tower or the like based on a sea floor. In the case of being installed on the ground and a water surface (sea floor), the case of being installed on a building, a structure, or the like provided on the ground or the water surface (sea floor) is referred to as being installed on the ground. Power transmission radio wave 5 is radiated as a power transmission beam having a determined half-value width in a determined radiation direction from power transmission antenna 6. The radiation direction can be changed to an angle $\theta_0$ (for example, $\theta_0$=about 30 degrees) with respect to the front direction of power transmission antenna 6. The front direction of power transmission antenna 6 is a direction of a normal line of the opening surface that is a plane. The power transmission direction is a direction in which power transmission radio wave 5 (power transmission beam) is radiated. In power transmission antenna 6, a direction in which power transmission radio wave 5 is radiated is also referred to as an orientation direction of power transmission antenna 6. The front direction of power transmission antenna 6 is also referred to as a reference orientation direction. Power transmission antenna 6 can change the orientation direction in a determined direction range including the front direction.

Power transmission antenna 6 is a phased array antenna. Power transmission antenna 6 is configured by arranging a plurality of element power transmission antennas 7 in a matrix shape. As illustrated in FIG. 5, the opening surface of power transmission antenna 6 is drawn with lines that divide the regions of element power transmission antenna 7. In power transmission antenna 6 shown in FIG. 5, one element power transmission antenna 7 exists in one rectangular region. Element power transmission antenna 7 is directed to the front direction of power transmission antenna 6. Element power transmission antenna 7 is also referred to as an element antenna.

Drone 4 includes power reception device 3, a plurality of sets of rotary blades 8, a motor 9, a flight controller 10, a battery 11, a power supply circuit 12, and an airframe 13. Motor 9 is provided for each set of rotary blades 8. Power reception device 3 includes power reception antenna 2, a rectifier circuit 15, and an electric power combining circuit 16. Power reception antenna 2 includes a plurality of element power reception antennas 14. Rectifier circuit 15 is provided for each element power reception antenna 14. Element power reception antenna 14 receives power transmission radio wave 5, and generates AC electric power according to energy of power transmission radio wave 5. Rectifier circuit 15 converts AC electric power generated by element power reception antenna 14 into DC electric power. Rectifier circuit 15 is disposed right near a rear surface side of element power reception antenna 14. The rear surface of element power reception antenna 14 is a surface that is not the opening surface. Element power reception antenna 14 is also referred to as an element antenna.

Rectifier circuit 15 is a converter that converts the electric power of transmission radio wave 5 received by power reception antenna 2 into DC electric power. Electric power combining circuit 16 combines the DC electric power outputted from a plurality of rectifier circuits 15. In power reception device 3, rectifier circuit 15 converts the AC electric power into the DC electric power, and electric power combining circuit 16 outputs the combined DC electric power. The DC electric power outputted from power reception device 3 is supplied to motor 9 or stored in battery 11 through power supply circuit 12. Battery 11 is a storage battery that stores the DC electric power to be supplied to motor 9. Power supply circuit 12 supplies the electric power stored in battery 11 to motor 9. Power supply circuit 12 supplies the electric power required by motor 9 to motor 9, and controls charge and discharge of battery 11. The DC electric power converted by rectifier circuit 15 or the DC electric power stored in battery 11 is supplied to motor 9.

Airframe 13 includes a main body 13A and a wing support 13B. Main body 13A has a substantially rectangular parallelepiped outer shape. Main body 13A has a substantially square upper surface and a substantially square bottom surface. Main body 13A is equipped with flight controller 10, battery 11, and power supply circuit 12. Power reception device 3 is connected to a lower side of main body 13A. A connection angle between main body 13A and power reception device 3 is fixed. The connection angle between Power reception device 3 and main body 13A may be configured to be able to change such that power reception device 3 hangs down in the vertical direction even when main body 13A is inclined. Wing support 13B is a rod-shaped member extending from main body 13A in parallel with the upper surface and the bottom surface of main body 13A. Motor 9 and rotary blade 8 are provided at a tip of wing support 13B.

Figure 1:
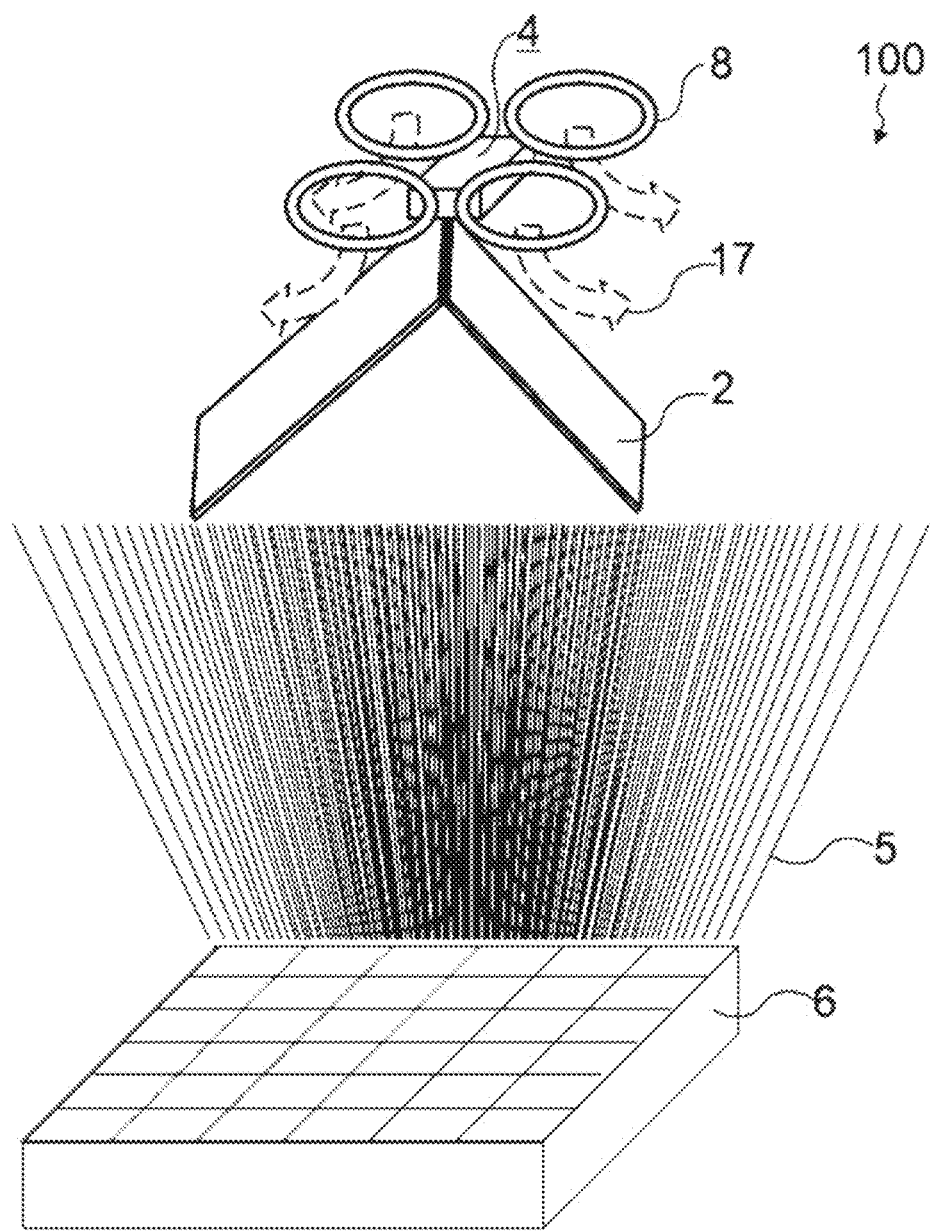
FIG. 1 is a perspective view illustrating a configuration of a power transmission system to an aerial moving body according to a first embodiment.
Figure 2:
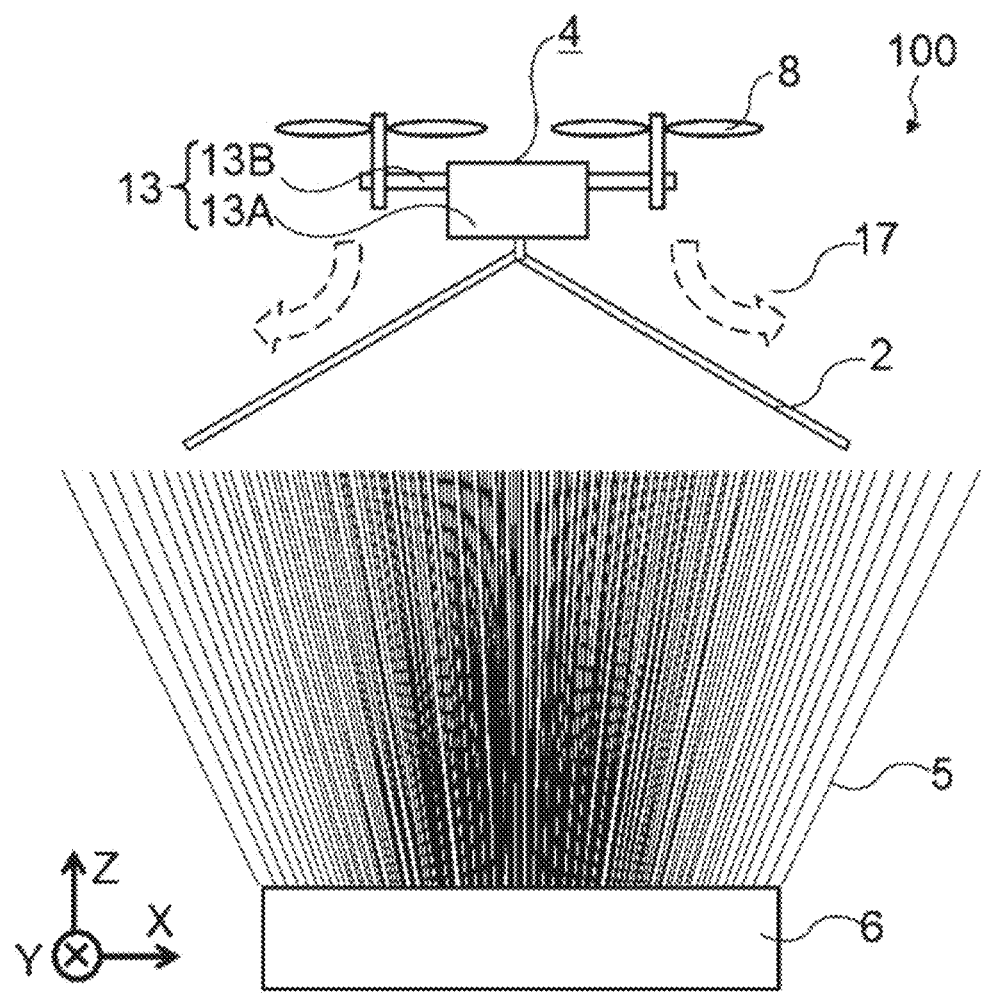
FIG. 2 is a front view illustrating the configuration of the power transmission system to the aerial moving body according to the first embodiment.
Figure 3:
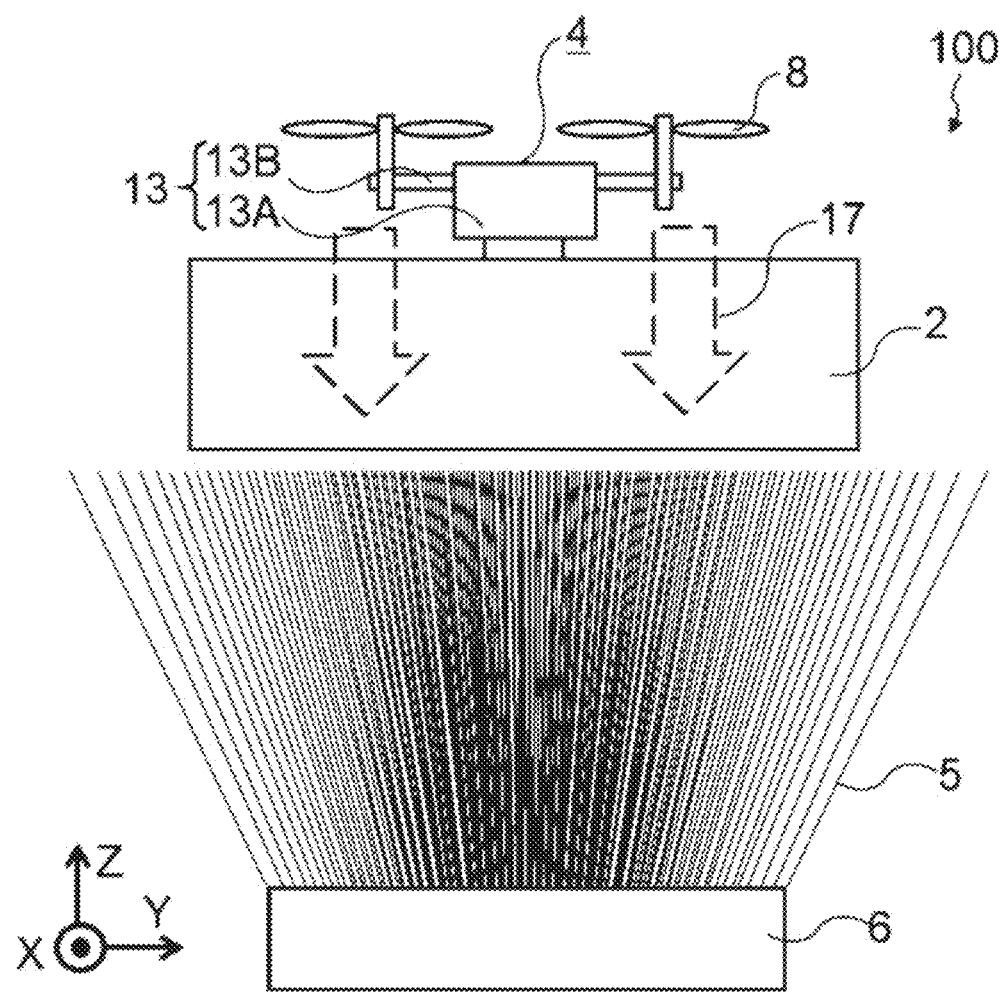
FIG. 3 is a side view illustrating the configuration of the power transmission system to the aerial moving body according to the first embodiment.

An XYZ-coordinate system is defined as an orthogonal coordinate system of drone 4. Lengthwise and crosswise directions of the squares of the upper surface and the bottom surface of main body 13A are parallel to an X-axis or a Y-axis. The rotation axes of four sets of rotary blades 8 are disposed at the vertexes of a larger square including the square of main body 13A when viewed from a Z-axis direction. Sides of the square on which the rotation axes are disposed are parallel to the X-axis or the Y-axis. The X-axis is a left-right direction shown in FIG. 4 that is the plan view. The right direction shown in FIG. 4 is a positive direction of the X-axis. The Y-axis is a vertical direction shown in FIG. 4. The upward direction shown in FIG. 4 is a positive direction of the Y-axis. A Z-axis is a vertical direction shown in FIG. 2 that is the front view. The upward direction shown in FIG. 2 is a positive direction of the Z-axis. The Z-axis is parallel to the rotation axis direction. Drone 4 can move in any direction.

Rotary blades 8 rotate to generate lift. When rotary blades 8 rotate, a descending airflow 17 is generated below rotary blades S. The drone obtains the lift levitating itself by descending airflow 17. Rotary blade 8 is provided on airframe 13. For example, four sets of rotary blades 8 are provided. For example, one set of rotary blades 8 has four rotary blades. Drone 4 includes a plurality of sets (four sets) of rotary blades 8 arranged distributedly when viewed from the Z-axis direction. In an XY-plane, the four sets of rotary blades 8 are symmetrically provided with respect to the X-axis and the Y-axis.

Motor 9 is an electric motor that generates power to rotate rotary blade 8. Motor 9 is provided so as to be connected directly to the rotation axis of rotary blade S. The rotation axes of the plurality of sets of rotary blades 8 are parallel to each other. A direction parallel to the rotation axis of rotary blade 8 is referred to as a rotation axis direction. The rotation axis direction is parallel to the Z-axis.

Flight controller 10 controls each motor 9 and power supply circuit 12 such that drone 4 flies according to an instruction.

When the electric power required by drone 4 can be transmitted by power transmission radio wave 5, the capacity of battery 11 is designed to be a capacity that can store the electric power required for drone 4 to fly, for example, for about 30 minutes (referred to as a parasitic flight time). When the capacity of battery 11 is increased, battery 11 becomes heavier, and the electric power required for drone 4 to fly also increases. The relationship between the capacity of battery 11 and the time while drone 4 can fly is complicated. For example, after reducing the electric power required for drone 4 to fly by reducing the weight of battery 11 as much as possible, the capacity of battery 11, the weight of drone 4, the output of motor 9, and the like are determined such that the parasitic flight time is greater than or equal to a predetermined time.

Power reception antenna 2 has the opening surface to receive power transmission radio wave S. Power reception antenna 2 is mounted on the lower side of drone 4 such that the opening surface of power reception antenna 2 is directed downward. In power reception antenna 2, two rectangular planar antennas are arranged with their upper sides close to each other. In the power reception antenna, a surface opposite to the opening surface is referred to as a rear surface. The planar antenna is disposed such that the rear surface of the planar antenna being inclined forms an angle of about 120 degrees with respect to a vertically upward direction. Opening surfaces of the two planar antennas being directed downward form the angle of about 120 degrees with each other. The direction in which the planar antenna is directed to is a direction in which a normal vector of the plane parallel to the opening surface is directed to. When power reception antenna 2 is provided such that the opening surface is directed downward, power reception antenna 2 can receive power transmission radio wave 5 radiated upward by power transmission device 1 installed on the ground or the water surface. The ground or water surface is part of an earth surface. The lower side of power reception antenna 2 is a side being directed to the earth surface.

Drone 4 has four sets of rotary blades 8. As illustrated in FIG. 4, when drone 4 is projected onto a plane (rotation axis perpendicular plane, XY-plane) perpendicular to the rotation axis direction, the range where power reception antenna 2 exists is larger than the range where drone 4 exists. The projection is performed such that a straight line connecting a point to be projected and a projected point is perpendicular to the plane to be projected. The rear surface of power reception antenna 2 is provided so as to form the angle of about 120 degrees with respect to the upward direction of the rotation axis, so that the drag caused by descending airflow 17 in power reception antenna 2 generated by rotary blade 8 is reduced. When the distance between rotary blade 8 and power reception antenna 2 and the angle formed by power reception antenna 2 and the rotation axis direction are appropriately determined, the drag caused by descending airflow 17 in power reception antenna 2 is reduced sufficiently. In power reception antenna 2, a structure in which the rear surface of power reception antenna 2 is not perpendicular to descending airflow 17 is a drag reducing structure to reduce the drag caused by descending airflow 17.

Power transmission device 1 includes power transmission antenna 6 and a power transmission controller 18. Power transmission antenna 6 is a phased array antenna. Power transmission antenna 6 includes a plurality of element power transmission antennas 7, a plurality of element modules 19, one transmission signal generator 20, and a distribution circuit 21. Element module 19 is provided for each element power transmission antenna 7. Element module 19 may be provided for every two or more element power transmission antennas 7. Element module 19 may be provided for each predetermined number of element power transmission antennas 7, namely, one or more element power transmission antennas 7. Element module 19 is provided near corresponding element power transmission antenna 7. A plurality of element power transmission antennas 7 exist on the opening surface of power transmission antenna 6. Element power transmission antennas 7 are arranged in a matrix shape. The opening surface of power transmission antenna 6 is drawn with lines each dividing the region of each element power transmission antenna 7. Transmission signal generator 20 generates a transmission signal having a determined frequency radiated as power transmission radio wave 5 by each element power transmission antenna 7. Distribution circuit 21 distributes the transmission signal generated by transmission signal generator 20 to each element module 19. Each element module 19 changes a phase of the transmission signal and amplifies the transmission signal. Each element module 19 outputs the amplified transmission signal to corresponding element power transmission antenna 7. Element power transmission antenna 7 radiates the amplified transmission signal as an element radio wave. The phase of the element radio wave radiated by each element power transmission antenna 7 is adjusted by element module 19 so as to radiate power transmission radio wave 5 in an instructed direction. Power transmission controller 18 controls each element module 19 so as to radiate power transmission radio wave 5 in an existence direction inputted from the outside. The existence direction is a direction in which power reception antenna 2 included in drone 4 exists when viewed from power transmission antenna 6. Power transmission controller 18 is an orientation direction changer that directs the orientation direction of power transmission antenna 6 to the existence direction.

Element module 19 includes a phase shifter 22 and an amplifier 23. Phase shifter 22 changes the phase of the transmission signal by a command value. Phase shifter 22 changes the phase discretely with a pitch width of phase rotation determined by a number of bits determining resolution of the phase. For example, in the case of a 5-bit phase shifter, the phase is rotated with the pitch width of $360°/2^5=11.25°$. Phase shifter 22 may change the phase continuously. The orientation direction of power transmission antenna 6 is directed to the existence direction by controlling an amount (phase shift amount) by which the phase is changed by phase shifter 22, namely, the phase of the element radio wave radiated by each element power transmission antenna 7 depending on the arrangement of element power transmission antenna 7. Amplifier 23 amplifies the transmission signal. The amplification factor of amplifier 23 is determined such that power transmission antenna 6 can radiate the determined electric power.

In order that power reception antenna 2 receives power transmission radio wave 5 radiated by power transmission antenna 6 efficiently, it is important to increase beam transmission efficiency between power transmission antenna 6 and power reception antenna 2. Beam transmission efficiency n is a ratio (n=Pr/Pt) obtained by dividing electric power Pr received at the opening surface of power reception antenna 2 by electric power Pt transmitted from the opening surface of power transmission antenna 6. Beam transmission efficiency n can be calculated from the distance between power transmission antenna 6 and power reception antenna 2 and the area (opening area) of the opening surface of power transmission antenna 6 and power reception antenna 2 (see, for example, NPL 2). The opening surface of power transmission antenna 6 is referred to as a power transmission surface. The opening surface of power reception antenna 2 is referred to as a power reception surface.

As a formula calculating beam transmission efficiency n, the following equation (1), which is a Friss formula, is well known.

[Mathematical formula 1]

$$\eta = \frac{Pr}{Pt} = \frac{A_t A_r}{\lambda^2 D^2} = \left(\frac{\pi d_t d_r}{4\lambda D}\right)^2 \quad (1)$$

where $\lambda$ is a wavelength of power transmission radio wave 5. D is a power transmission distance (distance between power transmission antenna 6 and power reception antenna 2). $A_t$ is an effective opening area of power transmission antenna 6. $A_r$ is an effective opening area of power reception antenna 2. $d_t$ is a diameter (opening diameter) of circular power transmission antenna 6 having opening area $A_t$. $d_r$ is a diameter (opening diameter) of circular power reception antenna 2 having opening area $A_r$.

In a region where at least one of power transmission antenna 6 and power reception antenna 2 is large compared to power transmission distance D and electric power density in the opening surface is not constant, the following equations (2) and (3) hold.

[Mathematical Formula 2]

$$\gamma = \frac{\pi d_t d_r}{4\lambda D} \quad (2)$$

$$\eta = 1 - e^{-\gamma^2} \quad (3)$$

In the wireless power transmission, it is important to optimize power transmission distance D and the antenna opening diameters of power transmission antenna 6 and power reception antenna 2 in a state in which power transmission antenna 6 and power reception antenna 2 are arranged to face each other directly. As can be seen from the equation (1) or the equation (2), in order to increase beam transmission efficiency η, it is effective to increase opening area $A_r$ of power reception antenna 2, namely, opening diameter $d_r$.

Power reception antenna 2 is two planar antennas inclined with respect to the rotation axis direction. The planar antenna constituting power reception antenna 2 has the substantially rectangular opening surface and the rear surface. In the two planar antennas, one sides of the rectangles are arranged to be close to each other on the upper side. One sides of the rectangles of the two planar antennas are disposed close to and parallel to the Y-axis. That is, one sides of the rectangle of the two planar antennas are arranged substantially perpendicular to the rotation axis direction and parallel to each other. The two planar antennas are arranged symmetrically with respect to a YZ-plane. Any one of the opening surface and the rear surface of the two planar antennas may not be rectangular. The two planar antennas may not be symmetric with respect to the YZ-plane or the plane including the Z-axis. The power reception antenna may include two planar antennas inclined in different directions so as to be close to each other on the upper side.

In power reception antenna 2, four descending airflows 17 by four sets of rotary blades 8 flow two by two from a central side to both outer sides in the direction parallel to the X-axis above the inclined planar antenna. Descending airflow 17 generated by the distributedly arranged rotary blades 8 flows distributedly. Power reception antenna 2 is provided such that the flow paths of descending airflow 17 are arranged distributedly when viewed from the rotation axis direction. Consequently, the drag caused by descending airflow 17 in power reception antenna 2 is reduced. In addition, because descending airflow 17 flows distributedly, force rotating power reception antenna 2 is not generated by descending airflow 17.

Figure 7:
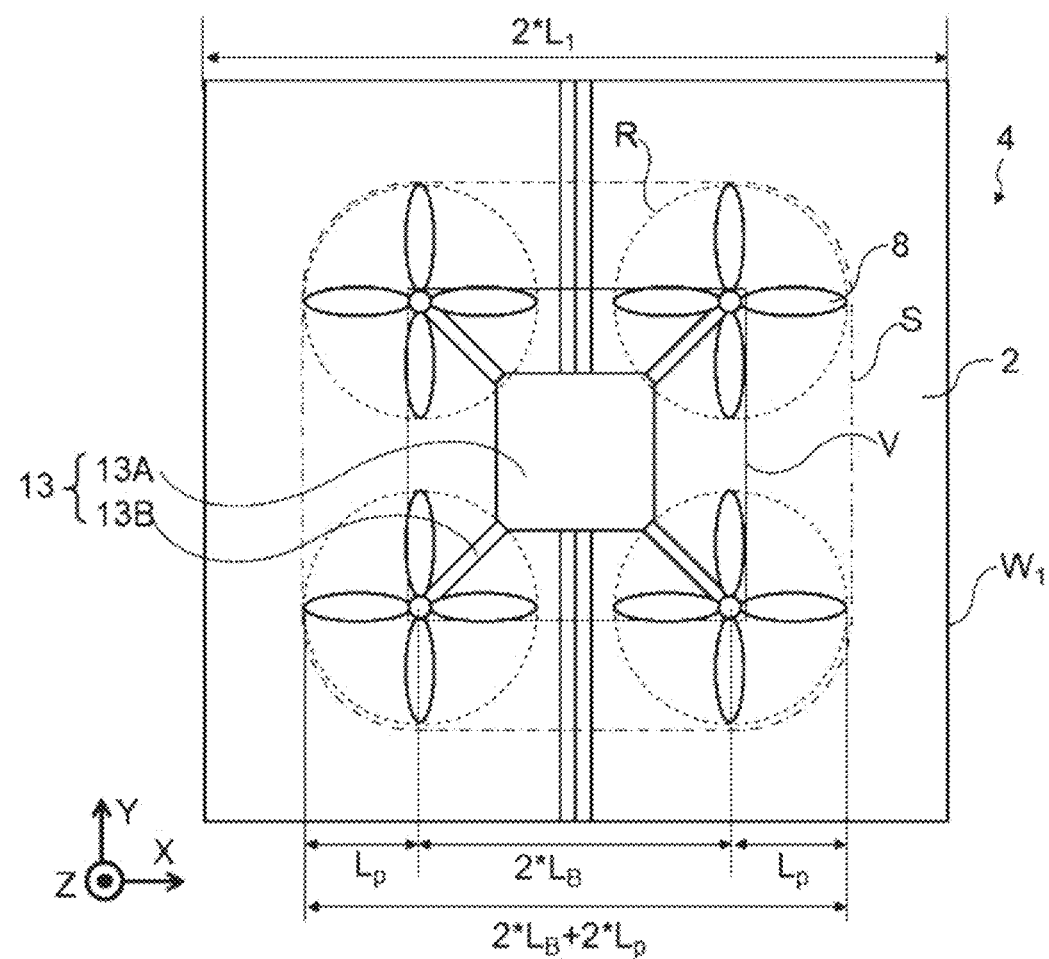
FIG. 7 is a schematic diagram evaluating a size of a power reception antenna included in the aerial moving body to which the power is transmitted by the power transmission system to the aerial moving body according to the first embodiment.

With reference to FIG. 7, the size of the opening area of power reception antenna 2 included in drone 4 is evaluated. FIG. 7 is a schematic diagram evaluating the size of the power reception antenna included in the aerial moving body to which the power is transmitted by the power transmission system to the aerial moving body according to the first embodiment. FIG. 7 is a plan view illustrating drone 4 as viewed from above. The rotation axis direction of rotary blade 8 included in drone 4 is a direction perpendicular to a paper surface in FIG. 7.

In FIG. 7, an airframe projection range V is indicated by a thin solid line. Airframe projection range V is the smallest convex range surrounding airframe 13 projected onto the plane (rotation axis perpendicular plane) perpendicular to the rotation axis direction. Airframe projection range V in the case of drone 4 is a substantially rectangular range surrounding the tips of four wing supports 13B. Four rotary blade projection ranges R are indicated by a broken line. Rotary blade projection range R is a range obtained by projecting the range where rotating rotary blades 8 exist perpendicularly onto the rotation axis perpendicular plane. A rotary blade projection region S is indicated by an alternate long and short dash line. Rotary blade projection region S is a convex region including four rotary blade projection ranges R in the rotation axis perpendicular plane. The area of airframe projection range V is represented by a variable Av. Area Av is an airframe projection area obtained by projecting airframe 13 onto the rotation axis perpendicular plane. The area of rotary blade projection region S is represented by a variable As. The area As is referred to as a rotary blade projection area obtained by projecting the rotary blade and the airframe onto the rotation axis perpendicular plane.

In FIG. 7, power reception surface projection range $W_1$ is a range surrounded by the outline of the opening surface (power reception surface) of power reception antenna 2. Power reception surface projection range $W_1$ is a range obtained by projecting the power reception surface of power reception antenna 2 perpendicularly to the rotation axis perpendicular plane. The area of power reception surface projection range $W_1$ is represented by a variable $Aw_1$. The area (power reception area) of the power reception surface of power reception antenna 2 is represented by a variable $Ar_1$. Power reception antenna 2 has the following relationship with respect to the area. Here, the angle formed by the power reception surface of power reception antenna 2 and the rotation axis perpendicular plane is represented by a variable δ. For example, δ is about 30 degrees or more. As can be seen from the expression (5), when an inclination angle δ increases, area $Ar_1$ of the opening surface required for obtaining the same power reception surface projection area $Aw_1$ increases.

$$Aw_1 > As > Av \quad (4)$$

$$Ar_1 = Aw_1/\cos \delta > Aw_1 \quad (5)$$

Figure 8:
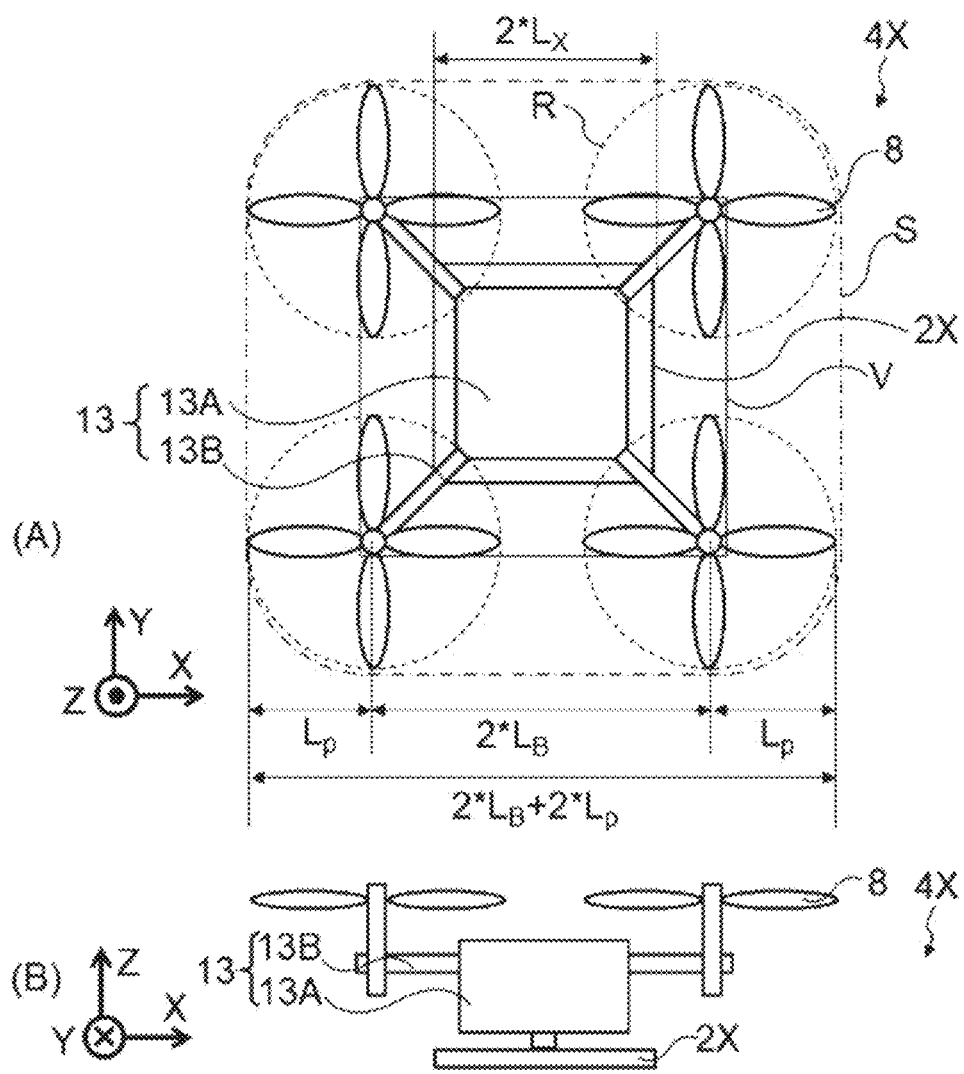
FIG. 8 is a schematic view evaluating the size of the power reception antenna included in an unmanned vehicle (aerial moving body) disclosed in PTL 1 as a comparative example.

With reference to FIG. 8, a power reception antenna included in an unmanned vehicle 4X (aerial moving body) in PTL 1 is described as a comparative example. FIG. 8 is a schematic view evaluating the size of the power reception antenna included in the unmanned vehicle (aerial moving body) disclosed in PTL 1 as a comparative example. FIG. 8(A) is a plan view illustrating unmanned vehicle 4X as viewed from above. FIG. 8(B) illustrates a front view of unmanned vehicle 4X. Unmanned vehicle 4X has the same shape as drone 4 except for a power reception antenna 2X. Power reception antenna 2X is provided in parallel to the rotation axis perpendicular plane. In FIG. 8(A), a long-dashed line indicates a power reception surface projection range $W_X$ that is a range obtained by projecting the power reception surface of power reception antenna 2X perpendicularly to the rotation axis perpendicular plane. Power reception surface projection range $W_X$ is included in airframe projection range V and rotary blade projection region S. The area of power reception surface projection range $W_X$ is represented by a variable $Aw_X$. Power reception antenna 2X has the following relationship with respect to the area.

$$Ar_X = Aw_X < A_V < A_S \quad (6)$$

The opening area of power reception antenna 2 and the opening area of power reception antenna 2X of the comparative example are studied. Study is made under the following conditions. In drone 4, the rotation axes of four rotary blades 8 are arranged at the four vertexes of the square. A half of the distance between the rotation axes of rotary blades 8 is represented by a variable $L_B$. A radius of rotary blade 8 is represented by a variable $L_P$. Power reception surface projection range $W_1$ of power reception antenna 2 is a square. A half of the length of one side of power reception surface projection range $W_1$ is represented by a variable $L_1$. Power reception antenna 2X has the square opening surface. A half of the length of one side of the opening surface of power reception antenna 2X is represented by a variable $L_X$. A region where power reception surface projection range $W_X$ of power reception antenna 2X overlaps with rotary blade projection range R is referred to as an interference region $K_X$. The area of interference region $K_X$ is represented by a variable $B_X$. The area of the interference region is referred to as an interference area. A region where power reception surface projection range $W_1$ of power reception antenna 2 overlaps with rotary blade projection range R is referred to as an interference region $K_1$. The area of interference region $K_1$ is represented by a variable $B_1$. The drag caused by descending airflow 17 in power reception antenna 2X is represented by a variable $F_X$. The drag caused by descending airflow 17 in power reception antenna 2 is represented by a variable $F_1$. A ratio obtained by dividing drag $F_X$ by interference area $B_X$ is represented by a variable $\xi_X$. A ratio obtained by dividing drag $F_1$ by interference area $B_1$ is represented by a variable $\xi_1$. Here, $\xi_1 < \xi_X$ is satisfied. $\xi_X$ and $\xi_1$ are referred to as drag generation coefficients. The drag generation coefficient is a ratio obtained by dividing the drag by the interference area. Drag $F_1$ and drag generation coefficient $\xi_1$ decrease as inclination angle δ of power reception antenna 2 increases. Inclination angle δ of power reception antenna 2 is determined to be a value at which required power reception surface projection area $Aw_1$ is obtained while drag $F_1$ and drag generation coefficient $\xi_1$ are as small as possible.

The following relationships hold.

$$A_V = 4 * L_B^2 \quad (7)$$

$$A_S = 4 * L_B * (L_B + 2 * L_P) + \pi * L_P^2 \quad (8)$$

$$Ar_X = Aw_X = 4 * L_X^2 \quad (9)$$

$$Aw_1 = 4 * L_1^2 \quad (10)$$

$$Ar_1 = A_{w1}/\cos \delta = 4 * L_1^2/\cos \delta \quad (11)$$

$$F_X = \xi_X * B_X \quad (12)$$

$$F_1 = \xi_1 * B_1 \quad (13)$$

Here, interference area $B_1$ can be calculated as follows when $L_1$ that is a half of the length of one side of power reception antenna 2 is determined.

when $L_1 \leq L_B - (1/\sqrt{(2)}) * L_p$, $$B_1 = 0 \quad (14\text{-}1)$$

when $L_B - (1/\sqrt{(2)}) * L_p \leq L_1$, and $L_1 \leq L_B + (1/\sqrt{(2)}) * L_p$, $$B_1 = (\pi - 4 * \sin^{-1}((L_B - L_1)/L_p)) * L_p^2 - 4 * (\sqrt{(L_p^2 - (L_B - L_1)^2)} - (L_B - L_1)) * (L_B - L_1) \quad (14\text{-}2)$$

when $L_B + (1/\sqrt{(2)}) * L_p \leq L_1 \leq L_B + L_p$, $$B_1 = 4 * (\pi - 2 * \cos^{-1}((L_1 - L_B)/L_p)) * L_p^2 + 8 * (\sqrt{(L_p^2 - (L_1 - L_B)^2)} * (L_1 - L_B)) \quad (14\text{-}3)$$

when $L_B + L_p \leq L_1$, $$B_1 = 4 * \pi * L_p^2 \quad (14\text{-}4)$$

Interference area $B_X$ can also be calculated in the same manner as interference area $B_1$ by determining $L_X$ that is a half of the length of one side of power reception antenna 2X.

In this case, in order to simplify the calculation, it is assumed that the rotation axes of four sets of rotary blades 8 are located at positions of vertexes of a square and that power reception surface projection range $W_1$ is a square. The four rotation axes may be disposed at positions of vertexes of rectangles, trapezoids, or other types of quadrangles. Power reception surface projection range $W_1$ may be a rectangle, a parallelogram, another type of quadrangle, a triangle, or a polygon of a pentagon or more.

The upper limit of drag F1 allowable in drone 4 is represented by a variable $F_{ALOW}$. When the distance in the Z direction between power reception antenna 2 and rotary blade 8, inclination angle δ of power reception antenna 2, and the like is appropriately determined to reduce drag generation coefficient $\xi_1$ sufficiently, opening area $Aw_1$ of power reception antenna 2 can be increased considering that drag $F_1$ is set less than or equal to the upper limit. When the rear surface of power reception antenna 2 is not perpendicular, drag generation coefficient $\xi_1$ is made smaller than that in the case where the rear surface is perpendicular, and the opening area of power reception antenna 2 can be increased in the range where generated drag $F_1$ is less than or equal to $F_{ALOW}$ ($F_1 \leq F_{ALOW}$).

On the other hand, the rear surface of conventional power reception antenna 2X is perpendicular to the rotation axis direction, and drag generation coefficient $\xi_X$ is larger than $\xi_1$ ($\xi_X > \xi_1$). Consequently, in order for drag $F_X$ to be less than or equal to allowable upper limit $F_{ALOW}$ of the drag, in power reception antenna 2X, the opening surface of power reception antenna 2X can be increased no larger than the range where, for example, $L_X < 1.1 * L_B$ holds.

In power reception antenna 2, two planar antennas similar to the conventional planar antennas are used, and the rear surface of the planar antenna is not perpendicular to the descending airflow. The drag caused by the descending airflow in power reception antenna 2 is reduced by the inclination of the rear surface, and the opening surface of power reception antenna 2 can be made larger than the conventional one. Because power reception antenna 2 having the opening surface larger than the conventional one is mounted, drone 4 can receive more electric power than the conventional one during the flight, and the continuous flight time can be made longer than the conventional one. The planar antenna similar to the conventional planar antenna can be used, so that the development cost can be reduced.

The drone may have an airframe having a shape of a manned helicopter reduced in size. Even for the airframe having the shape of the manned helicopter reduced in size, it is required that power reception surface projection range $W_1$ includes airframe projection range V. Even when power reception surface projection range $W_1$ does not include entire airframe projection range V, area $Aw_1$ of power reception surface projection range $W_1$ may be made larger than area $A_V$ of airframe projection range V ($A_{W1} > A_V$).

Figure 9:
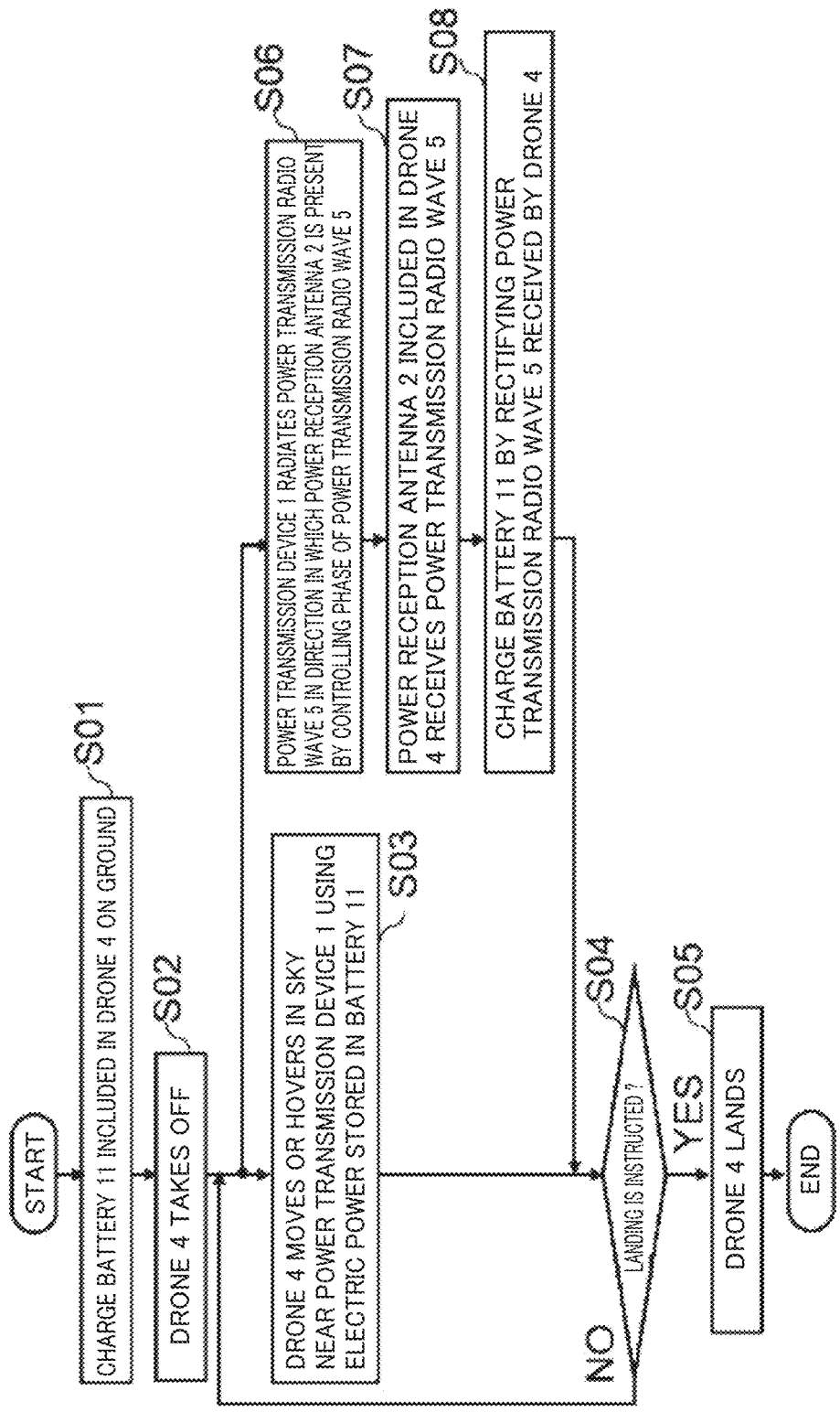
FIG. 9 is a flowchart illustrating a procedure for transmitting the power wirelessly to the aerial moving body by the power transmission system to the aerial moving body according to the first embodiment.
Figure 10:
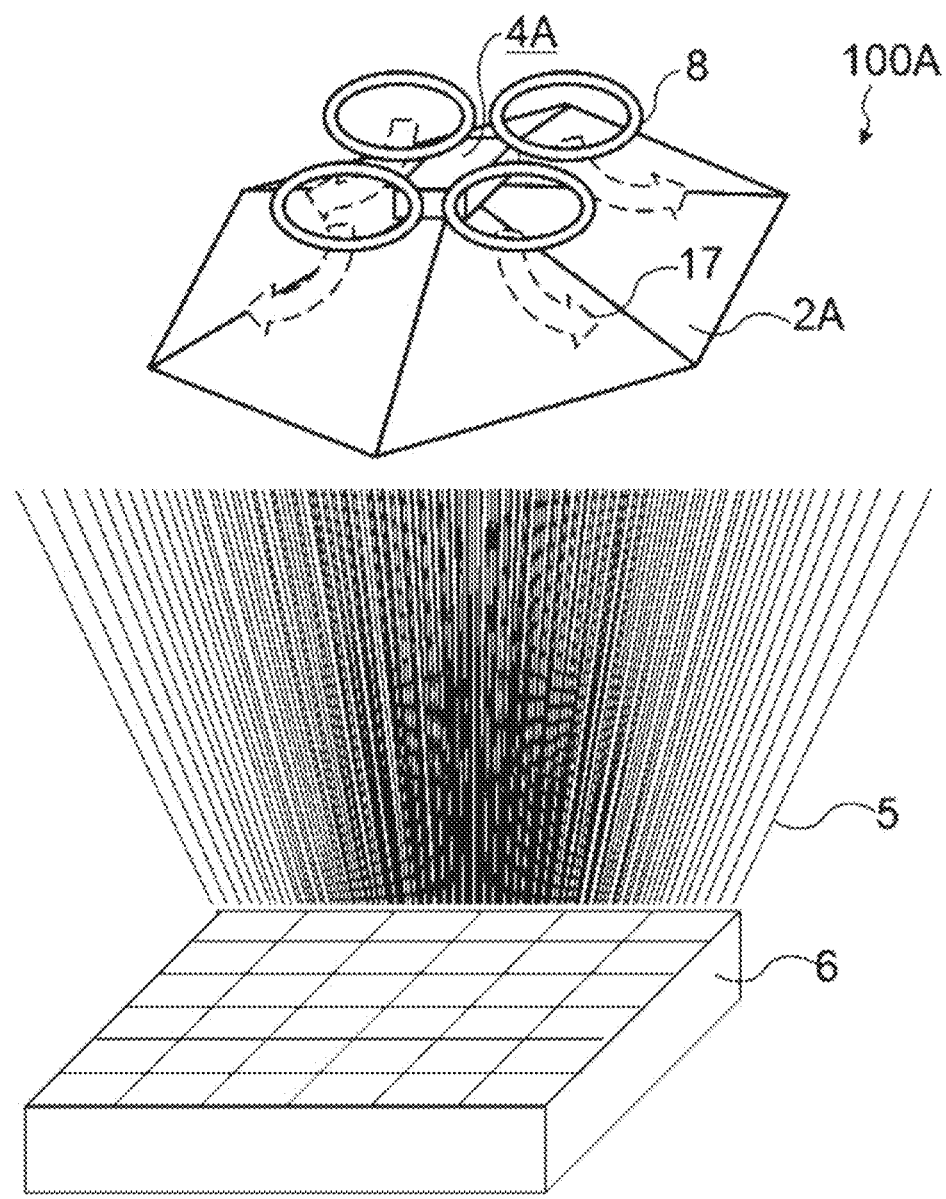
FIG. 10 is a perspective view illustrating a configuration of a power transmission system to an aerial moving body according to the second embodiment.
Figure 11:
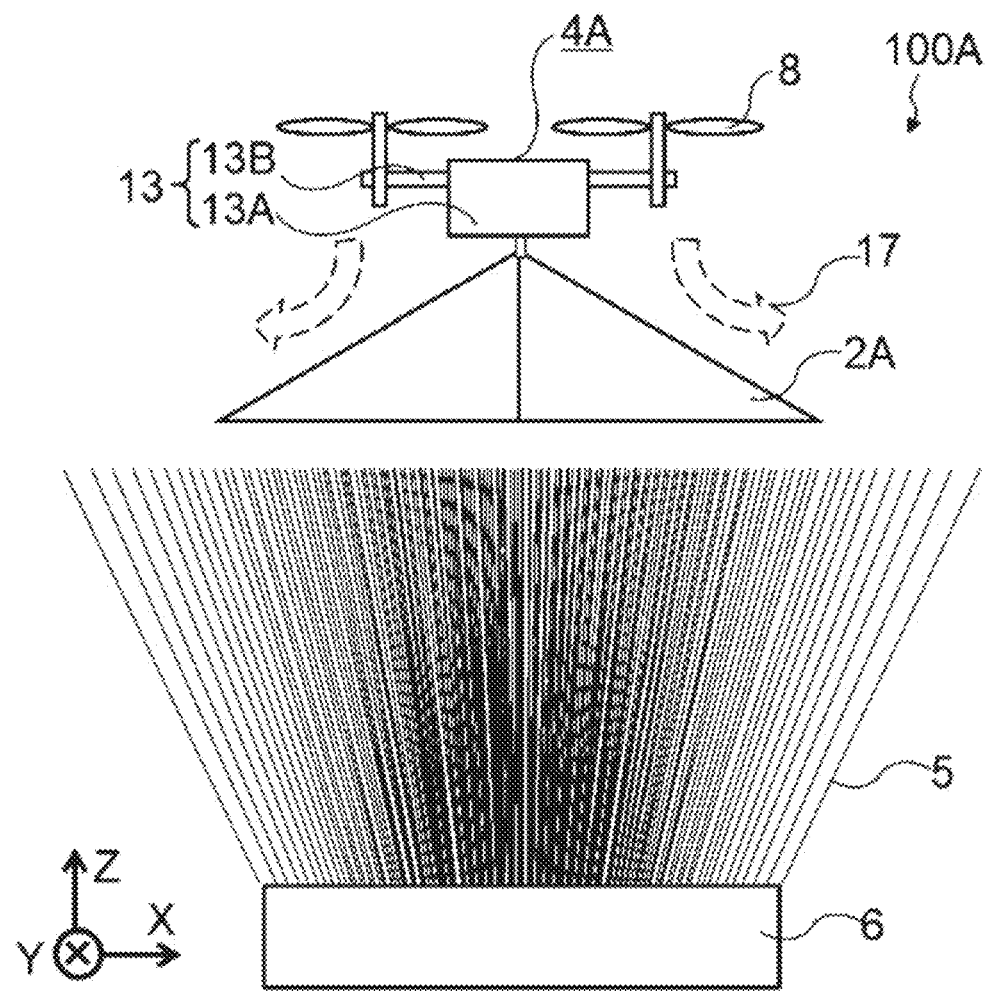
FIG. 11 is a front view illustrating the configuration of the power transmission system to the aerial moving body according to the second embodiment.
Figure 12:
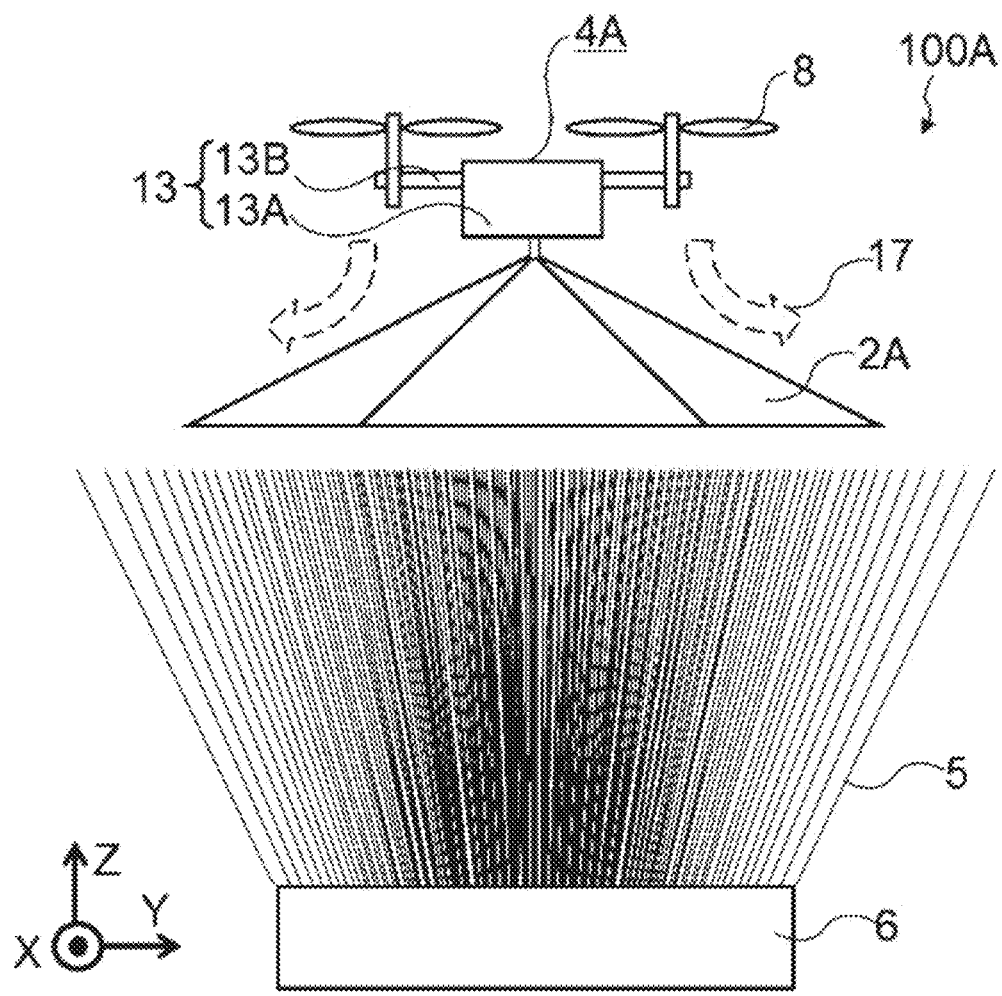
FIG. 12 is a side view illustrating the configuration of the power transmission system to the aerial moving body according to the second embodiment.
Figure 13:
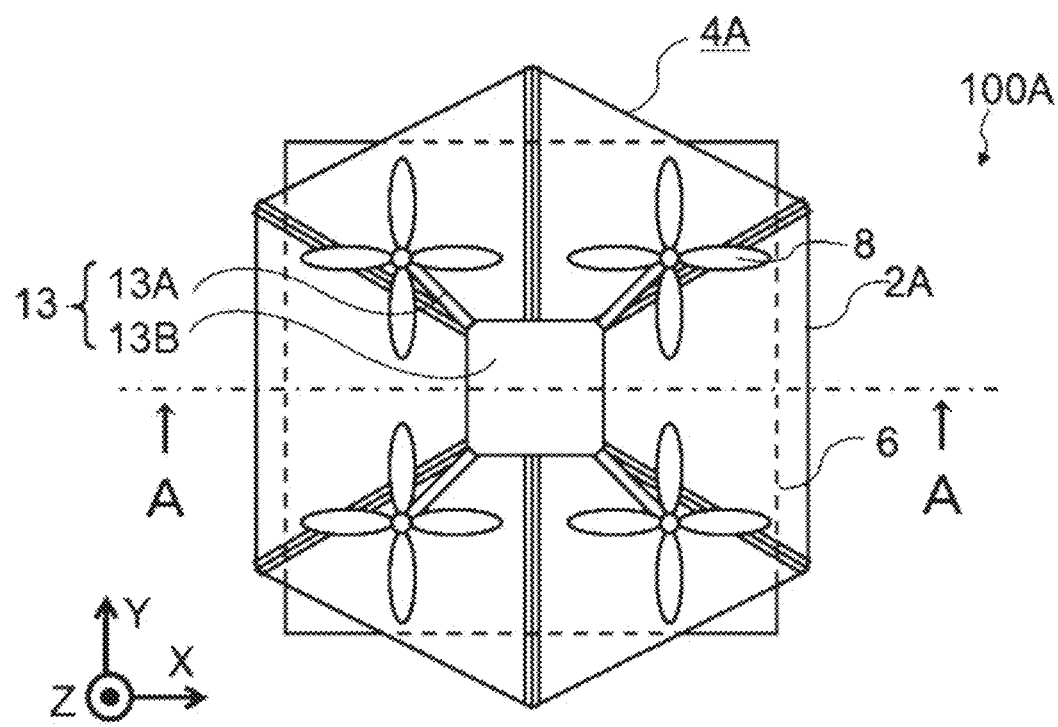
FIG. 13 is a plan view illustrating the configuration of the power transmission system to the aerial moving body according to the second embodiment.

The operation is described. FIG. 9 is a flowchart illustrating a procedure for transmitting the power wirelessly to the aerial moving body by the power transmission system according to the first embodiment. In step S01, battery 11 included in drone 4 is charged on the ground. In step S02, drone 4 takes off. In step S03, drone 4 moves or hovers in the sky near power transmission device 1 using the electric power stored in battery 11. In step S04, it is checked whether drone 4 is instructed to land. When the landing is instructed (YES in S04), drone 4 lands in step S05. When the landing is not instructed (NO in S04), the processing returns to S03.

Steps S06 to S08 are executed in parallel with S03. In S06, power transmission device 1 controls the phase of power transmission radio wave 5, and radiates power transmission radio wave 5 in the direction in which power reception antenna 2 included in drone 4 is present. In step S07, power reception antenna 2 included in drone 4 receives power transmission radio wave 5. In step S08, power transmission radio wave 5 received by drone 4 is rectified and battery 11 is charged. After S08, the processing proceeds to S04.

Drone 4 includes power reception antenna 2 having the opening area larger than the conventional one. When the electric power to be received by drone 4 is larger than the electric power to be consumed, drone 4 can fly until the required work is completed, no matter how long the time is taken. Even when the electric power to be consumed is larger than the electric power to be received, drone 4 can extend the continuous flight time as compared with the case where the wireless power transmission is not performed during the flight.

The power reception antenna may use three or more planar antennas. The opening surface of the power reception antenna may be perpendicular to the rotation axis direction, and the rear surface of the power reception antenna may not be perpendicular to the rotation axis direction. In the first embodiment, the two planar antennas having the rectangular opening surfaces are disposed such that upper ends of the planar antennas are close to each other. A plurality of planar antennas having a non-rectangular opening surface may be disposed such that upper ends of the planar antennas are close to each other and are inclined in directions different from each other.

An opening (through-hole) through which air passes through the planar antenna may be provided in the power reception antenna. When the opening is provided in the planar antenna having the same outer shape as the power reception antenna 2, the force received by the power reception antenna due to the component parallel to the Y-axis of the wind can be reduced. In addition, the air resistance can be reduced when the drone moves in the direction different from the Y-axis.

The above is also applied to other embodiments.

Second Embodiment

Figure 14:
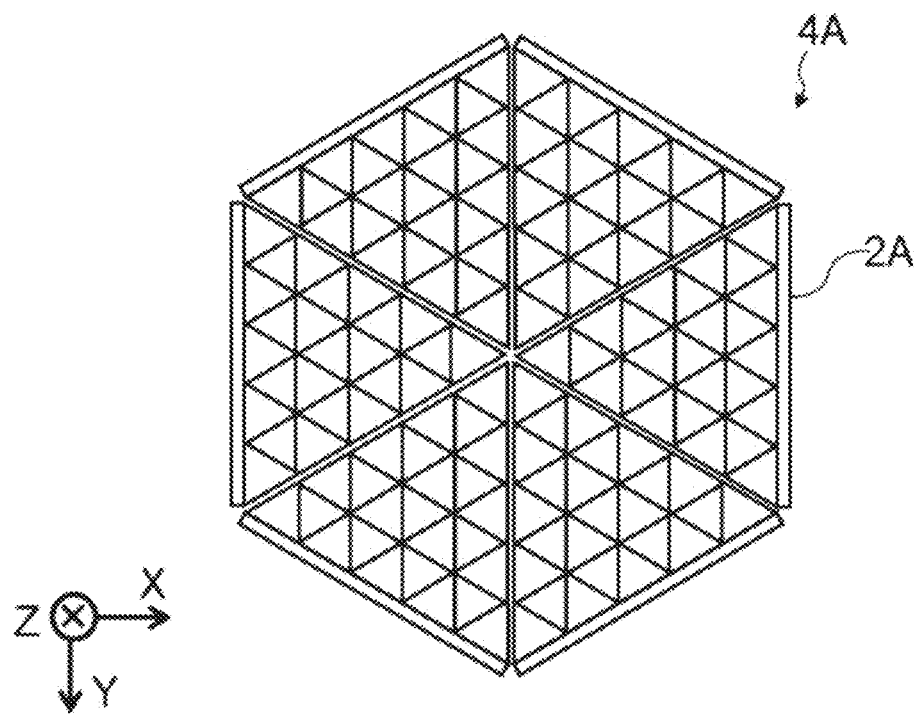
FIG. 14 is a bottom view illustrating the aerial moving body to which the power is transmitted by the power transmission system to the aerial moving body according to the second embodiment.
Figure 15:
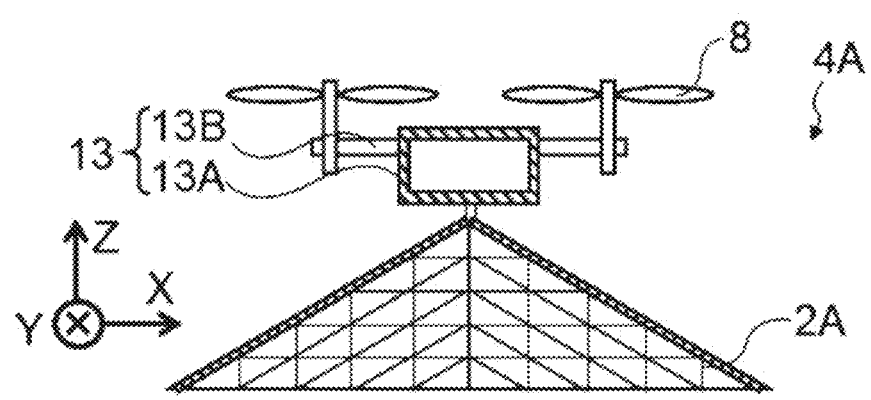
FIG. 15 is a sectional view illustrating the aerial moving body to which the power is transmitted by the power transmission system to the aerial moving body according to the second embodiment.

A second embodiment is an embodiment using the power reception antenna having a pyramidal outer shape. With reference to FIGS. 10 to 15, a configuration of a power transmission system to an aerial moving body according to the second embodiment is described. FIGS. 10 to 13 are a perspective view, a front view, a side view, and a plan view illustrating the configuration of the power transmission system to the aerial moving body according to the second embodiment. FIGS. 14 and 15 are a bottom view and a sectional view illustrating the aerial moving body to which the power is transmitted. FIG. 15 is a sectional view taken along a line A-A shown in FIG. 13.

A wireless power transmission system 100A includes mainly power transmission device 1 and a drone 4A. A power reception device 3A including a power reception antenna 2A is mounted on drone 4A. Power transmission device 1 is the same as that of the first embodiment. FIGS. 10 to 13 illustrate the case where drone 4A is present in a space right above power transmission antenna 6.

Power reception antenna 2A has a shape in which six substantially triangular planar antennas are combined such that the outer shape is a hexagonal pyramid. Each planar antenna has two side surfaces adjacent to another planar antenna. Each planar antenna is disposed at an interval with an adjacent planar antenna. Each planar antenna is disposed with the opening surface being directed downward such that the opening surface forms the angle of δ (=about 30 degrees) with respect to the rotation axis perpendicular plane. The rear surface of power reception antenna 2A has a lateral surface of a hexagonal pyramid. As illustrated in FIG. 14, the opening surface of power reception antenna 2A is drawn with lines that divide the regions of element power reception antenna 14. In FIG. 14, one element power reception antenna 14 exists in one isosceles triangular area. The isosceles triangle of the region where one element power reception antenna 14 exists is an equilateral triangle when projected onto the rotation axis perpendicular plane.

Figure 16:
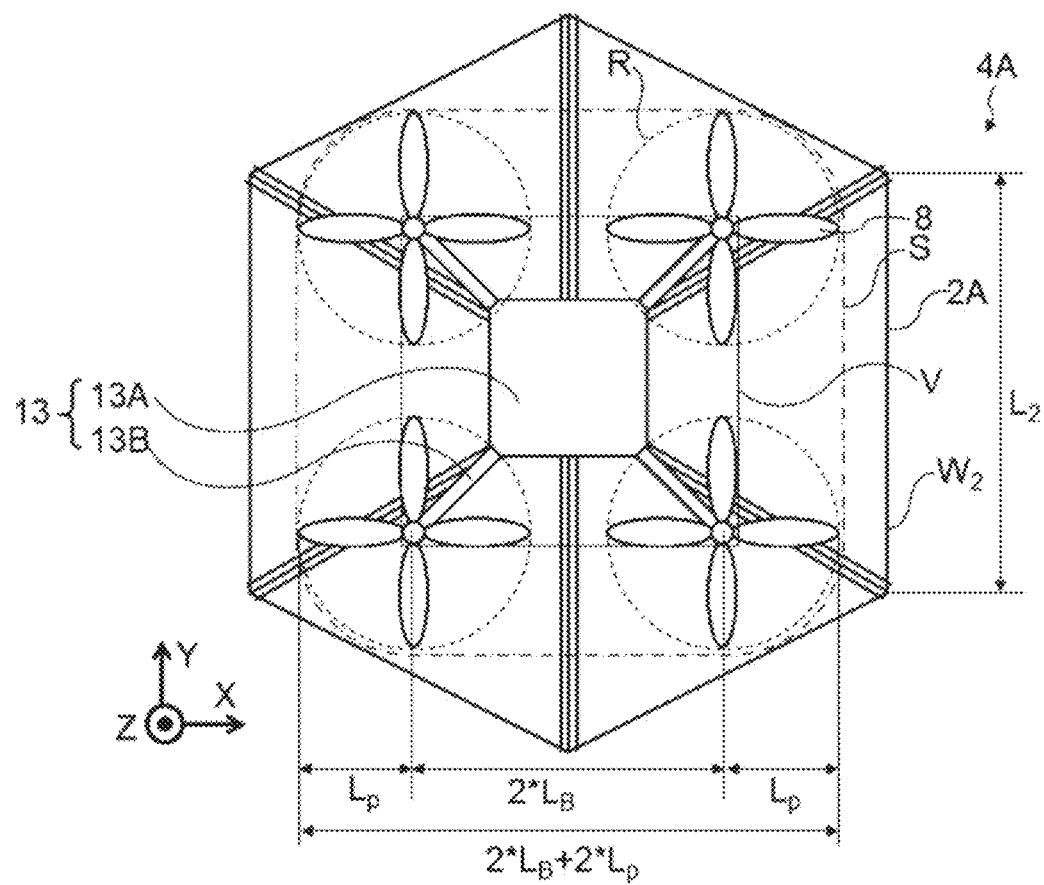
FIG. 16 is a schematic diagram evaluating a size of a power reception antenna included in the aerial moving body to which the power is transmitted by the power transmission system to the aerial moving body according to the second embodiment.
Figure 17:
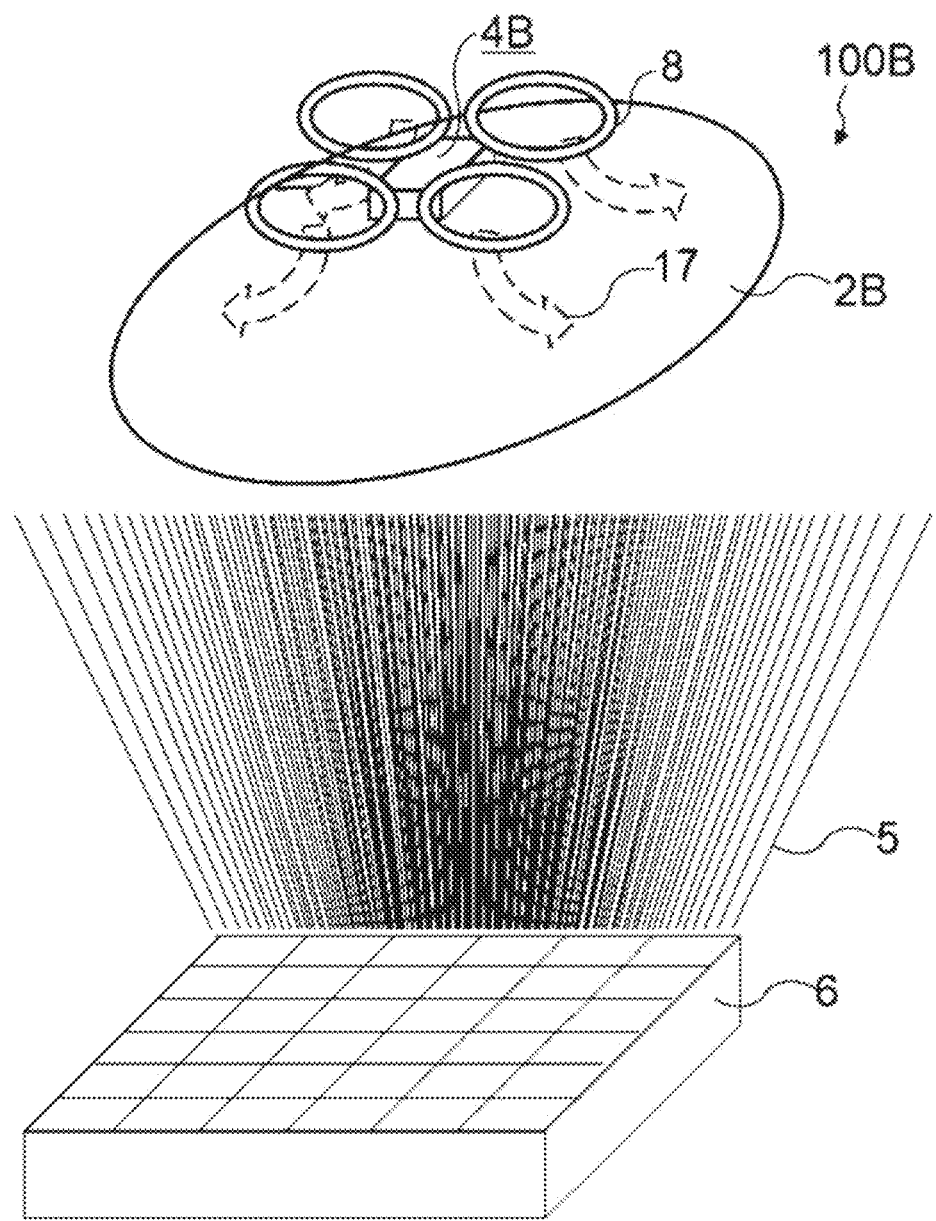
FIG. 17 is a perspective view illustrating a configuration of a power transmission system to an aerial moving body according to a third embodiment.
Figure 18:
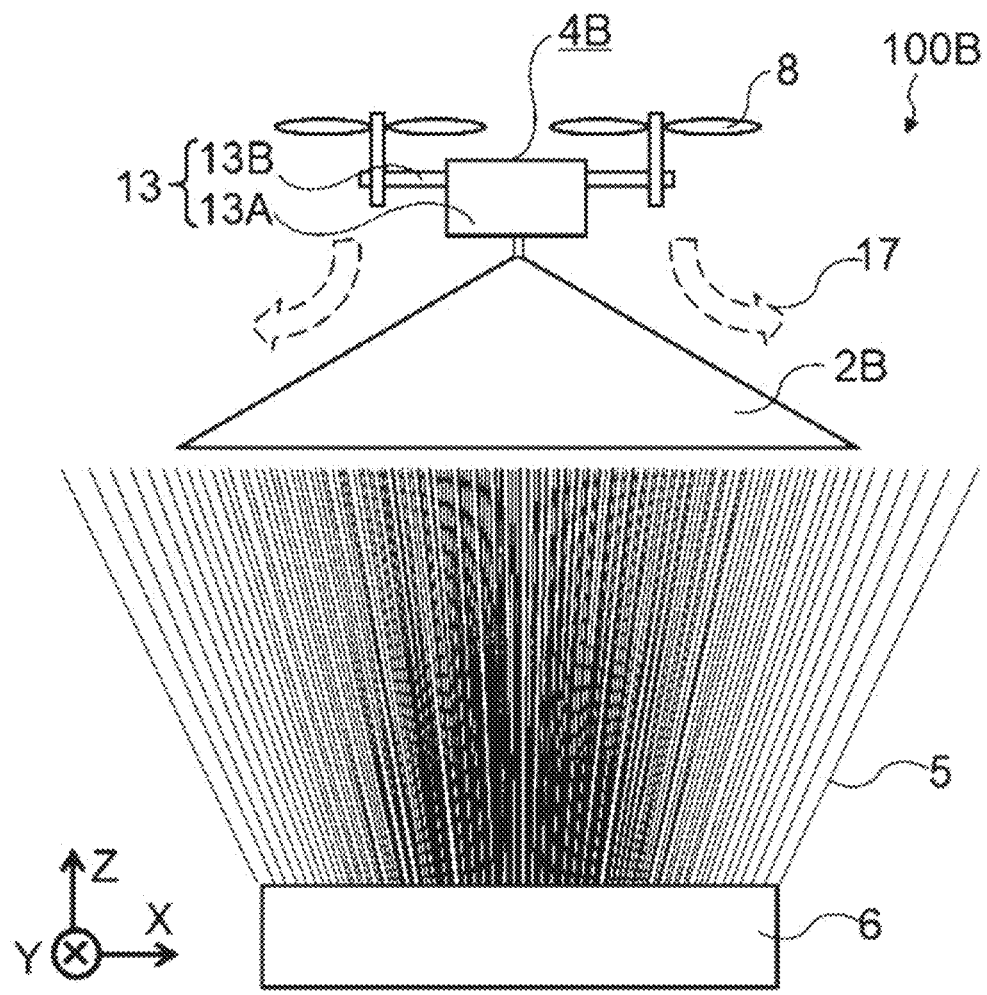
FIG. 18 is a front view illustrating the configuration of the power transmission system to the aerial moving body according to the third embodiment.
Figure 19:
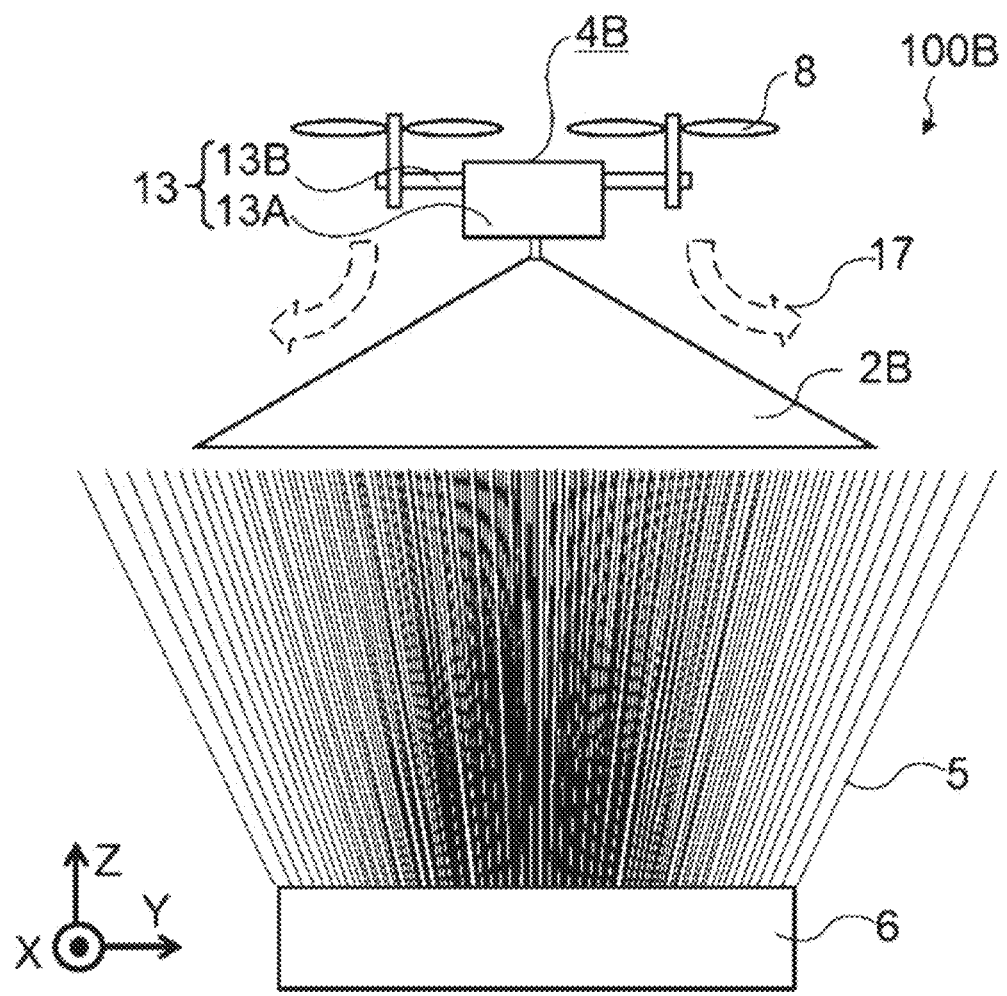
FIG. 19 is a side view illustrating the configuration of the power transmission system to the aerial moving body according to the third embodiment.
Figure 20:
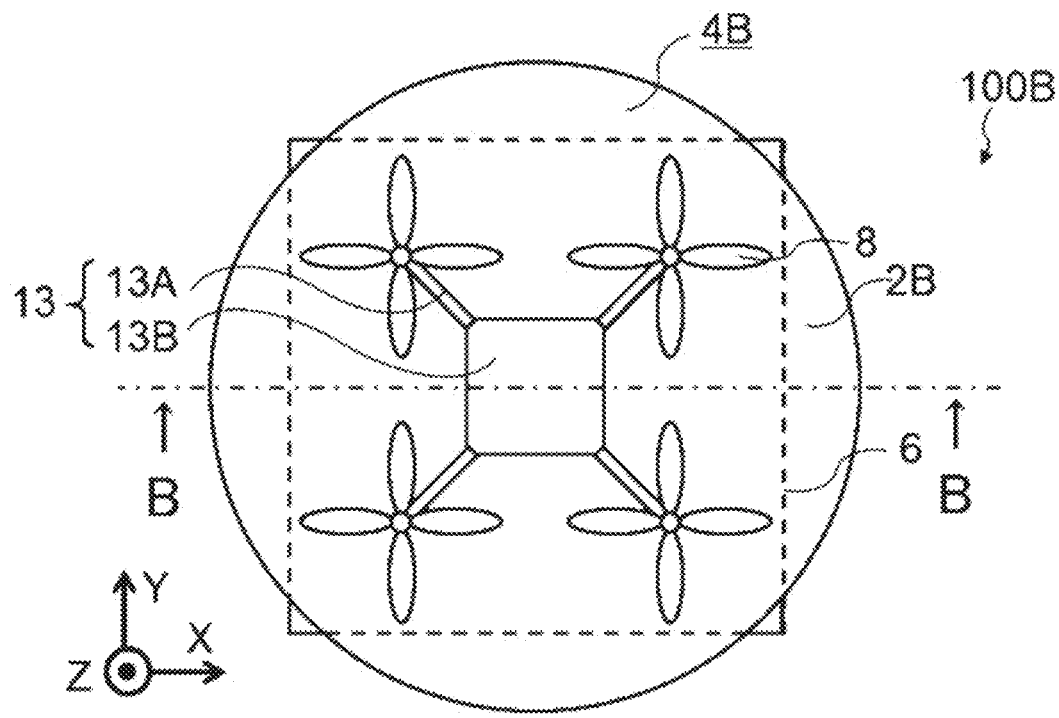
FIG. 20 is a plan view illustrating the configuration of the power transmission system to the aerial moving body according to the third embodiment.

With reference to FIG. 16, the opening area of power reception antenna 2A is evaluated. The length of one side of the regular hexagon in the bottom surface of the regular hexagonal pyramid of power reception antenna 2A is represented by a variable $L_2$. A power reception surface projection range $W_2$ that is a range obtained by projecting the power reception surface of power reception antenna 2A perpendicularly onto the rotation axis perpendicular plane includes rotary blade projection region S and airframe projection range V. The area of power reception surface projection range $W_2$ is represented by a variable $Aw_2$. The area of the opening surface of power reception antenna 2A is represented by a variable $Ar_2$. A region where power reception surface projection range $W_2$ overlaps with rotary blade projection range R is referred to as an interference region $K_2$. The area of interference region $K_2$ is represented by a variable $B_2$. The drag caused by descending airflow 17 in interference region $K_2$ is represented by a variable $F_2$. A drag generation coefficient that is a ratio obtained by dividing a drag $F_2$ by interference area $B_2$ is represented by a variable $\xi_2$ $(=F_2/B_2)$.

Power reception antenna 2A has the following relationships with respect to the area.

$$Aw_2=(3/2)*\sqrt{(3)}*L_2^2>As>Av \tag{4A}$$

$$Ar_2=Aw_2/\cos \delta \tag{5A}$$

Here, interference area $B_2$ can be calculated as follows when a length $L_2$ of one side of the regular hexagon of the bottom surface of power reception antenna 2A is determined.

when $L_2 \leq (1+1/\sqrt{(3)})*L_B-(2/\sqrt{(3)})*L_p$, $$B_2=0 \tag{15-1}$$

when $(1+1/\sqrt{(3)})*L_B-(2/\sqrt{(3)})*L_p \leq L_2 \leq (1+1/\sqrt{(3)})*L_B+(2/\sqrt{(3)})*L_p$, $$B_2=8*\cos^{-1}(((1/\sqrt{(3)}+1/3)*L_B-L_2/(\sqrt{(3)}/L_p)*L_p^2-8* ((1/\sqrt{(3)}+1/3)*L_B-L_2/(\sqrt{(3)}))*\sqrt{(L_p^2-((1/\sqrt{(3)}+1/3)*L_B-L_2/(\sqrt{(3)}))^2)} \tag{15-2}$$

when $(1+1/\sqrt{(3)})*L_B+(2/\sqrt{(3)})*L_p \leq L_2$, $$B_2=4*\pi*L_p^2 \tag{15-3}$$

Wireless power transmission system 100A operates similarly to wireless power transmission system 100. In power reception antenna 2A, the rear surface that receives descending airflow 17 has a pyramidal surface, so that the drag is reduced $\xi_2$ as compared with power reception antenna 2. That is, drag generation coefficient is smaller than $\xi_1$ in the case of power reception antenna 2 $(\xi_2<\xi_1)$. Since the drag is reduced, the flight performance of drone 4A is improved. Alternatively, power reception antenna 2A can be larger than power reception antenna 2. In power reception antenna 2A, an effective opening area having substantially the same size can be obtained even when power transmission radio wave 5 comes from any direction, and beam transmission efficiency η is improved as compared with power reception antenna 2.

The power reception antenna may have the outer shape such as a triangular pyramid, a quadrangular pyramid, a pentagonal pyramid, or a heptagonal pyramid. It may have a conical outer shape instead of the pyramid. The power reception antenna may have an outer shape of a truncated pyramid or a truncated cone instead of the pyramid or the conical cone. The power reception antenna may have an outer shape of a conic solid or frustum. The opening surface of the power reception antenna may not be provided on the opposite side (back side) of the rear surface that is the lateral surface of the conic solid or frustum, and may be provided on the bottom surface of the conic solid or the frustum.

The above is also applied to other embodiments.

Third Embodiment

Figure 21:
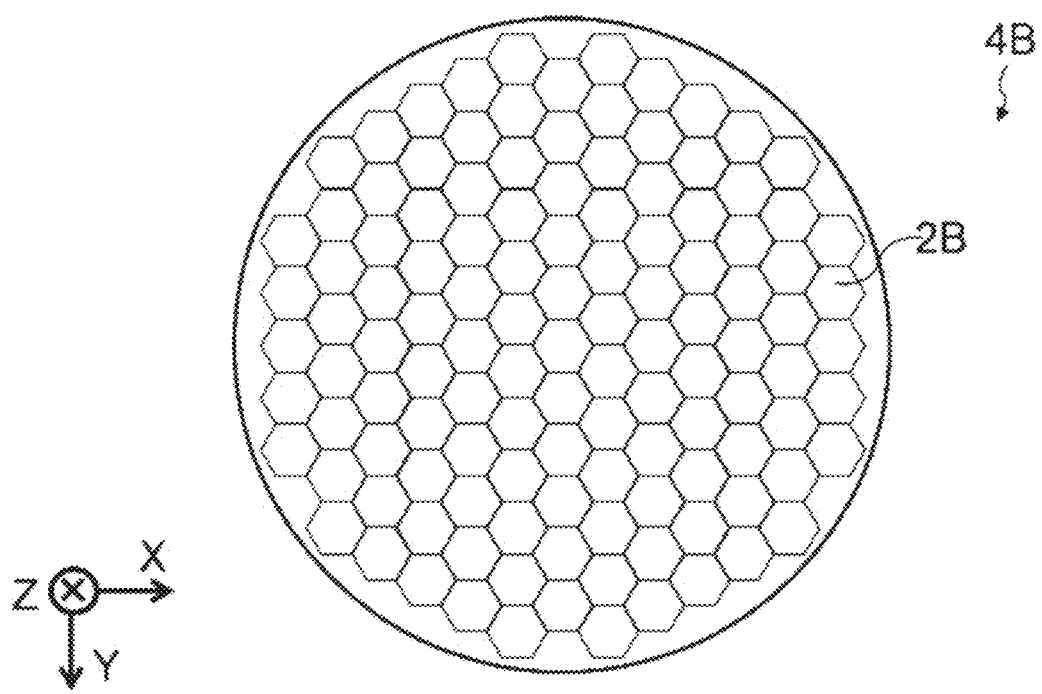
FIG. 21 is a bottom view illustrating the aerial moving body to which the power is transmitted by the power transmission system to the aerial moving body according to the third embodiment.
Figure 22:
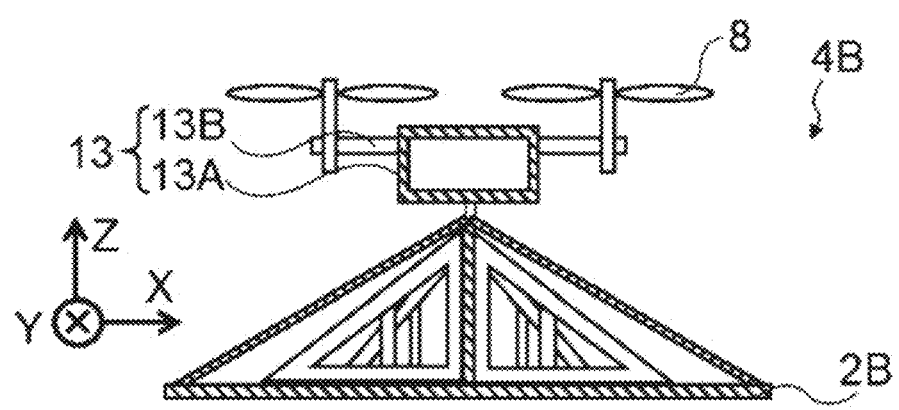
FIG. 22 is a sectional view illustrating the configuration of the power transmission system to the aerial moving body according to the third embodiment.

A third embodiment is an embodiment using a power reception antenna having a conical outer shape. With reference to FIGS. 17 to 22, a configuration of a power transmission system to an aerial moving body according to the third embodiment is described. FIGS. 17 to 20 are a perspective view, a front view, a side view, and a plan view illustrating the configuration of the power transmission system to the aerial moving body according to the third embodiment. FIGS. 21 and 22 are a bottom view and a sectional view illustrating the aerial moving body to which the power is transmitted. FIG. 22 is a sectional view taken along a line B-B shown in FIG. 20.

A wireless power transmission system 100B includes mainly power transmission device 1 and a drone 4B. A power reception device 3B including a power reception antenna 2B is mounted on drone 4B. FIGS. 17 to 20 illustrate the case where drone 4B is present in a space right above power transmission antenna 6.

Power reception antenna 2B has the conical outer shape. Power reception antenna 2B has the circular planar antenna on the bottom surface of the cone. The opening surface of power reception antenna 2B is directed downward, and the rear surface that is a surface opposite to the opening surface is a conical inclined surface. On the opening surface of power reception antenna 2B, one element power reception antenna 14 is provided for each region having a regular hexagon. Although not illustrated, openings through which air passes are provided on the opening surface and the rear surface of power reception antenna 2B. The conical surface of the cone is disposed so as to form angle δ (=about 30 degrees) with respect to the rotation axis perpendicular plane. A structural member connecting the conical surface and the bottom surface is provided inside the cone.

Figure 23:
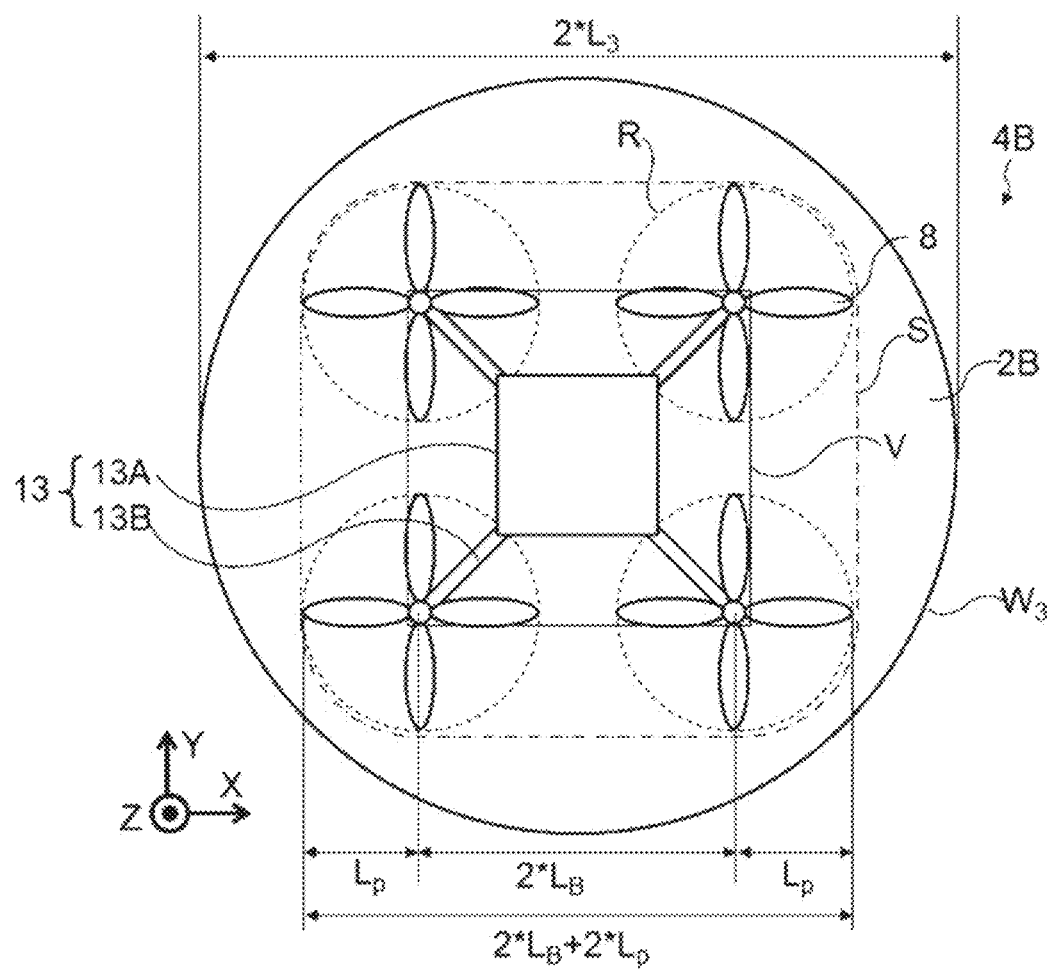
FIG. 23 is a schematic diagram evaluating a size of a power reception antenna included in an aerial moving body to which the power is transmitted by the power transmission system to the aerial moving body according to the third embodiment.

With reference to FIG. 23, the opening area of power reception antenna 2B is evaluated. The radius of the circle of the bottom surface in the cone of the power reception antenna 2B is represented by a variable $L_3$. A power reception surface projection range $W_3$ that is a range obtained by projecting the power reception surface of power reception antenna 2B perpendicularly onto the rotation axis perpendicular plane includes rotary blade projection region S and airframe projection range V. The area of power reception surface projection range $W_3$ is represented by a variable $Aw_3$. The area of the opening surface of power reception antenna 2A is represented by a variable $Ar_3$. A region where power reception surface projection range $W_3$ overlaps with rotary blade projection range R is referred to as an interference region $K_3$. The area of interference region $K_3$ is represented by a variable $B_3$. The drag caused by descending airflow 17 in interference region $K_3$ is represented by a variable $F_3$. A ratio ($F_3/B_3$) obtained by dividing drag $F_3$ by interference area $B_3$ is referred to as a drag generation coefficient $\xi_3$.

In power reception antenna 2B, the following relationships with respect to the area are satisfied.

$$Ar_3 = Aw_3 > As > Av \quad (4B)$$

Here, interference area $B_3$ can be calculated as follows when radius $L_3$ of the circle on the bottom surface of power reception antenna 2B is determined.

when $L_3 \le \sqrt{(2)}*L_B - L_p$, $$B_3 = 0 \quad (16\text{-}1)$$

when $\sqrt{(2)}*L_B - L_p \le L_3 \le \sqrt{(2)}*L_B + L_p$, $$B_3 = 4*\cos^{-1}((2*L_B^2 + L_3^2 - L_p^2)/(2\sqrt{(2)}*L_B*L_3))*L_3^2 + 4*\cos^{-1}((2*L_B^2 + L_g^2 - L_3^2)/(2\sqrt{(2)}*L_B*L_p))*L_p^2 - 2*\sqrt{((\sqrt{(2)}*L_B + L_p)^2 - L_3^2)*(L_3^2 - (\sqrt{(2)}*L_B - L_p)^2)} \quad (16\text{-}2)$$

when $\sqrt{(2)}*L_B + L_p \le L_3$, $$B_3 = 4*\pi*L_p^2 \quad (16\text{-}3)$$

Wireless power transmission system 100B operates similarly to wireless power transmission system 100. In power reception antenna 2B, the rear surface that receives descending airflow 17 is formed into the conical surface, so that the drag is reduced as compared with power reception antenna 2 and power reception antenna 2A. Drag generation coefficient $\xi_3$ (=$F_3/B_3$) is smaller than $\xi_1$ and $\xi_2$ ($\xi_3 < \xi_2 < \xi_1$). Since the drag is reduced, the flight performance of drone 4B is improved. Alternatively, power reception antenna 2B can be larger than power reception antenna 2. In power reception antenna 2B, because the circular opening surface is disposed on the bottom surface, the effective opening area is substantially the same even when power transmission radio wave 5 comes from any direction, and beam transmission efficiency η is improved.

An air vent through which air passes may be provided in the opening surface of power reception antenna 2B. The air vent may also be provided on the rear surface having the conical surface such that air passes between the inside and the outside of power reception antenna 2B. A structure in which air flows through the opening surface and the rear surface, or a structure in which air passes through the rear surface and the rear surface may be provided. When drone 4 moves, the air resistance due to the power reception antenna is reduced by having the ventilation structure through which air passes between the inside and the outside of power reception antenna 2B. In addition, when wind blows, the wind force acting on power reception antenna can be reduced.

The above is also applied to other embodiments.

Fourth Embodiment

Figure 24:
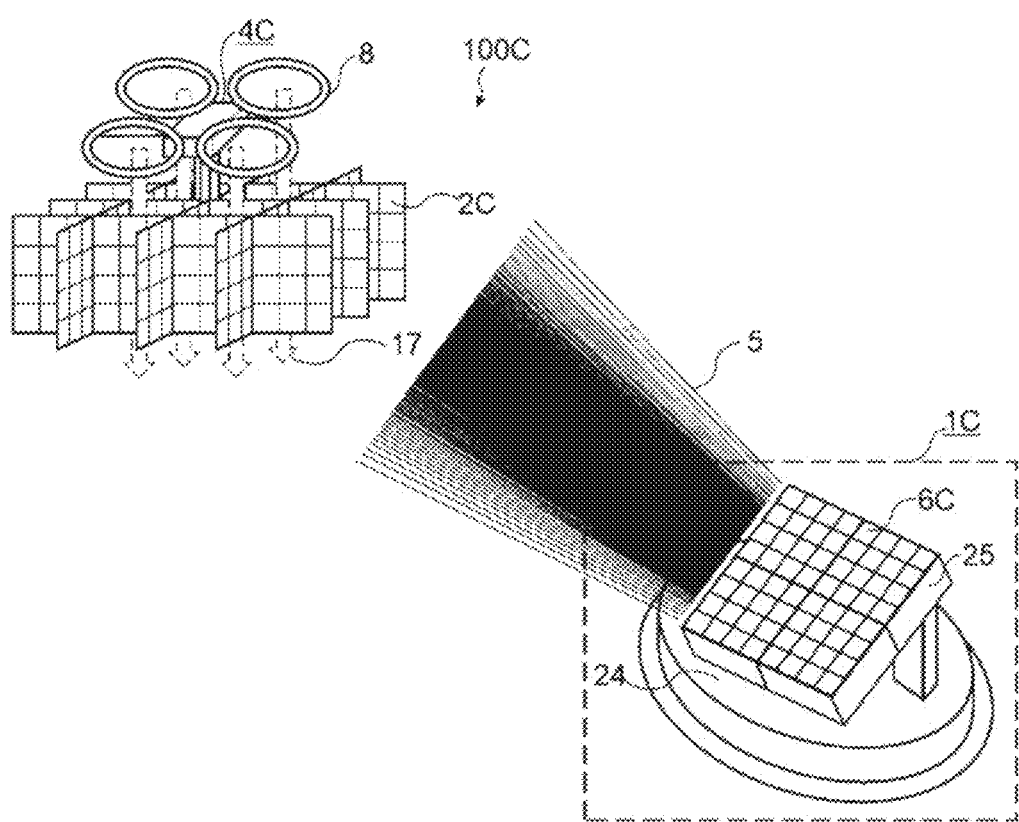
FIG. 24 is a perspective view illustrating a configuration of a power transmission system to an aerial moving body according to a fourth embodiment.
Figure 25:
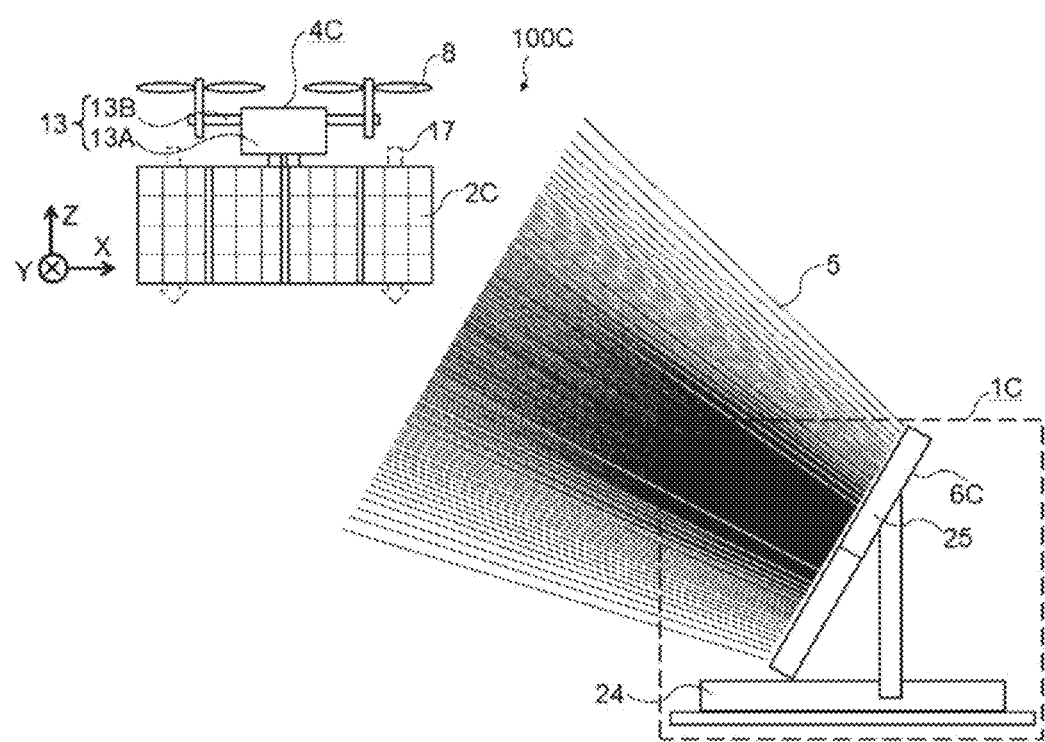
FIG. 25 is a front view illustrating the configuration of the power transmission system to the aerial moving body according to the fourth embodiment.
Figure 26:
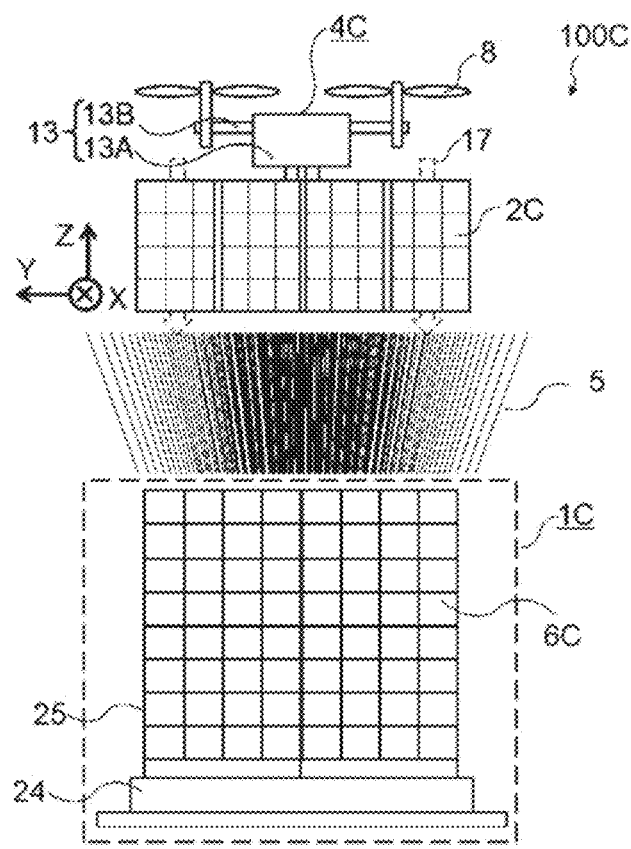
FIG. 26 is a side view illustrating the configuration of the power transmission system to the aerial moving body according to the fourth embodiment.
Figure 27:
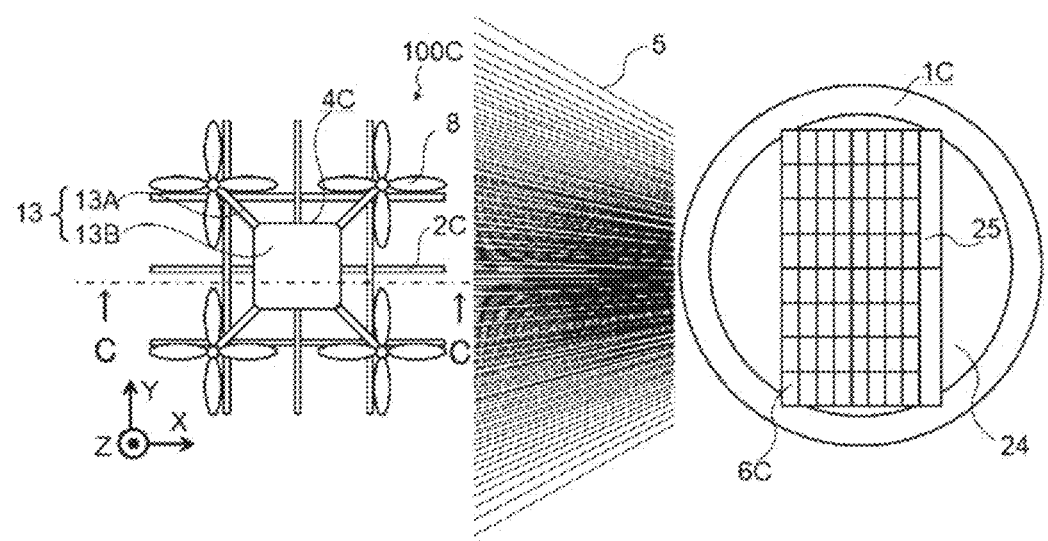
FIG. 27 is a plan view illustrating the configuration of the power transmission system to the aerial moving body according to the fourth embodiment.
Figure 28:
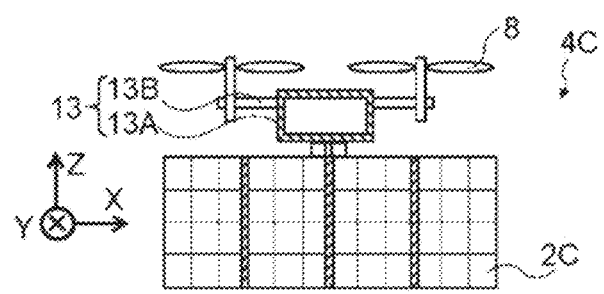
FIG. 28 is a sectional view illustrating the aerial moving body to which the power is transmitted by the power transmission system to the aerial moving body according to the fourth embodiment.
Figure 29:
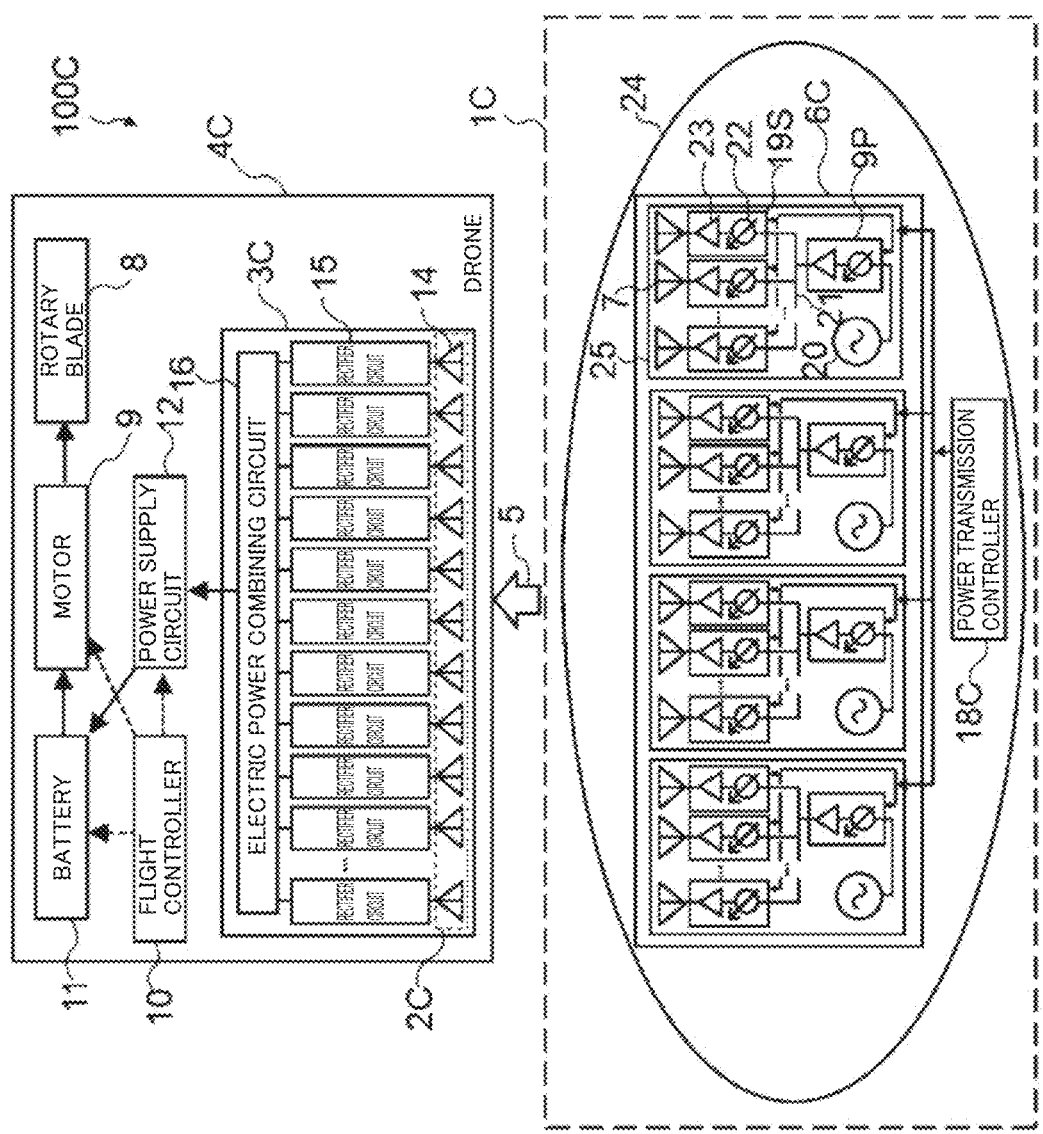
FIG. 29 is a block diagram illustrating a functional configuration of the power transmission system to the aerial moving body according to the fourth embodiment.

A fourth embodiment is the case where the power reception antenna includes a plurality of planar antennas provided substantially in parallel in the vertical direction. Substantially parallel is the case where an angular difference from parallel is less than or equal to about several degrees. In a power reception antenna 2C, the plurality of planar antennas are disposed in two directions orthogonal to each other on the horizontal plane. The plurality of planar antennas are disposed in each of two directions. In power reception antenna 2C, the planar antenna is disposed such that the side surface of the planar antenna forms a lattice pattern when viewed from the direction parallel to the rotation axis of the rotary blade. With reference to FIGS. 24 to 29, a configuration of a power transmission system to an aerial moving body according to the fourth embodiment is described. FIG. 24 is a perspective view illustrating the configuration of the power transmission system to the aerial moving body according to the fourth embodiment. FIGS. 25 to 27 are a front view, a side view, and a plan view illustrating the configuration of the aerial moving body to which the power is transmitted by the power transmission system to the aerial moving body according to the fourth embodiment. FIG. 28 is a sectional view illustrating the aerial moving body to which the power is transmitted. FIG. 28 is the sectional view taken along a line C-C shown in FIG. 27. FIG. 29 is a block diagram illustrating a functional configuration of the power transmission system to the aerial moving body according to the fourth embodiment.

A wireless power transmission system 100C includes mainly a power transmission device 1C and a drone 4C. A power reception device 3C including a power reception antenna 2C is mounted on drone 4C. In power reception antenna 2C, the area of the opening surface capable of receiving power transmission radio wave 5 increases when the power is transmitted from obliquely below. Power transmission device 1C has a structure in which power transmission radio wave 5 is radiated obliquely upward easily. FIGS. 24 to 27 illustrate the case where power transmission radio wave 5 is radiated obliquely upward from power transmission device 1C installed on the ground on the X-axis direction side with respect to drone 4C.

Power reception antenna 2C has a substantially rectangular parallelepiped outer shape. Power reception antenna 2C is configured by combining three planar antennas parallel to the XZ-plane and three planar antennas parallel to the YZ-plane in a lattice pattern when viewed from the Z-axis direction. Each planar antenna can receive power transmission radio wave 5 on both the front surface and the back surface. Power reception antenna 2C may include a planar antenna that can receive power transmission radio wave 5 only on one of the front surface and the back surface. In power reception antenna 2C, the opening surface is provided in parallel to the direction in which descending airflow 17 flows. Power reception antenna 2C generates almost no drag against descending airflow 17. Consequently, in power reception antenna 2C, the size of the opening surface can be designed without considering the influence on descending airflow 17.

In power reception antenna 2C, the direction parallel to the positive direction of the X-axis is a first front direction on the XY-plane (rotation axis perpendicular plane). A direction parallel to the positive direction of the Y-axis is a second front direction intersecting with the first front direction on the XY-plane. The angle with which the first front direction and the second front direction intersect may not be a right angle. A direction parallel to the negative direction of the X-axis is a first back direction being directed to a direction opposite to the first front direction. A direction parallel to the negative direction of the Y-axis is a second back direction being directed to a direction opposite to the second front direction. The opening surface of the planar antenna, which is parallel to the YZ-plane and is directed to the positive direction of the X-axis, is a first front direction power reception surface. The opening surface of the planar antenna, which is parallel to the XZ-plane and is directed to the positive direction of the Y-axis, is a second front direction power reception surface. The opening surface of the planar antenna, which is parallel to the YZ-plane and is directed to the negative direction of the X-axis, is a first back direction power reception surface provided on the surface opposite to the first front direction power reception surface. The opening surface of the planar antenna, which is parallel to the XZ-plane and is directed to the negative direction of the Y-axis, is a second back direction power reception surface provided on the surface opposite to the second front direction power reception surface.

As illustrated in FIG. 25, power reception antenna 2C includes 16 planar antennas arranged at the positions of the inner surfaces of the four rectangular tubes, 8 planar antennas arranged at the positions of the outer surfaces of the rectangular tubes, and 24 planar antennas arranged to protrude from the rectangular tube. The height of power reception antenna 2C is represented by a variable $H_4$. The length of one side of the inner surface of the rectangular tube is represented by a variable $L_4$, and the length of the planar antenna protruding from the rectangular tube is represented by a variable $L_{4S}$. In power reception antenna 2C, it is assumed that $L_{4S}=L_4$ is satisfied. In power reception antenna 2C, the planar antenna having the opening area of $L_4*H_4$ is referred to as a unit planar antenna. $L_4$ is referred to as a unit length. $H_4$ is referred to as a unit height. The number of unit planar antennas aligned in the X-axis direction or the Y-axis direction is referred to as a parallel number. In power reception antenna 2C, the planar antennas having six opening surfaces overlap completely when viewed from the direction parallel to the X-axis, and the planar antennas having six opening surfaces overlap completely when viewed from the direction parallel to the Y-axis. The power reception antenna may be provided such that at least a part of each of the plurality of planar antennas arranged in parallel overlaps each other when viewed from at least one of directions parallel to the X-axis and the Y-axis.

The area of the opening surface of power reception antenna 2C is represented by a variable $Ar_4$. The opening area $Ar_4$ can be calculated as follows. Power reception antenna 2C has the opening area corresponding to 48 unit planar antennas.

$$Ar_4=48*L_4*H_4 \tag{17}$$

In power reception antenna 2C, two planar antennas having a front and back positional relationship cannot receive power transmission radio wave 5 simultaneously. For this reason, the area of the maximum opening surface that can be used actually in power reception antenna 2C (referred to as an effective maximum opening area) is represented by a variable $Ar_{41}$. Opening area $Ar_{41}$ can be calculated as follows.

$$Ar_{41}=24*L_4*H_4 \tag{18}$$

Depending on the positional relationship between a power transmission antenna 6C and power reception antenna 2C, the planar antenna on the front side arranged in parallel shields the planar antenna on the back side. Shielding is studied later.

Power transmission device 1C includes power transmission antenna 6C, a rotary mount 24, and a power transmission controller 18C. Power transmission antenna 6C is installed on rotary mount 24 with the opening surface inclined. Rotary mount 24 rotates around a vertical azimuth rotation axis. Power transmission controller 18C controls power transmission antenna 6C and rotary mount 24 to change the azimuth angle in the orientation direction of power transmission antenna 6C.

Power transmission antenna 6C includes four power transmission antenna units 25. Four power transmission antenna units 25 are disposed close to each other, namely, two power transmission antenna units are disposed vertically and two power transmission antenna units are disposed horizontally. Four power transmission antenna units 25 constitute one power transmission antenna 6C. The power transmission antenna may be configured by two, three, five, or more of power transmission antenna units.

Power transmission antenna unit 25 includes two types of element modules 19 of a one-stage element module 19P and a two-stage element module 19S. Power transmission antenna unit 25 includes one transmission signal generator 20, a plurality of element power transmission antennas 7, one one-stage element module 19P, one distribution circuit 21, and a plurality of two-stage element modules 19S. The number of two-stage element modules 19S is the same as the number of element power transmission antennas 7. One-stage element module 19P and two-stage element module 19S have the same structure. One-stage element module 19P and two-stage element module 19S include phase shifter 22 and amplifier 23. The transmission signal outputted from transmission signal generator 20 is inputted to one-stage element module 19P. The transmission signal outputted from one-stage element module 19P is distributed by distribution circuit 21 and inputted to each two-stage element modules 19S. The transmission signal outputted from each two-stage element module 19S is inputted to one corresponding element power transmission antenna 7.

Power transmission device 1C includes rotary mount 24. Rotary mount 24 can rotate around the vertical azimuth rotation axis. Rotary mount 24 can rotate endlessly clockwise and counterclockwise. Power transmission antenna 6C is installed on rotary mount 24. Power transmission antenna 6C is installed on rotary mount 24 such that the opening surface forms the angle of, for example, 60 degrees with respect to the horizontal plane. When rotary mount 24 rotates, power transmission antenna 6C rotates. Power transmission controller 18C controls also rotary mount 24.

Rotary mount 24 is a power transmission antenna driving device that changes the radiation direction by rotating power transmission antenna 6C mechanically. Rotary mount 24 supports power transmission antenna 6C while being inclined with respect to a reference plane that is the horizontal plane. Rotary mount 24 rotates power transmission antenna 6C around the azimuth rotation axis that is the rotation axis perpendicular to the reference plane.

In wireless power transmission system 100C, drone 4C moves and hovers at a position where the elevation angle is in a determined range, for example, about 10 degrees to 50 degrees when viewed from power transmission antenna 6C. Drone 4C is present at the position at the elevation angle in the range determined with respect to power transmission antenna 6C, whereby power reception antenna 2C can receive more power transmission radio wave 5. In power reception antenna 2C, a plurality of opening surfaces being directed to the horizontal direction are disposed so as to overlap in the horizontal direction. Power transmission radio wave 5 radiated vertically upward from right below drone 4C cannot be received by power reception antenna 2C. Power transmission radio wave 5 radiated in the horizontal direction can be received only by one opening surface closest to power transmission device 1C included in power reception antenna 2C arranged in the direction in which power transmission radio wave 5 is radiated. Power reception antenna 2C can receive power transmission radio wave 5 radiated from obliquely below through the plurality of opening surfaces.

The amount of power transmission radio wave 5 that can be received by power reception antenna 2C is studied based on the positional relationship between power transmission antenna 6C and power reception antenna 2C. For ease of calculation, the following is assumed.

(A) For power reception antenna 2C, power transmission radio wave 5 is radiated from the direction parallel to the XZ-plane.

(B) Power transmission radio wave 5 is radiated parallel to the direction having elevation angle $\zeta$ on the XZ-plane.

The effective opening area considering the shielding in power reception antenna 2C is represented by a variable $A_{r4a}$. The projection effective opening area is an area obtained by projecting the effective opening area of the power reception antenna onto a plane perpendicular to the radiation direction of power transmission radio wave 5. The projection effective opening area of power reception antenna 2C is represented by a variable $A_{r4b}$.

When elevation angle $\zeta$ is determined, effective opening area As can be calculated as follows.

when $\zeta \leq \tan^{-1}(H_4/L_4)$, $$A_{r4a}=L_4*(4*H_4+8*L_4*\tan \zeta) \quad (19\text{-}1)$$

when $\tan^{-1}(H_4/L_4) \leq \zeta$, $$A_{r4a}=12*L_4*H_4 \quad (19\text{-}2)$$

The following relationship exists between projection effective opening area $A_{r4b}$ and effective opening area $A_{r4a}$.

$$A_{r4b}=A_{r4a}*\cos \zeta \quad (20)$$

The following equation is obtained by substituting the equation (20) into the equations (19-1), (19-2).

when $\zeta \leq \tan^{-1}(H_4/L_4)$, $$A_{r4b}=L_4*(4*H_4*\cos \zeta+8*L_4*\sin \zeta) \quad (21\text{-}1)$$

when $\tan^{-1}(H_4/L_4) \leq \zeta$, $$A_{r4b}=12*L_4*H_4*\cos \zeta \quad (21\text{-}2)$$

When the right sides of the equations (21-1), (21-2) are divided by $24*L_4*H_4$, the following is obtained.

when $\zeta \leq \tan^{-1}(H_4/L_4)$, $$A_{r4b}=(1/6)*\cos \zeta+(1/3)*(L_4/H_4)*\sin \zeta \quad (22\text{-}1)$$

when $\tan^{-1}(H_4/L_4) \leq \zeta$, $$A_{r4b}=(1/2)*\cos \zeta \quad (22\text{-}2)$$

Projection effective opening area $A_{r4b}$ calculated by the equations (22-1), (22-2) is referred to as a normalized projection effective opening area.

As another case, the case where the following is assumed is also studied.

(C) With respect to power reception antenna 2C, power transmission radio wave 5 is radiated from the direction parallel to the plane including the Z-axis and the straight line existing on the XY-plane and forming the angle of 45 degrees with respect to the X-axis (oblique XZ-plane).

(D) Power transmission radio wave 5 is radiated parallel to the direction having elevation angle $\zeta$ on the oblique XZ-plane.

The effective opening area of power reception antenna 2C when the above (C) and (D) are satisfied is represented by a variable $A_{r4c}$. The projection effective opening area is represented by a variable Ar4d.

When elevation angle $\zeta$ is determined, effective opening area $A_{r4c}$ can be calculated as follows.

when $\zeta \leq \tan^{-1}(H_4/(\sqrt{2})*L_4))$, $$A_{r4c}=L_4*(6*H_4+18\sqrt{(2)}*L_4*\tan \zeta) \quad (23\text{-}1)$$

when $\tan^{-1}(H_4/(\sqrt{(2)}*L_4)) \leq \zeta$, $$A_{r4c}=L_4*H_4*(24-9*(H_4/(\sqrt{(2)}*L_4*\tan \zeta))) \quad (23\text{-}2)$$

The following relationship exists between projection effective opening area $A_{r4d}$ and effective opening area $A_{r4c}$.

$$A_{r4d}=A_{r4c}*(1/\sqrt{(2)})*\cos \zeta \quad (24)$$

The following equation is obtained by substituting the equation (24) into the equations (23-1), (23-2).

when $\zeta \leq \tan^{-1}(H_4/(\sqrt{(2)}*L_4))$, $$A_{r4d}=L_4*((6/\sqrt{(2)})*H_4*\cos \zeta+9*L_4*\sin \zeta) \quad (25\text{-}1)$$

when $\tan^{-1}(H_4/(/(2)*L_4)) \leq \zeta$, $$A_{r4d}=L_4*H_4*(12\sqrt{(2)}-(9/2)*(H_4/(L_4*\tan \zeta)))*\cos \zeta \quad (25\text{-}2)$$

When the right sides of the equations (25-1), (25-2) are divided by $24*L_4*H_4$ and normalized, the following is obtained.

when $\zeta \leq \tan^{-1}(H_4/(\sqrt{(2)}*L_4))$, $$A_{r4d}=(1/4\sqrt{(2)})*\cos \zeta+(3/8)*(L_4/H_4)*\sin \zeta \quad (26\text{-}1)$$

when $\tan^{-1}(H_4/(\sqrt{(2)}*L_4)) \leq \zeta$, $$A_{r4d}=((1/\sqrt{(2)})-(3/16)*(H_4(L_4*\tan \zeta)))*\cos \zeta \quad (26\text{-}2)$$

Figure 30:
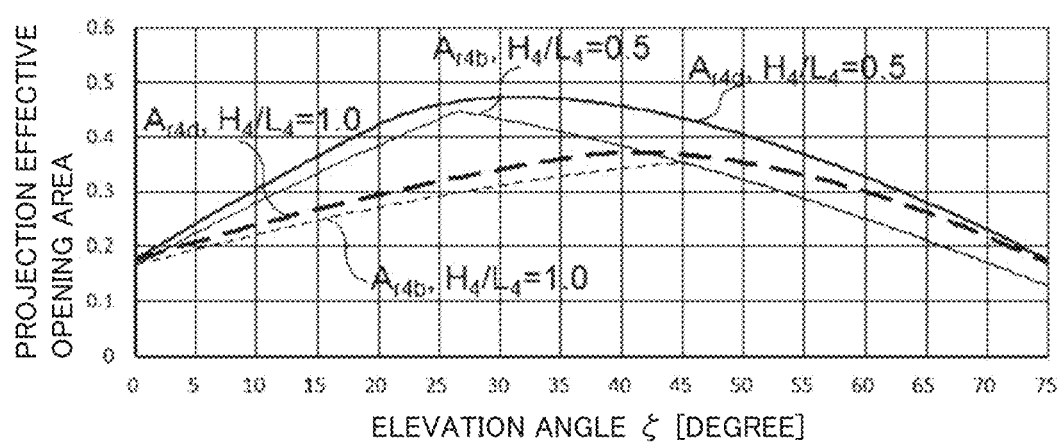
FIG. 30 is a graph illustrating a change in a projection effective opening area with respect to a change in an elevation angle in a power reception antenna included in the aerial moving body to which the power is transmitted by the power transmission system to the aerial moving body according to the fourth embodiment.

FIG. 30 is a graph illustrating changes in normalized projection effective opening areas $A_{r4b}$ and $A_{r4d}$ with respect to the change in elevation angle ζ in cases where $H_4/L_4=0.5$ is satisfied or $H_4/L_4=1.0$ is satisfied. The thick solid line is a graph representing the change in $A_{r4b}$ for the case where $H_4/L_4=0.5$ is satisfied. The thin solid line is a graph representing the change in $A_{r4b}$ for the case where $H_4/L_4=0.5$ is satisfied. The thick long dashed line is a graph representing the change in $A_{r4d}$ for the case where $H_4/L_4=1.0$ is satisfied. The thin long dashed line is a graph representing the change in $A_{r4b}$ for the case where $H_4/L_4=1.0$ is satisfied. When the direction on the XY-plane in which power transmission radio wave 5 is radiated is changed in cases in which the values of $H_4/L_4$ and ζ are determined, $A_{r4b}$ is the minimum value of the projection effective opening area, and $A_{r4d}$ is the maximum value of the projection effective opening area. The projection effective opening area of power reception antenna 2C when power transmission radio wave 5 is incident on power reception antenna 2C from the direction inclined with respect to the X-axis and the Y-axis is a value existing in a region sandwiched between $A_{r4d}$ and $A_{r4b}$. It is assumed that power transmission radio waves 5 are radiated parallel in calculating the projection effective opening area. In reality, distance D between power transmission antenna 6C and power reception antenna 2C may be a distance that is recognized as a near field, and sometimes power transmission radio wave 5 may be diffused and radiated. When power transmission radio wave 5 is diffused and radiated, a shielding rate is larger than the value described here. In the calculation equation described here, even when distance D is less than the upper limit of the near field, it is estimated that an error is not large in a range not largely apart from the upper limit.

As can be seen from FIG. 30, in power reception antenna 2C, when the opening area ($L_4 \ast H_4$) of the unit planar antenna constituting the power reception antenna is the same, the projection effective opening area is increased when $H_4/L_4$ is small. The dimension (referred to as XY-dimension) of the power reception antenna viewed from the rotation axis direction is determined depending on the size of the drone. Unit length $L_4$ is determined from the XY-dimension and the parallel number. The XY-dimensions, the parallel number, unit length $L_4$, and unit height $H_4$ are determined such that the projection effective opening area is as large as possible. Although the X-axis length and the Y-axis length of the power reception antenna are the same, they may be different. At least one of unit length $L_4$, unit height $H_4$, and the parallel number may be different in the X-axis direction and the Y-axis direction. A planar antenna having a shape different from that of the unit planar antenna may be provided. At least one of the length and the height may change for each divided planar antenna.

Normalized $A_{r4d}$ when length $L_{4s}$ of the planar antenna protruding from the part constituting the rectangular tube is changed in power reception antenna 2C is studied. $A_{r4b}$ in the case where $L_{4s}=0$ is satisfied can be calculated by the following equations. $A_{r4b}$ does not change even when the value of $L_{4s}$ changes.

when $\zeta \leq \tan^{-1}(H_4/(\sqrt{2} \ast L_4))$, $$A_{r4d}=(1/3\sqrt{2})\ast\cos\zeta+(1/3)\ast(L_4 H_4)\ast\sin\zeta \quad (27\text{-}1)$$

when $\tan^{-1}(H_4/(\sqrt{2}\ast L_4)) \leq \zeta$, $$A_{r4d}=((1/\sqrt{2}))-(1/6)\ast(H_4/(L_4\ast\tan\zeta)))\ast\cos\zeta \quad (27\text{-}2)$$

$A_{r4d}$ in the case where $L_{4s}=L_4/2$ is satisfied can be calculated by the following equations.

when $\zeta \leq \tan^{-1}(H_4/(\sqrt{2}\ast L_4))$, $$A_{r4d}=(5\sqrt{2}/36)\ast\cos\zeta+(7/24)\ast(L_4 H_4)\ast\sin\zeta \quad (28\text{-}1)$$

when $\tan^{-1}(H_4/(\sqrt{2}\ast L_4))\leq\zeta$ and $\zeta\leq\tan^{-1}((\sqrt{2}\ast H_4)/L_4)$, $$A_{r4d}=((13\sqrt{2}/36)-(1/9)\ast(H_4/(L_4\ast\tan\zeta)))\ast\cos\zeta+(5/72)\ast(L_4/H_4)\ast\sin\zeta \quad (28\text{-}2)$$

when $\tan^{-1}((\sqrt{2}\ast H_4)/L_4)\leq\zeta$, $$A_{r4d}=((1/\sqrt{2})-(1/4)\ast(H_4/(L_4\ast\tan\zeta)))\ast\cos \quad (28\text{-}3)$$

Figure 31:
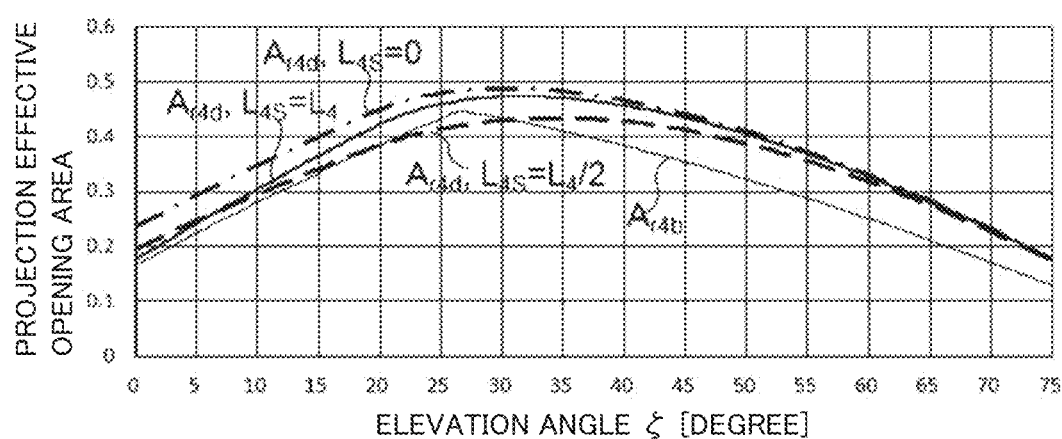
FIG. 31 is a graph illustrating the change in the projection effective opening area with respect to the change in the elevation angle in a case of different lengths of planar antennas protruding from a rectangular tube in the power reception antenna included in the aerial moving body to which the power is transmitted by the power transmission system to the aerial moving body according to the fourth embodiment.

FIG. 31 is a graph illustrating the change in the projection effective opening area with respect to the change in the elevation angle when the lengths of the planar antennas protruding from the rectangular tube in power reception antenna 2C are different. FIG. 31 illustrates the graph with respect to the change in elevation angle ζ of $A_{r4b}$ and $A_{r4d}$ in the cases where $L_{4s}=L_4$, $L_{4s}=L_4/2$, or $L_{4s}=0$ and $H_4/L_4=0.5$ are satisfied. $A_{r4b}$ is indicated by a thin solid line. $A_{r4d}$ is indicated by the thick solid line in the case where $L_{4s}=L_4$ is satisfied, by the alternate long and short dash line in the case where $L_{4s}=0$ is satisfied, and by a long broken line in the case where $L_{4s}=L_4/2$ is satisfied. Regardless of the value of elevation angle ζ, $A_{r4d}$ is maximized when $L_{4s}=0$ is satisfied. In addition, when ζ is greater than about 8 degrees is satisfied, $A_{r4d}$ in the case where $L_{4s}=L_4$ is satisfied is larger than $A_{r4d}$ in the case where $L_{4s}=L_4/2$ is satisfied. In power reception antenna 2C, $A_{r4d}$ increases as the ratio of the area of the part that has no possibility to be shielded by another planar antenna increases.

Figure 32:
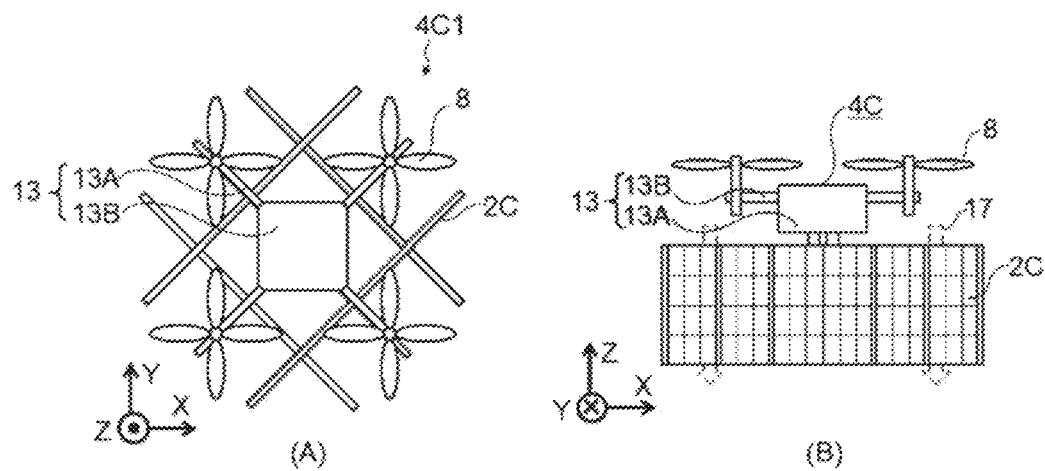
FIG. 32 is a plan view and a front view illustrating a configuration of a first modification of the aerial moving body to which the power is transmitted by the power transmission system to the aerial moving body according to the fourth embodiment.

In drone 4C shown in FIGS. 24 to 27, power reception antenna 2C is connected to airframe 13 such that the opening surfaces are parallel to the X-axis or the Y-axis. The angle between the opening surface of power reception antenna 2C and airframe 13 on the XY-plane may not be the angle shown in FIG. 27 or the like. For example, a drone 4C1 in which the opening surface of power reception antenna 2C forms the angle of 45 degrees with the X-axis and the Y-axis is referred to as a first modification of drone 4C. FIG. 32 is a plan view and a front view of drone 4C1. FIG. 32(A) is the plan view of drone 4C1, and FIG. 32(B) is the front view of drone 4C1. Drone 4C1 can receive power transmission radio wave 5 similarly to drone 4C.

In power reception antenna 2C, the planar antennas aligned in the X-axis direction and the Y-axis direction have the same height. The power reception antenna may include planar antennas having different heights. The lower ends of the aligned planar antennas may be aligned, and the height of the planar antenna at a position that is not shielded may be made higher than the height of the planar antenna to be shielded. The height of the planar antenna disposed at the center position in at least one of the X-axis direction and the Y-axis direction may be increased such that the lower end is positioned lower than the other. In that case, the planar antenna may not be disposed at the position shielded by the planar antenna at the central position.

Figure 33:
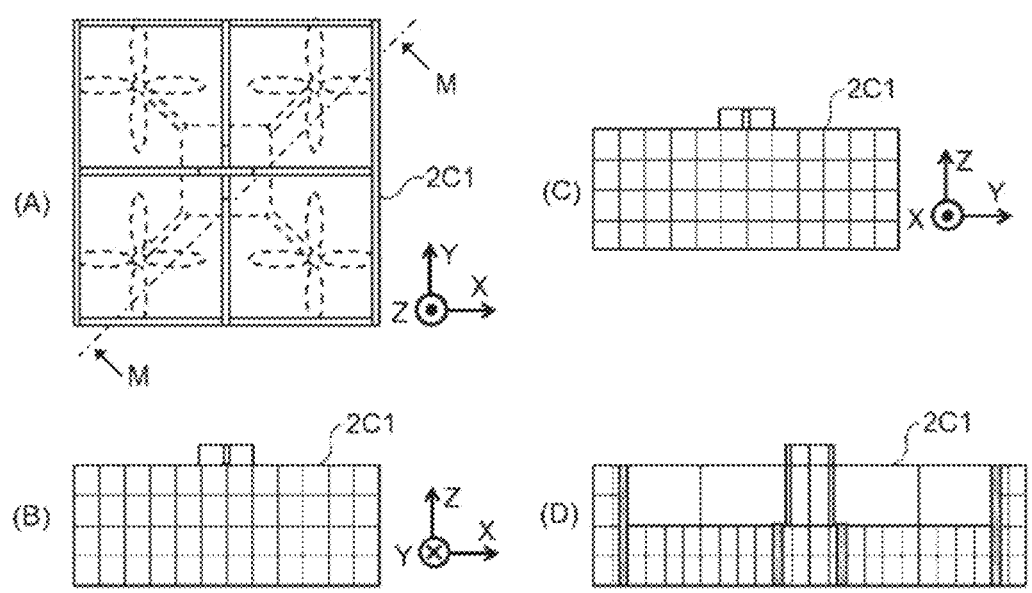
FIG. 33 is a view illustrating a configuration of a first modification of a power reception antenna included in the aerial moving body to which the power is transmitted by the power transmission system to the aerial moving body according to the fourth embodiment.

Two modifications of power reception antenna 2C is described. FIG. 33 illustrates a power reception antenna 2C1 of the first modification. In power reception antenna 2C1, only four rectangular tubes are formed by the planar antennas. Power reception antenna 2C1 is the case where the height of the planar antenna is lowered in the shielded portion existing on the inner surface of the rectangular tube. FIG. 33(A) is plan view, FIG. 33(B) is a front view, FIG. 33(C) is a side view, and FIG. 33(D) is a sectional view. FIG. 33(D) is the sectional view taken along a line M-M shown in FIG. 33(C). The XY-dimension and the height of power reception antenna 2C1 are the same as those of power reception antenna 2C. Because power reception antenna 2C1 does not include the planar antenna protruding from the rectangular tube, unit length $L_4$ of power reception antenna 2C1 is twice the value of power reception antenna 2C. In FIG. 33(A), airframe 13 and rotary blade 8 are indicated by broken lines.

Figure 34:
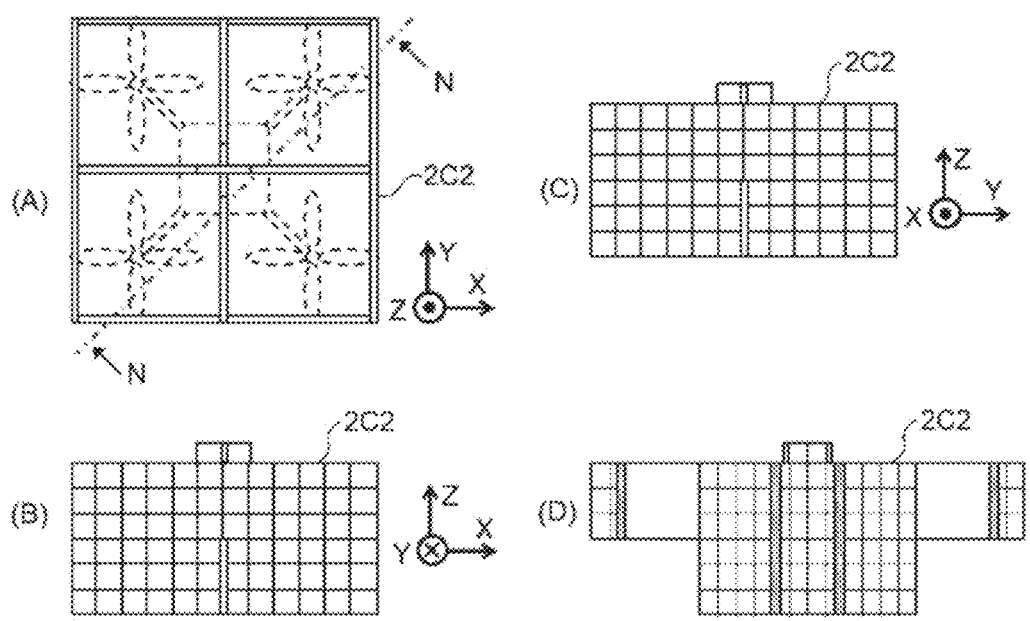
FIG. 34 is a view illustrating a configuration of a second modification of the power reception antenna included in the aerial moving body to which the power is transmitted by the power transmission system to the aerial moving body according to the fourth embodiment.

FIG. 34 illustrates a power reception antenna 2C2 according to a second modification. The XY-dimension of power reception antenna 2C2 is the same as that of power reception antenna 2C1. Power reception antenna 2C2 is higher than power reception antenna 2C1. In power reception antenna 2C2, the length in the Z-direction of the planar antenna disposed at the central position in the X-axis direction and the Y-axis direction is made long, and the lower end of planar antenna 2C2 protrudes below the planar antennas of the other portions. FIG. 34(A) illustrates a plan view, FIG. 34(B) illustrates a front view, FIG. 34(C) illustrates a side view, and FIG. 34(D) illustrates a sectional view. FIG. 34(D) is the sectional view taken along a line N-N shown in FIG. 34(C). In the front view shown in FIG. 34(B) and the side view shown in FIG. 34(C), the side surface of the planar antenna can be seen at the central position in the drawing of power reception antenna 2C2 in the lower half of power reception antenna 2C2.

In power reception antennas 2C1, 2C2, the ratio of planar antennas that are never shielded is larger than that in the case of power reception antenna 2C. Accordingly, the normalized projection effective opening areas in power reception antennas 2C1, 2C2 are larger than that in power reception antenna 2C.

Figure 35:
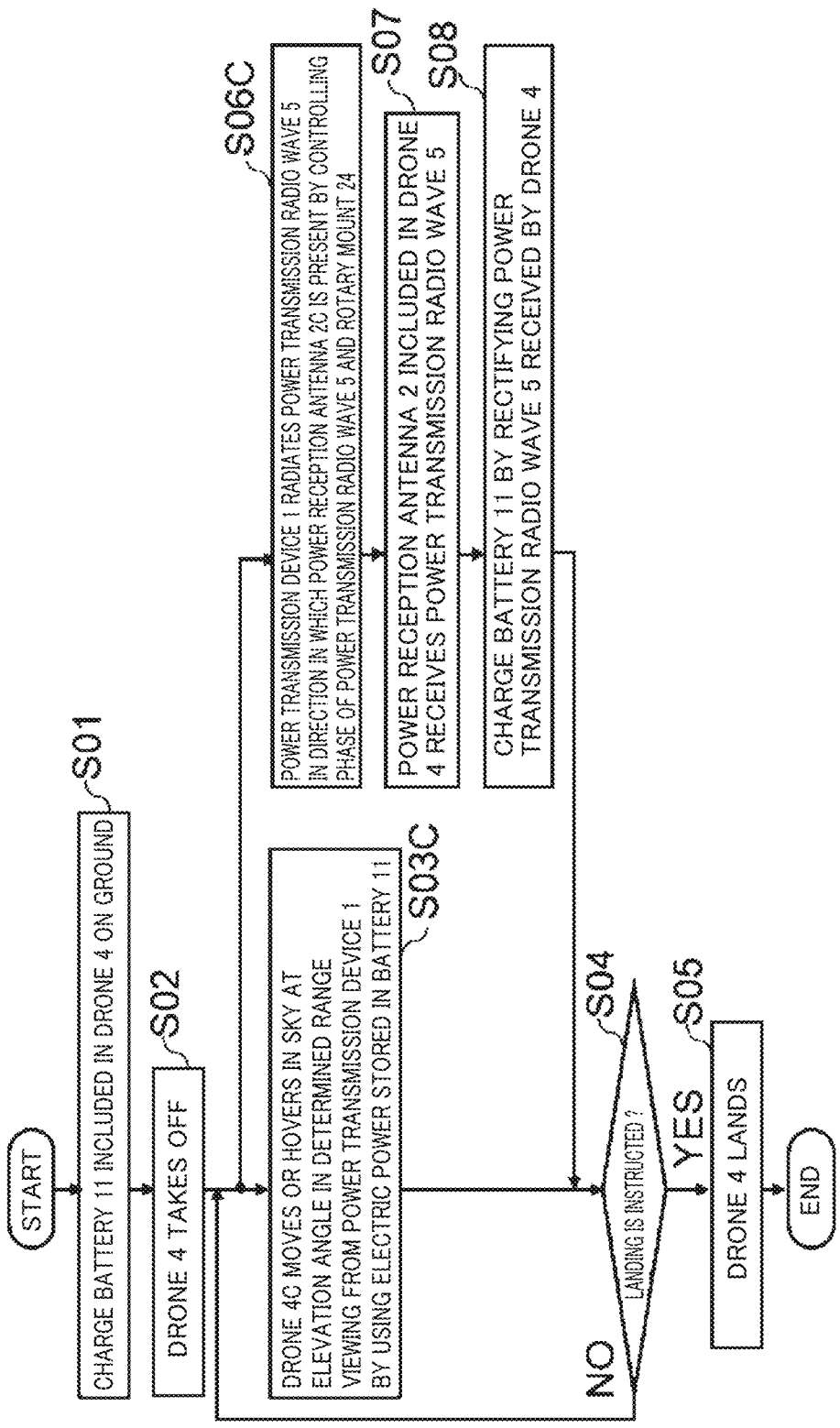
FIG. 35 is a flowchart illustrating a procedure for transmitting the power wirelessly to the aerial moving body by the power transmission system to the aerial moving body according to the fourth embodiment.

The operation is described. FIG. 35 is a flowchart illustrating a procedure for transmitting the power wirelessly to the aerial moving body by the power transmission device of the fourth embodiment. In FIG. 35, points different from FIG. 9 of the first embodiment are described. In step S03C, drone 4C moves or hovers in the sky at the elevation angle in the determined range viewing from power transmission device 1C using the electric power stored in battery 11. In step S06C, power transmission device 1C controls the azimuth angle of a rotation frame 52 and the phase of power transmission radio wave 5, and radiates power transmission radio wave 5 in the direction in which power reception antenna 2C included in drone 4C is present.

Drone 4C includes power reception antenna 2C having the opening area larger than the conventional opening area. When the electric power to be received by drone 4C is larger than the electric power to be consumed, drone 4 can fly until the required work is completed no matter how long the time is taken. Even when the electric power to be consumed is larger than the electric power to be received, drone 4D can extend the continuous flight time as compared with the case where the wireless power transmission is not performed during the flight.

In power reception antenna 2C, the plurality of planar antennas provided substantially parallel to the vertical direction constitute a quadrangular tube. The quadrangular tube is a tube having a quadrangular section. In power reception antenna 2C, the section of the quadrangular tube formed by the planar antenna is a square. The section of the quadrangular tube may be a rectangle, a parallelogram, a trapezoid, or any quadrangle. The planar antenna may constitute a triangular tube or a hexagonal tube. Although a dead space is generated, an octagonal tube having an octagonal section may be formed. The power reception antenna includes the plurality of planar antennas provided substantially parallel to the vertical direction, but may have a shape that does not form the tube.

The above is also applied to other embodiments.

Figure 36:
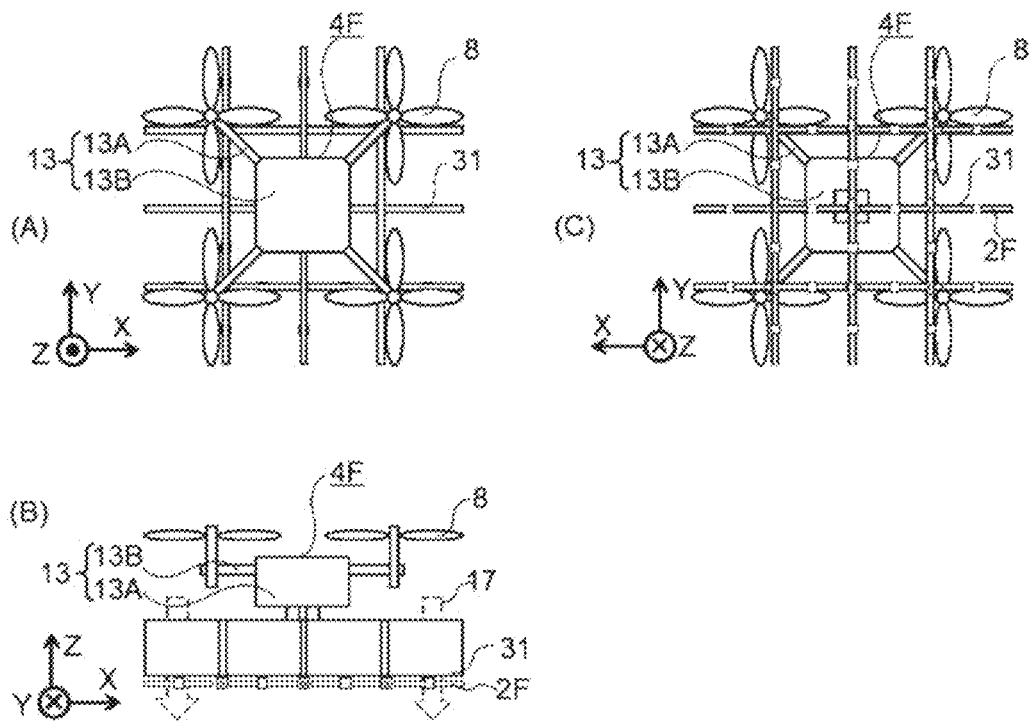
FIG. 36 is a view illustrating a configuration of a second modification of the aerial moving body to which the power is transmitted by the power transmission system to the aerial moving body according to the fourth embodiment.

A second modification of aerial moving body 4C is described. In an aerial moving body 4F, a board 31 provided with a rectifier circuit and the like is disposed substantially parallel to the rotation axis direction (vertical direction), and a linear power reception antenna 2F connected to the lower side surface of the board is provided. A power reception device 3F including power reception antenna 2F is mounted on aerial moving body 4F. Power reception antenna 2F receives power transmission radio wave 5 transmitting the electric power. Board 31 and power reception antenna 2F are disposed in a lattice pattern when viewed from the rotation axis direction. FIG. 36 is a view illustrating a configuration of aerial moving body 4F that is the second modification of aerial moving body 4C. FIG. 36(A) is a plan view, FIG. 36(B) is a front view, and FIG. 36(C) is a bottom view. Boards 31 are provided in the lattice pattern substantially parallel to the rotation axis direction (vertical direction). At the lower end of board 31, linear power reception antenna 2F exists in parallel to the direction in which the lower end of board 31 extends. Power reception antenna 2F is a rod-shaped antenna having a circular section. The length of power reception antenna 2F is slightly shorter than the interval of one lattice of the lattice pattern formed by boards when viewed from the side. A central portion of power reception antenna 2F is fixed to a lower side surface of board 31. Board 31 and power reception antenna 2F do not obstruct the descending airflow generated by rotary blades 8.

To aerial moving body 4F, the power is transmitted wirelessly in the same procedure as aerial moving body 4C.

When viewed from the rotation axis direction, the side surface of the board may form a lattice or honeycomb structure having a rhombus shape or a rectangular shape. The plurality of boards 31 may be provided in parallel. The plurality of boards 31 may be arranged substantially parallel to the rotation axis direction, and the linear power reception antenna may be provided in parallel to board 31 on the lower side surface of board 31. The plurality of boards 31 may be arranged such that board 31 is directed to the first direction on the XY-plane perpendicular to the rotation axis direction and board 31 is directed to the second direction that is a direction intersecting with the first direction on the XY-plane exist.

Fifth Embodiment

Figure 37:
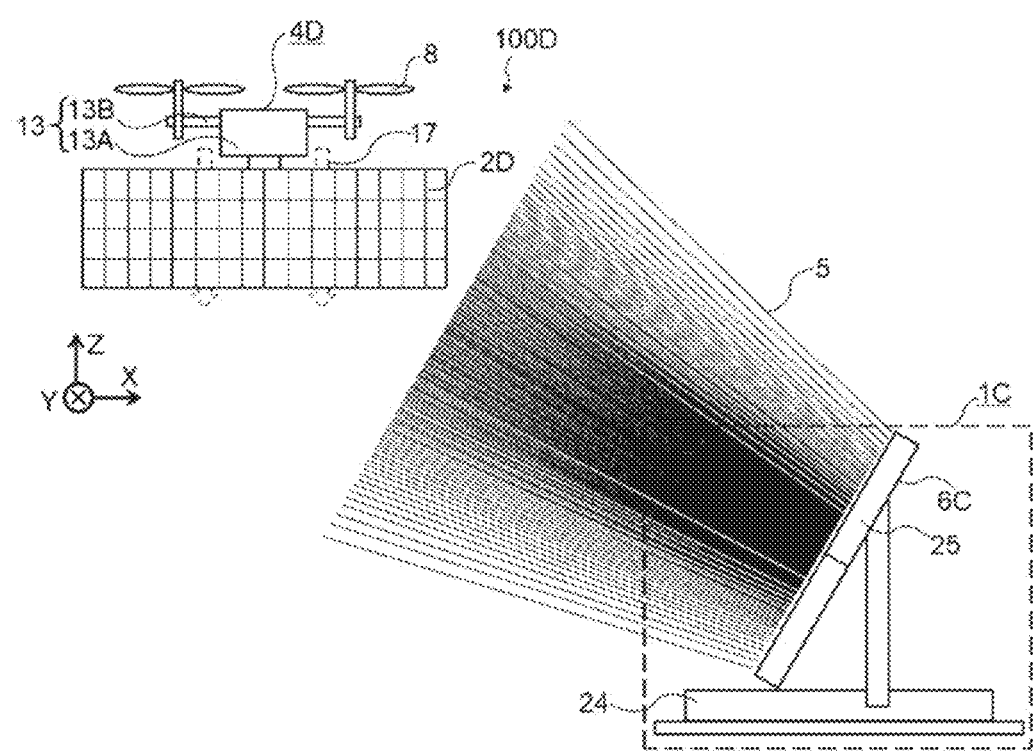
FIG. 37 is a front view illustrating a configuration of an aerial moving body to which the power is transmitted by a power transmission system to the aerial moving body according to a fifth embodiment.
Figure 38:
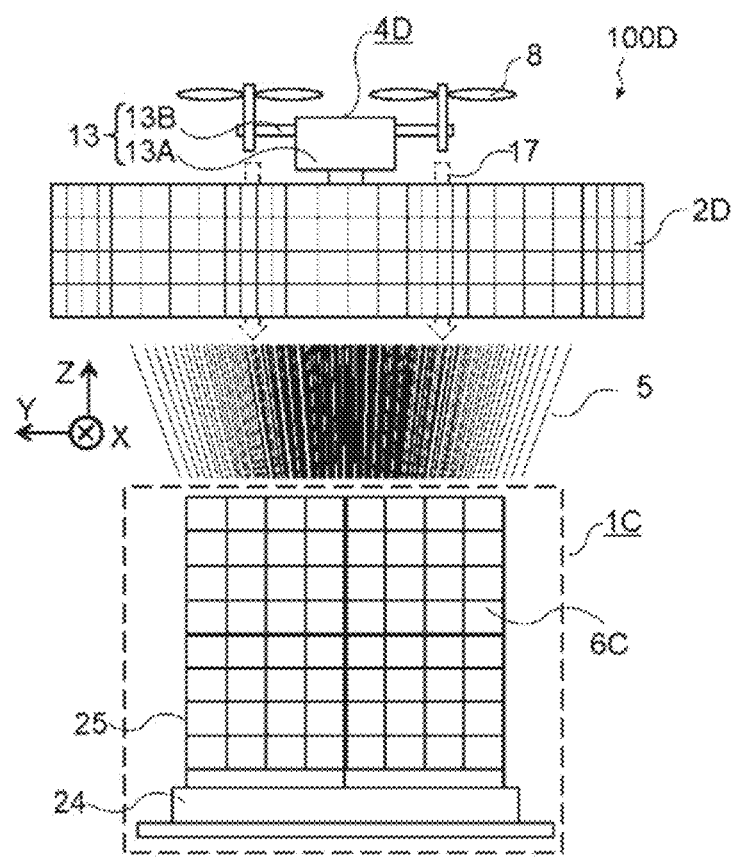
FIG. 38 is a side view illustrating the configuration of the aerial moving body to which the power is transmitted by the power transmission system to the aerial moving body according to the fifth embodiment.
Figure 39:
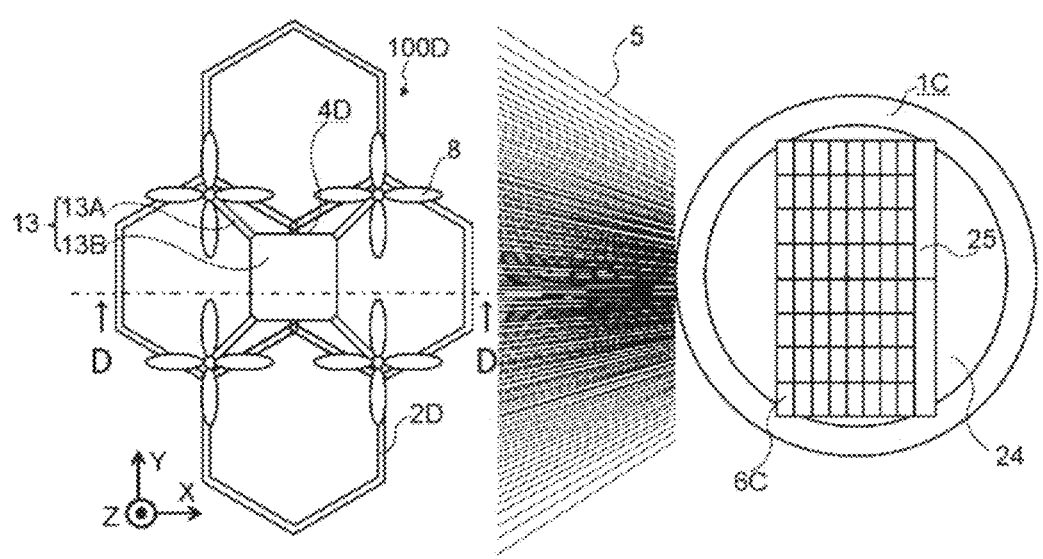
FIG. 39 is a plan view illustrating the configuration of the aerial moving body to which the power is transmitted by the power transmission system to the aerial moving body according to the fifth embodiment.
Figure 40:
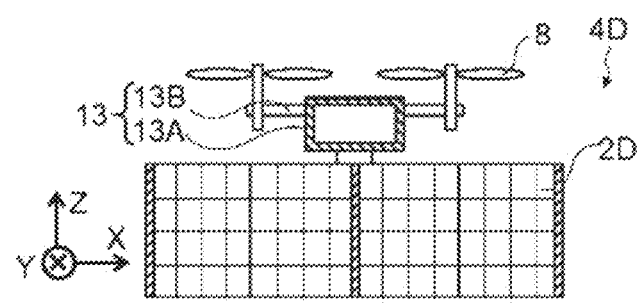
FIG. 40 is a sectional view illustrating the configuration of the aerial moving body to which the power is transmitted by the power transmission system to the aerial moving body according to the fifth embodiment.

A fifth embodiment is a case where the power reception antenna is configured by arranging a plurality of planar antennas provided substantially parallel to the vertical direction in a honeycomb shape when viewed from the direction parallel to the rotation axis of the rotary blade. With reference to FIGS. 37 to 40, a configuration of a power transmission system to an aerial moving body according to the fifth embodiment is described. FIGS. 37 to 39 are a front view, a side view, and a plan view illustrating the configuration of the aerial moving body to which the power is transmitted by the power transmission system to the aerial moving body according to the fifth embodiment. FIG. 40 is a sectional view illustrating the aerial moving body to which the power is transmitted. FIG. 40 is the sectional view taken along a line D-D shown in FIG. 39.

A wireless power transmission system 100D includes mainly a power transmission device 1C and a drone 4D. A power reception device 3D including a power reception antenna 2D is mounted on drone 4D. FIGS. 37 to 39 illustrate the case where the positional relationship between drone 4D and power transmission device 1C is the same as the positional relationship between drone 4C and power transmission device 1C shown in FIGS. 24 to 27.

Power reception antenna 2D has the honeycomb structure. Power reception antenna 2D is configured by combining seven planar antennas parallel to the YZ-plane, six planar antennas parallel to the plane including the Z-axis and the straight line that exists on the XY-plane and forms the angle of 60 degrees (+60 degrees) counterclockwise with the positive direction of the X-axis, and six planar antennas parallel to the plane including the Z-axis and the straight line that exists on the XY-plane and forms the angle of 60 degrees (−60 degrees) clockwise with the positive direction of the X-axis so as to have the honeycomb structure when viewed from the direction of the Z-axis. Each planar antenna can receive power transmission radio wave 5 on both the front surface and the back surface.

The seven planar antennas parallel to the YZ-plane are divided into three sets of two, three, and two when viewed from the direction parallel to the X-axis, and the planar antennas of each set overlap completely. The six planar antennas parallel to the plane including the Z-axis and the straight line that exists on the XY-plane and forms the angle of +60 degrees with the positive direction of the X-axis are divided into two sets of three, and when viewed from the direction forming the angle of +60 degrees with the positive direction of the X-axis on the XY-plane, the planar antennas of each set overlap completely. The six planar antennas parallel to the plane including the Z-axis and the straight line that exists on the XY plane and forms the angle of −60 degrees with the positive direction of the X-axis are divided into two sets of three, and when viewed from the direction forming the angle of −60 degrees with the positive direction of the X-axis on the XY-plane, the planar antennas of each set overlap completely.

Power reception antenna 2D may include a planar antenna that can receive power transmission radio wave 5 only on one of the front surface and the back surface. In power reception antenna 2D, the opening surface of each planar antenna is provided in parallel to the direction in which descending airflow 17 flows. Power reception antenna 2D generates almost no drag against descending airflow 17. Consequently, in power reception antenna 2D, the size of the opening surface can be designed without considering the influence on descending airflow 17. Power reception antenna 2D may have the opening surface that does not form the honeycomb structure.

In power reception antenna 2D, the direction parallel to the positive direction of the X-axis is the first front direction on the XY-plane (rotation axis perpendicular plane). The direction forming the angle of 60 degrees (+60 degrees) counterclockwise with the positive direction of the X-axis on the XY-plane is the second front direction. The direction forming the angle of 60 degrees (−60 degrees) clockwise with the positive direction of the X-axis on the XY-plane is the third front direction. The direction opposite to the first front direction is the first back direction on the XY-plane. The direction opposite to the second front direction is the second back direction on the XY-plane. The direction opposite to the third front direction is a third back direction on the XY-plane. The opening surface of the planar antenna that is parallel to the YZ-plane and is directed to the positive direction (first front direction) of the X-axis is the first front direction power reception surface. The opening surface of the planar antenna that is parallel to the YZ-plane and is directed to the negative direction (first back direction) of the X-axis is the first back direction power reception surface. The opening surface of the planar antenna being directed to the second front direction is the second front direction power reception surface. The opening surface of the planar antenna being directed to the second back direction is the second back direction power reception surface. The second front direction power reception surface and the second back direction power reception surface are opening surfaces on the front side and the back side of the planar antenna parallel to the plane including the Z-axis and forming the angle of −60 degrees with respect to the YZ-plane. The opening surface of the planar antenna being directed to the third front direction is a third front direction power reception surface. The opening surface of the planar antenna being directed to the third back direction is a third back direction power reception surface. The third front direction power reception surface and the third back direction power reception surface are opening surfaces on the front side and the back side of the planar antenna parallel to the plane including the Z-axis and forming the angle of +60 degrees with the YZ-plane.

In power reception antenna 2D, the first front direction and the second front direction form the angle of 60 degrees with each other on the XY-plane. The first front direction and the second front direction may be directions intersecting with each other on the XY-plane. In power reception antenna 2D, the first front direction and the third front direction form the angle of 60 degrees with each other on the XY-plane. The first front direction and the third front direction may be directions intersecting with each other on the XY-plane. The first front direction power reception surface and the second front direction power reception surface may be power reception surfaces adjacent to each other. The third front direction power reception surface may be the power reception surface adjacent to the first front direction power reception surface on the side opposite to the side where the first front direction power reception surface and the second front direction power reception surface are adjacent to each other. When viewed from at least one of the first front direction, the second front direction, and the third front direction, the plurality of planar antennas being directed to the direction may be provided such that the at least a part of each of the plurality of planar antennas overlaps each other.

Figure 41:
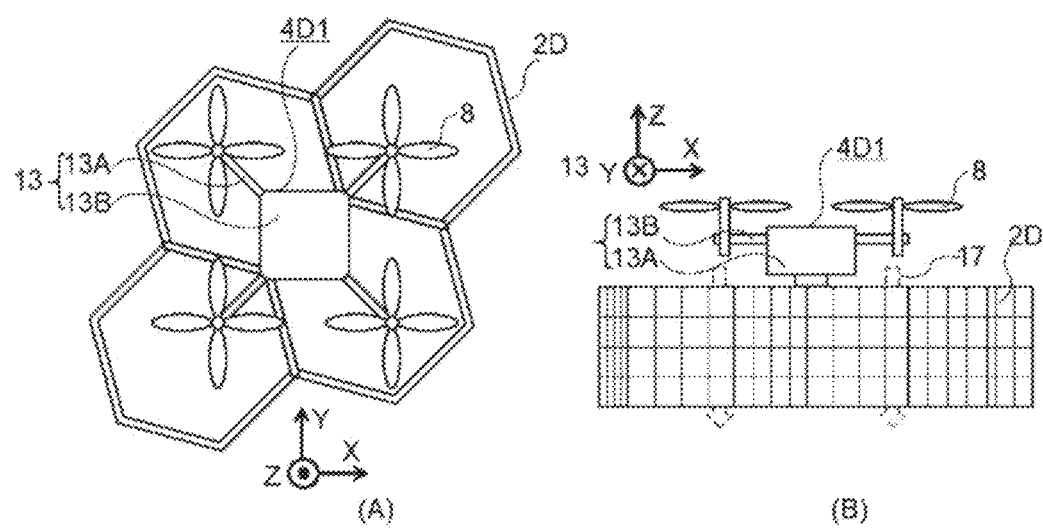
FIG. 41 is a plan view and a front view illustrating a configuration of a modification of the aerial moving body to which the power is transmitted by the power transmission system to the aerial moving body according to the fifth embodiment.

Power reception antenna 2D may change the angle on the XY-plane with respect to airframe 13. When power reception antenna 2D is rotated clockwise by 45 degrees around the Z-axis as compared with the case shown in FIG. 39 and the like, a drone 4D1 shown in FIG. 41 is obtained. FIG. 41 is a plan view and aside view illustrating a configuration of a modification of the aerial moving body to which the power is transmitted in the fifth embodiment. FIG. 41(A) is a plan view of drone 4D1. FIG. 41(B) is a front view of drone 4D1. In drone 4D1, descending airflow 17 generated by rotary blades 8 flows while being divided into four hexagonal tubes included in power reception antenna 2D. In drone 4D1, the drag caused by descending airflow 17 is smaller than that of drone 4D.

As illustrated in FIG. 39, power reception antenna 2D includes 24 planar antennas arranged at positions on inner surfaces of the four hexagonal tubes and 14 planar antennas arranged at positions on outer surfaces of the hexagonal tubes. The length of one side of the inner surface of the hexagonal tube is represented by a variable $L_5$. The height of power reception antenna 2D is represented by a variable $H_5$. The area of the opening surface of power reception antenna 2D is represented by a variable $Ar_5$. Opening area $Ar_5$ can be calculated as follows.

$$Ar_5 = 38 * L_5 * H_5 \tag{29}$$

Power transmission radio wave 5 is radiated from one direction, so that the power can be received by only one of the two planar antennas having the front and back positional relationship. The effective maximum opening area of power reception antenna 2D is represented by a variable $Ar_{51}$. Opening area $Ar_{51}$ can be calculated as follows.

$$Ar_{51} = 19 * L_5 * H_5 \tag{30}$$

Depending on the positional relationship between power transmission antenna 6C and power reception antenna 2C, the planar antennas on the front side arranged side by side in the determined direction shields the planar antennas on the back side.

When the length of power reception antenna 2D in the X-axis direction is set to be the same as the length of power reception antenna 2C in the X-axis direction, $L_5 = (2/\sqrt{(3)})*L_4$ is satisfied. In power reception antenna 2D, the interval between the power reception surfaces being directed to each other is $\sqrt{(3)}*L_5$. When $L_5 = (2/\sqrt{(3)})*L_4$ is satisfied, $\sqrt{(3)}*L_5 = 2*L_4$ is obtained. That is, the interval between the power reception surfaces being directed to each other in power reception antenna 2D is twice the interval ($L_4$) in power reception antenna 2C.

Based on the positional relationship between power transmission antenna 6C and power reception antenna 2D, the amount of power transmission radio wave 5 that can be received by power reception antenna 2D is studied. For ease of calculation, the following is assumed.

(A) For power reception antenna 2D, power transmission radio wave 5 is radiated from the direction parallel to the XZ-plane.

(B) Power transmission radio wave 5 is radiated parallel to the direction having elevation angle $\zeta$ on the XZ-plane.

The effective opening area considering the shielding in power reception antenna 2D is represented by a variable $A_{r5a}$. The projection effective opening area of power reception antenna 2D is represented by a variable $A_{r5b}$.

When elevation angle $\zeta$ is determined, effective opening area $A_{ra}$ of power reception antenna 2D can be calculated as follows.

when $\zeta \leq \tan^{-1}(H_5/(\sqrt{(3)}*L_5))$, $$A_{r5a} = (7*H_5 + 8*\sqrt{(3)}*L_5*\tan\zeta)*L_5 \tag{31-1}$$

when $\tan^{-1}(H_5/(\sqrt{(3)}*L_5)) \leq \zeta$, $$A_{r5a} = (19 - 4*(H_5/(\sqrt{(3)}*L_5*\tan\zeta))*H_5*L_5 \tag{31-2}$$

When elevation angle $\zeta$ is determined, projection effective opening area $A_{r5b}$ of power reception antenna 2D can be calculated as follows.

when $\zeta \leq \tan^{-1}(H_5/(\sqrt{(3)}*L_5))$, $$A_{r5b} = (5*H_5*\cos\zeta + 6*\sqrt{(3)}*L_5*\sin\zeta)*L_5 \tag{32-1}$$

when $\tan^{-1}(H_5/(\sqrt{(3)}*L_5)) \leq \zeta$, $$A_{r5b} = (13 - 2*(H_5/(\sqrt{(3)}*L_5*\tan\zeta))*H_5*L_5*\cos\zeta \tag{32-2}$$

When $A_{r5b}$ is divided by $19*L_5*H_5$ and normalized, the following is obtained.

when $\zeta \leq \tan^{-1}(H_5/(\sqrt{(3)}*L_5))$, $$A_{r5b} = (5/19)*\cos\zeta + (6\sqrt{(3)}/19)*(L_5/H_5)*\sin\zeta \tag{33-1}$$

when $\tan^{-1}(H_5/(\sqrt{(3)}*L_5)) \leq \zeta$, $$A_{r5b} = (13/19)*\cos\zeta - (2/(19\sqrt{(3)}))*(H_5/L_5)*(\cos\zeta/\tan\zeta) \tag{33-2}$$

As another case, the case where the following is assumed is also studied.

(C) With respect to power reception antenna 2D, power transmission radio wave 5 is radiated from the direction parallel to the plane including the Z-axis and the straight line existing on the XY-plane and forming the angle of 30 degrees with respect to the Y-axis (oblique YZ-plane).

(D) Power transmission radio wave 5 is radiated parallel to the direction having elevation angle $\zeta$ in the oblique YZ-plane.

The effective opening area of power reception antenna 2D when the above (C) and (D) are satisfied is represented by a variable $A_{r5c}$. The projection effective opening area is represented by a variable $A_{r5d}$.

When elevation angle $\zeta$ is determined, effective opening area $A_{r5c}$ can be calculated as follows.

when $\zeta \leq \tan^{-1}(H_5/(2*L_5))$, $$A_{r5c} = (5*H_5 + 8*L_5*\tan\zeta)*L_5 \tag{34-1}$$

when $\tan^{-1}(H_5/(2*L_5)) \leq \zeta$, $$A_{r5c} = (13*L_5 - 2*H_5/\tan\zeta)*H_5 \tag{34-2}$$

The following relationship exists between projection effective opening area $A_{r5d}$ and effective opening area $A_{r5c}$.

$$A_{r5d} = A_{r5c} * (\sqrt{(3)}/2) * \cos\zeta \tag{35}$$

The following equation is obtained by substituting the equation (35) into the equations (34-1), (34-2).

when $\zeta \leq \tan^{-1}(H_5/(2*L_5))$, $$A_{r5d} = (\sqrt{(3)}/2)*(5*H_5*\cos\zeta + 8*L_5*\sin\zeta)*L_5 \tag{36-1}$$

when $\tan^{-1}(H_5/(2*L_5)) \leq \zeta$, $$A_{r5d} = (\sqrt{(3)}/2)*(13*L_5 - 2*H_5/\tan\zeta)*H_5*\cos\zeta \tag{36-2}$$

When $A_{r5d}$ is divided by $19*L_5*H_5$ and normalized, the following is obtained.

when $\zeta \leq \tan^{-1}(H_5/(2*L_5))$, $$A_{r5d} = (\sqrt{(3)}/38)*(5*\cos\zeta + 8*(L_5/H_5)*\sin\zeta) \tag{37-1}$$

when $\tan^{-1}(H_5/(2*L_5))$, $$A_{r5d} = (\sqrt{(3)}/38)*(13 - 2*H_5/(L_5*\tan\zeta))*\cos\zeta \tag{37-2}$$

Figure 42:
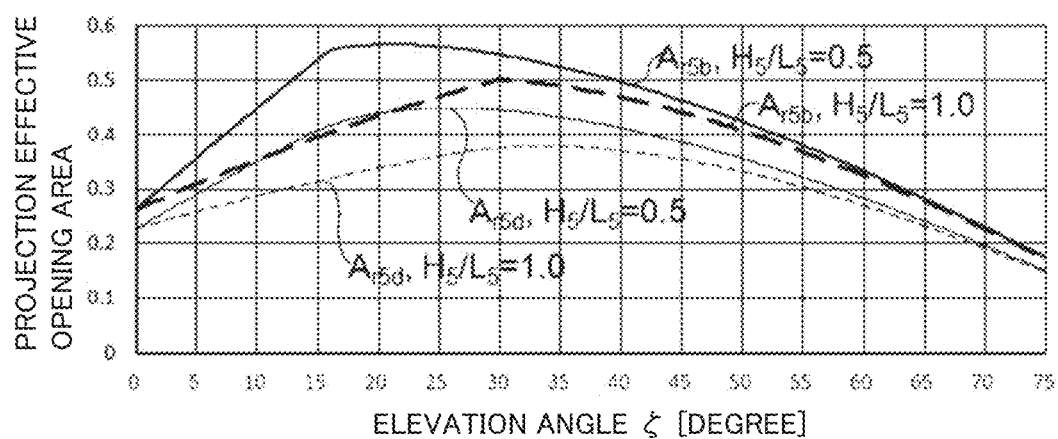
FIG. 42 is a graph illustrating a change in a projection effective opening area with respect to a change in an elevation angle in a power reception antenna of the aerial moving body to which the power is transmitted by the power transmission system to the aerial moving body according to the fifth embodiment.
Figure 43:
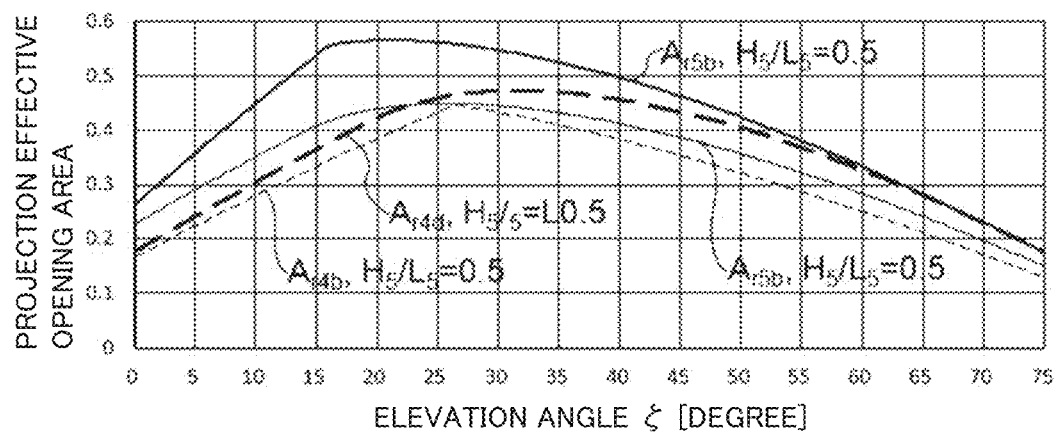
FIG. 43 is a graph illustrating the change in the projection effective opening area with respect to the change in the elevation angle in the power reception antenna of the aerial moving body to which the power is transmitted by the power transmission system to the aerial moving body according to the fifth embodiment, in comparison with the power reception antenna of the fourth embodiment.

FIG. 42 is a graph illustrating the change in the projection effective opening area with respect to the change in elevation angle $\zeta$ in power reception antenna 2D. FIG. 42 illustrates $A_{r5b}$ and $A_{r5d}$ in the case where $H_5/L_5 = 0.5$ is satisfied and the case where $H_5/L_5 = 1.0$ is satisfied. In FIG. 43, in the case where $H_5/L_5 = 0.5$ is satisfied, the changes in projection effective opening areas $A_{r5b}$ and $A_{r5d}$ with respect to changes in elevation angle (in power reception antenna 2D are illustrated together with the changes in projection effective opening areas $A_{r4b}$ and $A_{r4d}$ with respect to the changes in elevation angle $\zeta$ in power reception antenna 2C. In the case where $H_5/L_5 = 0.5$ is satisfied, $A_{r5b}$ is indicated by the thick solid line, and $A_{r5d}$ is indicated by the thin solid line. In FIG. 42, $A_{r5b}$ in the case where $H_5/L_5 = 1.0$ is satisfied is indicated by the thick alternate long and short dash line, and $A_{r5d}$ is indicated by the thin alternate long and short dash line. In FIG. 43, $A_{r4b}$ in the case where $H_4/L_4 = 0.5$ is satisfied is indicated by the thick alternate long and short dash line, and $A_{r4d}$ is indicated by the thin alternate long and short dash line.

As can be seen from FIG. 42, in power reception antenna 2D, assuming that the opening area ($H_5*L_5$) of the unit planar antenna is the same, the projection effective opening area is increased even in power reception antenna 2D when the ratio of $H_5/L_5$ is small. With reference to FIG. 43, power reception antenna 2D can have the larger projection effective opening area than that of power reception antenna 2C. The reason is that the angle between the adjacent planar antennas is 120 degrees in power reception antenna 2D, which is larger than 90 degrees in the case of power reception antenna 2C, and the number of opening surfaces that can receive power transmission radio wave 5 increases, when power transmission radio wave 5 is radiated from any angle. In addition, the interval between the planar antennas being directed to each other is $\sqrt{(3)}*L_5$ in power reception antenna 2D, and is larger than $L_4$ in the case of the power reception antenna 2C. When the length of power reception antenna 2D in the X-axis direction is the same as that of power reception antenna 2C, $\sqrt{(3)}*L_5=2L_4$ is satisfied, and the interval is doubled in power reception antenna 2D. For this reason, in power reception antenna 2D, the influence of the shielding at the same elevation angle (is smaller than that of power reception antenna 2C.

Wireless power transmission system 100D operates similarly to wireless power transmission system 100C. Power reception antenna 2D has the opening surfaces being directed to six types of directions forming the angle of 60 degrees with respect to adjacent opening surfaces. Accordingly, even when the positional relationship between power transmission antenna 6C and power reception antenna 2D changes, power reception antenna 2D can receive more power transmission radio wave 5 than power reception antenna 2C.

Power reception antenna 2D includes only the planar antenna constituting the honeycomb structure. The power reception antenna may include the planar antenna that does not form the honeycomb structure. The honeycomb structure may be formed of the hexagonal tube in which the section is not a regular hexagon. In the hexagon of the section, there may be sides having different lengths, or an internal angle having the angle different from 120 degrees. The power reception antenna, in which the board or the like is disposed in a portion of the honeycomb structure and the linear antenna is provided below the board, may be used instead of the planar antenna. The power reception antenna may have a part constituting the honeycomb structure.

Sixth Embodiment

Figure 48:
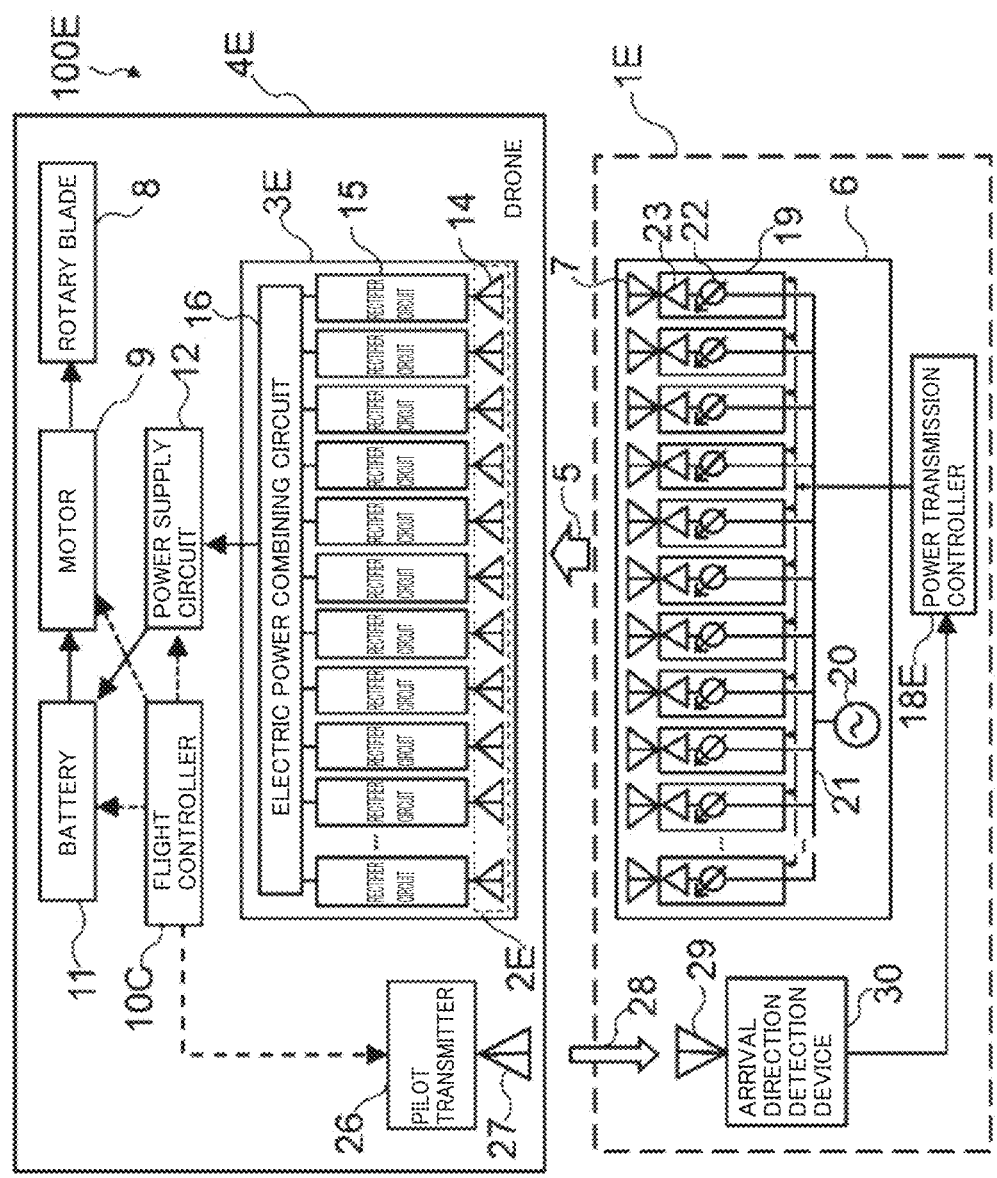
FIG. 48 is a block diagram illustrating a functional configuration of the power transmission system to the aerial moving body according to the sixth embodiment.

A sixth embodiment is a case where the power is transmitted from the plurality of power transmission devices including the power transmission antenna having the opening surface substantially parallel to the vertical direction to the aerial moving body including the power reception antenna having the opening surface substantially parallel to the vertical direction. With reference to FIGS. 44 to 48, a configuration of a power transmission system to an aerial moving body according to the sixth embodiment is described. FIGS. 44 to 47 are a perspective view, a front view, a side view, and a plan view illustrating the configuration of the power transmission system to the aerial moving body according to the sixth embodiment. FIG. 48 is a block diagram illustrating a functional configuration of the power transmission system to the aerial moving body according to the sixth embodiment.

A wireless power transmission system 100E includes mainly a plurality of power transmission devices 1E and a drone 4E. A power reception device 3E including a power reception antenna 2E is mounted on drone 4E. FIGS. 44 to 47 illustrate the case where power reception antenna 2E and power transmission antenna 6E are at substantially the same altitude, the opening surface is parallel to the YZ-plane, and power transmission antenna 6E is located on the positive side in the Y-axis direction with respect to power reception antenna 2E.

Power reception antenna 2E is disposed such that the opening surface of power reception antenna 2E is substantially parallel to the vertical direction. The vertical direction is the direction parallel to the rotation axis direction of rotary blade 8 of drone 4E. The opening surface of power reception antenna 2E is directed to the substantially horizontal direction. Power reception antenna 2E can receive power transmission radio wave 5 radiated in the substantially horizontal direction efficiently. Descending airflow 17 generated by rotary blades 8 flows on both of the opening surface side and the rear surface side of power reception antenna 2E. Power reception antenna 2E generates almost no drag against descending airflow 17. In power reception antenna 2E, a structure in which the opening surface is provided substantially parallel to the rotation axis direction is the drag reduction structure.

Power transmission device 1E includes a power transmission antenna 6E including the opening surface disposed substantially parallel to the vertical direction. Power transmission antenna 6E is installed such that the angle difference between the front direction of the opening surface and the horizontal direction is less than or equal to a predetermined upper limit value. The plurality of power transmission devices 1E are arranged to have determined intervals and to be located at the altitude where power reception antenna 2E is present when drone 4E flies. The plurality of power transmission devices 1E are arranged at predetermined intervals such that power can be transmitted continuously even when drone 4E moves. One power transmission device 1E and one drone 4E including power reception antenna 2E can constitute the wireless power transmission system.

Drone 4E flies in such a posture that power reception antenna 2E is directed to power transmission antenna 6E. Drone 4E flies on a flight path or hovers in the air. The flight path has the distance being set to power transmission distance D from power transmission antenna 6E. The plurality of power transmission devices 1E are arranged such that power can be transmitted from any of power transmission devices 1E to drone 4E even when drone 4E is present at any position on the flight route.

Power reception antenna 2E has a rectangular outer shape. Power reception antenna 2E is configured by arranging vertically long strip-shaped planar antennas at predetermined intervals. Accordingly, even when the strong wind blows, the force that power reception antenna 2E receives from the wind can be reduced. Drone 4E can fly or hover more easily even under a windy condition. Power reception antenna 2E may have an opening shorter than the height of power reception antenna 2E. The power reception antenna may have a ventilation structure that allows air to pass through the power reception surface and the rear surface.

Drone 4E includes a pilot transmitter 26 and a pilot transmission antenna 27. Pilot transmitter 26 generates a pilot signal 28 instructing the radiation direction to power transmission device 1E. Pilot transmission antenna 27 radiates pilot signal 28 in a range of an angle determined with respect to the front direction of planar antenna 2E.

Figure 44:
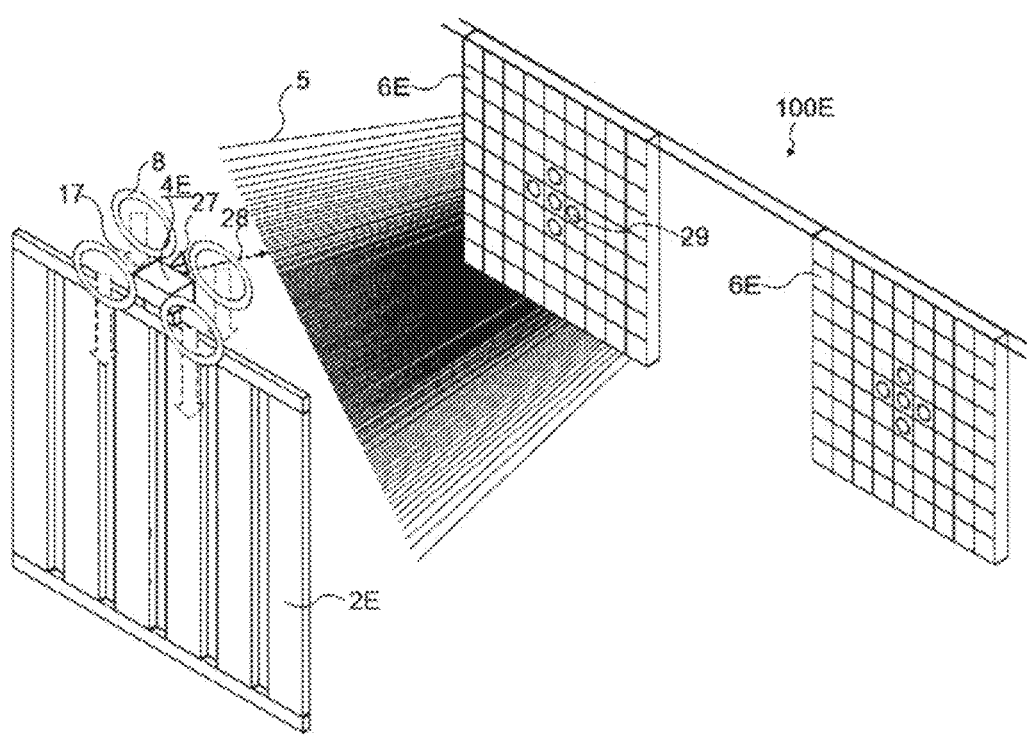
FIG. 44 is a perspective view illustrating a configuration of a power transmission system to an aerial moving body according to a sixth embodiment.
Figure 45:
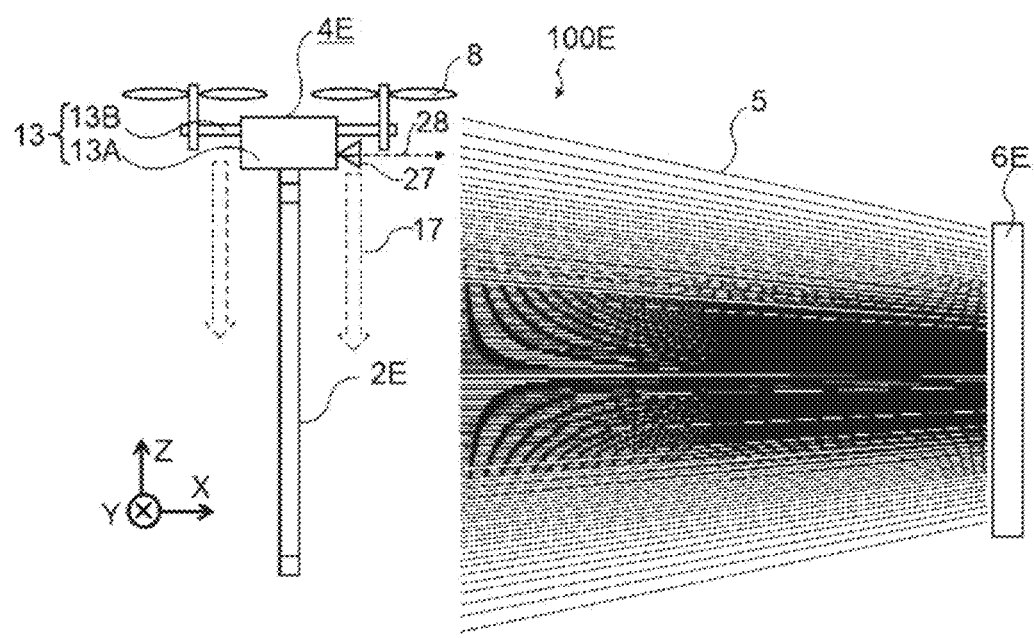
FIG. 45 is a front view illustrating the configuration of the power transmission system to the aerial moving body according to the sixth embodiment.
Figure 46:
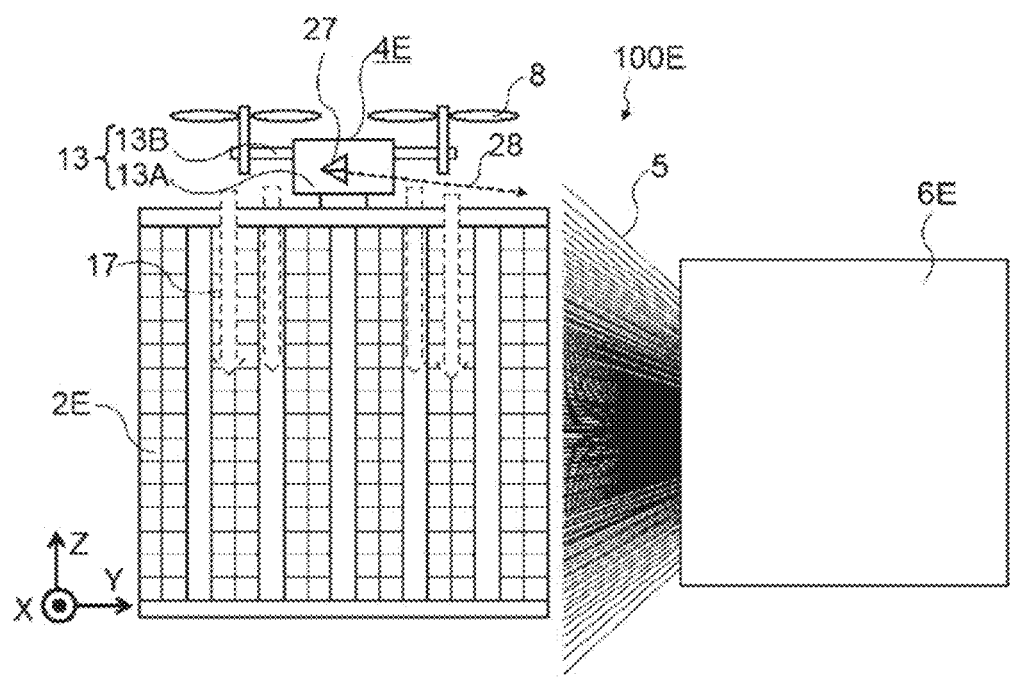
FIG. 46 is a side view illustrating the configuration of the power transmission system to the aerial moving body according to the sixth embodiment.
Figure 47:
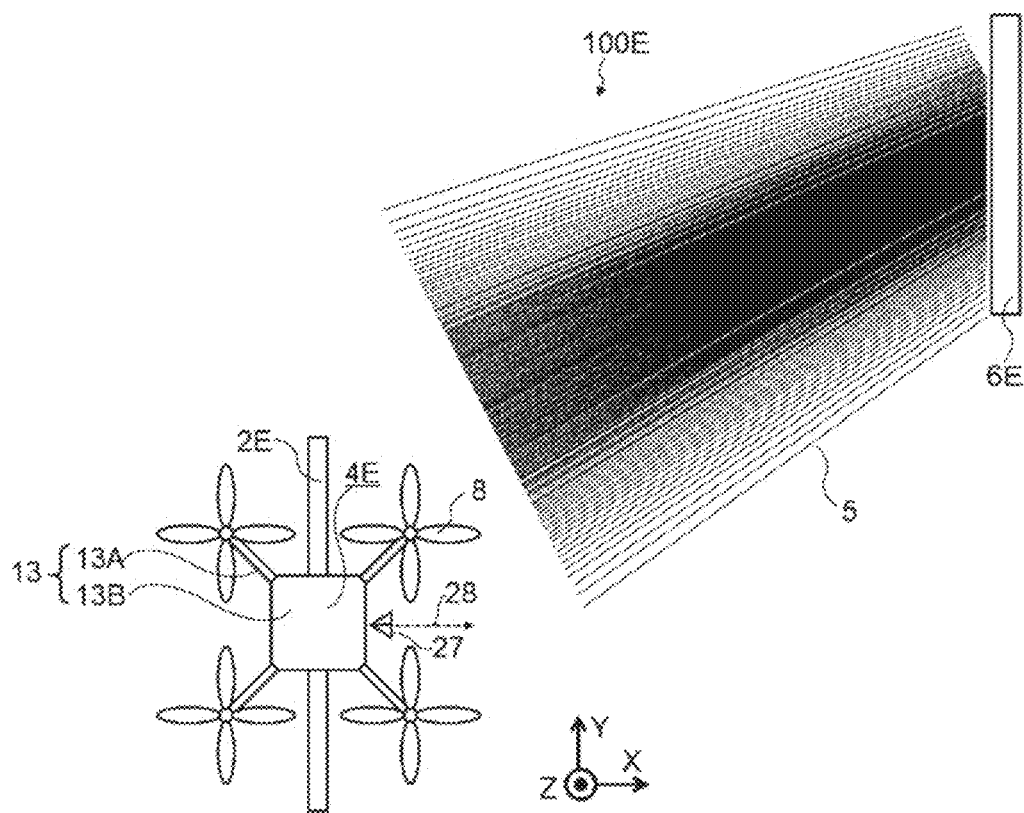
FIG. 47 is a plan view illustrating the configuration of the power transmission system to the aerial moving body according to the sixth embodiment.

Power transmission device 1E includes a power transmission antenna 6E, a power transmission controller 18E, a pilot reception antenna 29, and an arrival direction detection device 30. Pilot reception antenna 29 receives pilot signal 28. For example, as illustrated in FIG. 44, pilot reception antenna 29 is disposed in a central portion of element power transmission antenna 7 disposed in a matrix shape in power transmission device 1E. Arrival direction detection device 30 receives pilot signal 28 received by pilot reception antenna 29, and determines the arrival direction of pilot signal 28 by, for example, a monopulse method. The arrival direction is a direction in which pilot signal 28 arrives when viewed from power transmission device 1E. The direction toward the arrival direction is a direction (existence direction) in which power reception antenna 2E exists when viewed from power transmission antenna 6E. Arrival direction data detected by arrival direction detection device 30 is inputted to power transmission controller 18E. Power transmission controller 18E is an existence direction determiner that determines the existence direction from the arrival direction data. Power transmission controller 18E controls each element module 19 such that power transmission antenna 6E can transmit power transmission radio wave 5 toward the existence direction.

Figure 49:
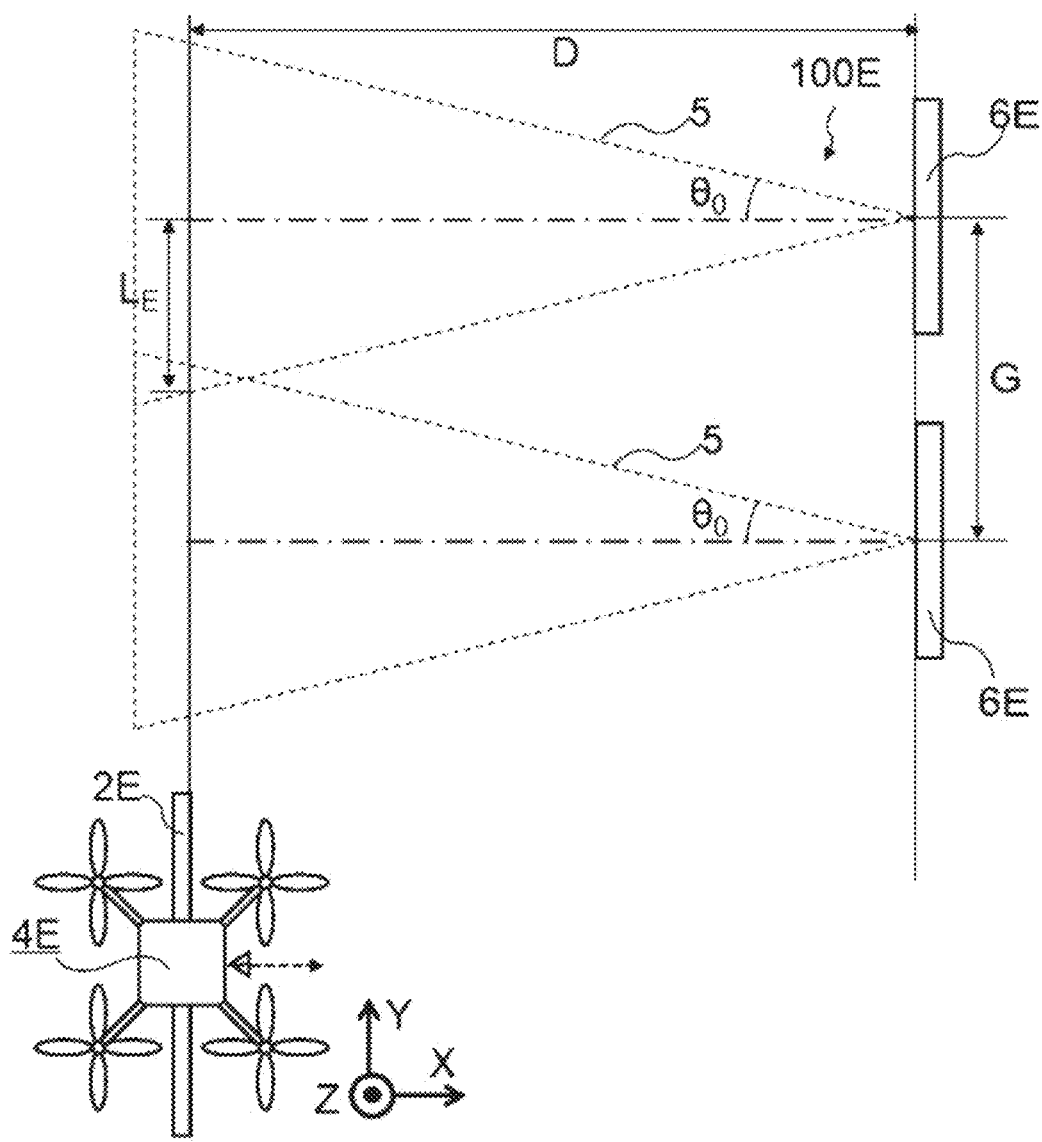
FIG. 49 is a schematic diagram considering an installation interval of the power transmission devices used in the power transmission system to the aerial moving body according to the sixth embodiment.

Power transmission device 1E can change the radiation direction of power transmission radio wave 5 to angle $\theta_0$ with respect to the front direction of power transmission antenna 6E. The range including the front direction and capable of changing the orientation direction is referred to as a direction range of power transmission device 1E. The direction range of power transmission device 1E is determined in advance. With reference to FIG. 49, an installation interval G of power transmission device 1E is studied. The plurality of power transmission devices 1E are installed at intervals G such that power transmission antennas 6E exist at the same altitude and on the same plane. Drone 4E moves such that power reception antenna 2E is located at the same altitude as power transmission antenna 6E while maintaining distance D with respect to the plane where the plurality of power transmission antennas 6E exist. A radius of a range (referred to as a power transmittable range) in which power transmission device 1E can transmit the power in a plane (referred to as an assumed power reception plane) at distance D parallel to the opening surface of power transmission antenna 6E is represented by a variable $L_E$. Radius $L_E$ can be calculated by the following equation.

$$L_E = D * \tan \theta_0 \tag{38}$$

The power transmittable range is a range in which the directional range of power transmission antenna 6E having conical shape intersects with the assumed power reception plane.

When there is a part where the power-transmittable ranges in the assumed power reception planes of adjacent power transmission devices 1E overlap with each other, the power reception space, which is a space including the assumed power reception plane and having a predetermined distance from power transmission device 1E, is a continuous space. That is, power transmission device 1E is disposed such that the power reception spaces of power transmission devices 1E arranged adjacent to each other have the overlapping part. Here, the power reception space is a space within a range of a determined distance from power transmission device 1E and is a space included in a direction range of power transmission device 1E. When drone 4E is present at any position in the power reception space, power reception device 3E can receive power transmission radio wave 5 from power transmission device 1E.

Conditions therefor are as follows.

$$G \leq 2 * L_E \tag{39}$$

Substituting the equation (38) into an expression (39) obtains the following result.

$$G \leq 2 * D * \tan \theta_0 \tag{40}$$

In the case where distance D=100 m and $\theta_0$=10 degrees are satisfied, interval G≤35.3 m is obtained. Even when the installation heights of adjacent power transmission antennas 6E are different, regarding the intersection point of the front direction of power transmission antenna 6E and the assumed power reception plane, an interval G between the intersection points of adjacent power transmission antennas 6E is required to satisfy the expression (40). Accordingly, the power-transmittable ranges of adjacent power transmission devices 1E have overlapping part overlapped with each other on the assumed power reception plane having distance D in the front direction of power transmission device 1E. At a position where the direction of the route on which drone 4E moves is changed, power transmission antennas 6E having different front directions may be arranged at intervals G in consideration of the difference in the front direction.

Figure 50:
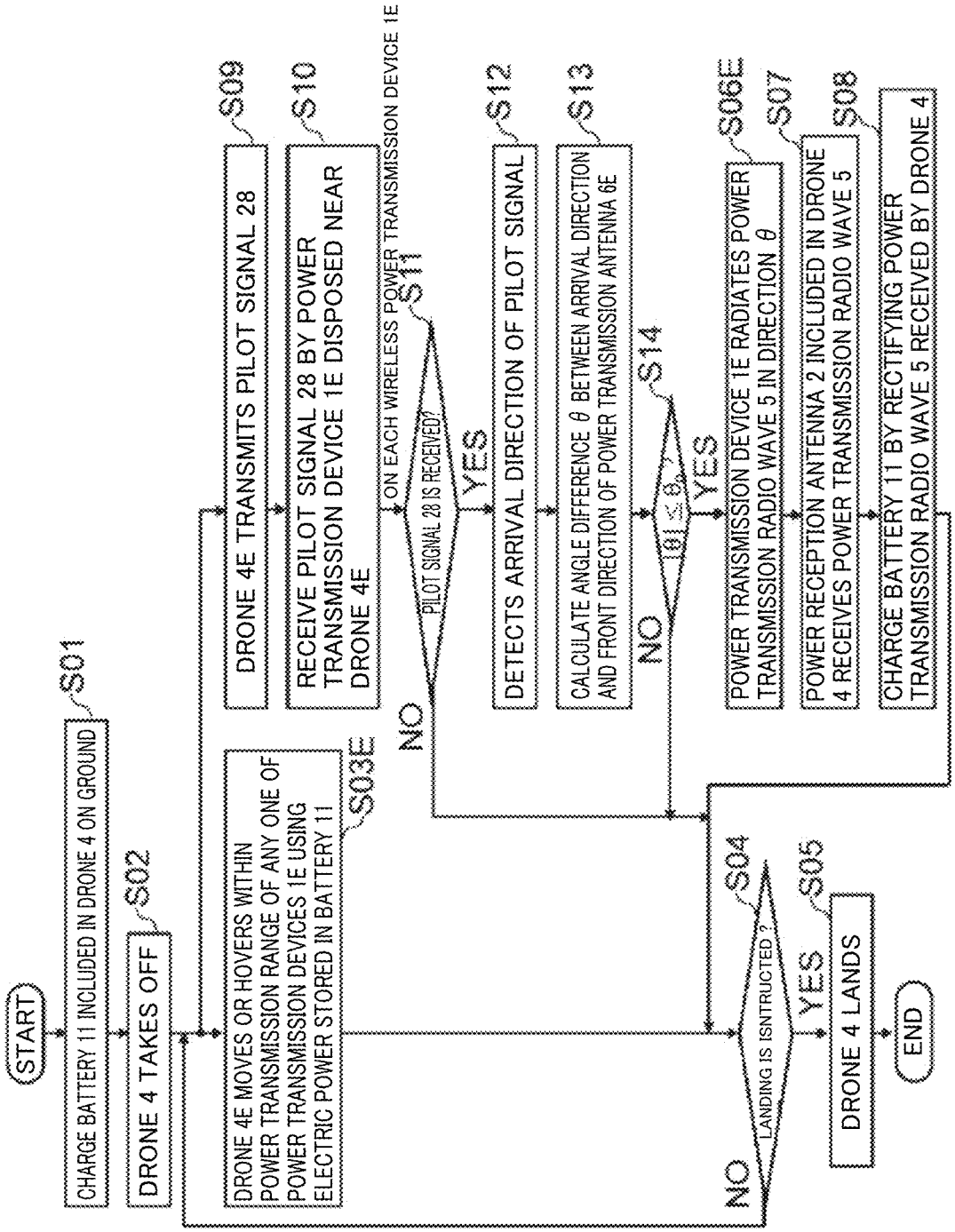
FIG. 50 is a flowchart illustrating a procedure for transmitting the power wirelessly to the aerial moving body by the power transmission system to the aerial moving body according to the sixth embodiment.

The operation is described. FIG. 50 is a flowchart illustrating a procedure for transmitting the power wirelessly to the aerial moving body according to the sixth embodiment. In FIG. 50, points different from FIG. 9 in the case of power transmission system 100 is described.

In step S03E, drone 4E moves or hovers within the power transmission range of any of power transmission devices 1E.

The pieces of processing in steps S09 to S14 are added before S06E. At S09, drone 4E transmits pilot signal 28. The pieces of processing of steps S10 to S06E is executed in each power transmission device 1E. In S10, pilot reception antenna 29 included in power transmission device 1E disposed near drone 4E receives pilot signal 28. In step S11, it is checked whether each power transmission device 1E receives pilot signal 28. When power transmission device 1E receives pilot signal 28 (YES in S11), arrival direction detection device 30 detects the arrival direction of pilot signal 28 in step S12. In step S13, an angular difference $\theta$ between the arrival direction and the front direction of power transmission antenna 6E is calculated. In step S14, whether $|\theta| \leq \theta_0$ is satisfied or not is checked.

When $|\theta| \leq \theta_0$ is satisfied (YES in S14), power transmission device 1E controls the phase of power transmission radio wave 5 to radiate power transmission radio wave 5 in the direction of $\theta$ in step S06E. In S07, power reception antenna 2E included in drone 4E receives power transmission radio wave 5. In S08, power transmission radio wave 5 received by drone 4 is rectified and charge battery 11 is charged. After S08, the processing proceeds to S04. When YES in S11 and when YES in S14, the processing proceeds to S04.

Drone 4E includes power reception antenna 2E having the opening area larger than the conventional one. When the electric power to be received by drone 4E is larger than the electric power to be consumed, drone 4E can fly until the required work is completed no matter how long the time is taken. Even in the case where the electric power to be consumed is larger than the electric power to be received, drone 4E can have a longer continuous flight time than in the case where the wireless power transmission is not performed during the flight.

The plurality of power transmission devices 1E are arranged such that the power reception space is continuous, so that drone 4E can move the power reception space of any of power reception devices 1E or can hover in the power reception space. The drone can move in a wider range than the case where the power is transmitted from one power transmission device. There may be a portion that is not continuous in the power reception spaces of the plurality of power transmission devices 1E. Each of the power reception spaces of the plurality of power transmission devices may be separated. When each of the power reception spaces of the plurality of power transmission devices is separated, the plurality of power transmission devices may be arranged such that the power reception space of any of power transmission devices 1E is present at a distance where the aerial moving body in which the remaining amount of the battery is low can fly. When going out of the power reception space of wireless power transmission device 1E, drone 4E flies such that the power reception space exists within the flying distance using the remaining amount of the battery. When the work outside the power reception space of wireless power transmission device 1E is finished, or when the battery needs to be charged, drone 4E moves to the power reception space to receive the power transmission radio wave.

The existence direction may be obtained by a method different from the pilot signal. For example, a GPS receiver or the like measuring the position of the aerial moving body may be mounted, and the position of the aerial moving body may be sent to the power transmission device. Alternatively, a position measurement device that measures the position of the aerial moving body may be installed on the ground. The existence direction in which the aerial moving body is present as viewed from the power transmission device may be determined based on the position of the aerial moving body sent from the aerial moving body or the position measuring device on the ground and the position of the power transmission device.

A free combination of the embodiments, a modification of the embodiments, omission of some components, or a free combination of the embodiments in which some components are omitted or modified can be made.

REFERENCE SIGNS LIST 100, 100A, 100B, 100C, 100D, 100E: power transmission system, 1, 1C, 1E: power transmission device (wireless power transmission device), 2, 2A, 2B, 2C, 2C1, 2C2, 2D, 2E, 2F: power reception antenna, 3, 3A, 3B, 3C, 3D, 3E, 3F: power reception device, 4, 4A, 4B, 4C, 4C1, 4D, 4D1, 4F: drone (aerial moving body), 4E: drone (aerial moving body), 4X: Unmanned vehicle (aerial moving body), 5: power transmission radio wave (radio wave), 6, 6C, 6E: power transmission antenna, 7: element power transmission antenna (element antenna), 8: rotary blade, 9: motor (electric motor), 10: flight controller, 11: battery (storage battery), 12: power supply circuit, 13: airframe, 13A: main body, 13B: wing support, 14: element power reception antenna, 15: rectifier circuit (converter), 16: electric power combining circuit, 17: descending airflow, 18, 18C, 18E: power transmission controller (existence direction determiner), 19: element module, 19P: single-stage element module (element module), 19S: two-stage element module (element module), 20: transmission signal generator, 21: distribution circuit, 22: phase shifter, 23: amplifier, 24: rotary mount, 25: power transmission unit, 26: pilot transmitter, 27: pilot transmission antenna, 28: pilot signal, 29: pilot reception antenna, 30: arrival direction detection device, 31: board, δ: angle formed by opening surface of power reception antenna and rotation axis perpendicular plane, ζ: elevation angle in direction in which power transmission radio wave 5 is radiated, $\theta_0$: radiation direction of power transmission radio wave 5 with respect to front direction of power transmission antenna 6E, V: airframe projection range, R: rotary blade projection range, S: rotary blade projection region, $W_1$: power reception surface projection range of power reception antenna 2, $W_X$: power reception surface projection range of power reception antenna 2X, $W_2$: power reception surface projection range of power reception antenna 2A, $W_3$: power reception surface projection range of power reception antenna 2B, $K_1$: interference region of power reception antenna 2, $K_X$: interference region of power reception antenna 2X, $K_2$: interference region of power reception antenna 2A, $K_3$: interference region of power reception antenna 2B, Av: area of airframe projection range V (airframe projection area), As: area of rotary blade projection region S (rotary blade projection area), $Aw_1$: area of power reception surface projection range $W_1$ (power reception surface projection area), $Aw_X$: area of power reception surface projection range $W_X$ (power reception surface projection area), $Aw_2$: area of power reception surface projection range $W_2$ (power reception surface projection area), $Aw_3$: area of power reception surface projection range $W_3$ (power reception surface projection area), $A_{r1}$: area of opening surface of power reception antenna 2 (power reception area), $A_{r2}$: area of opening surface of power reception antenna 2A (power reception area), $A_{r3}$: area of opening surface of power reception antenna 2B (power reception area), $A_{r4}$: area of opening surface of power reception antenna 2C (power reception area), $A_{r5}$: area of opening surface of power reception antenna 2D (power reception area), $A_{r41}$: effective maximum opening area of power reception antenna 2C, $A_{r51}$: effective maximum opening area of power reception antenna 2D, $A_{r4a}$: effective opening area of power reception antenna 2C, $A_{r5a}$: effective opening area of power reception antenna 2D, $A_{r4b}$: projection effective opening area of power reception antenna 2C, $A_{r5b}$: projection effective opening area of power reception antenna 2D, $A_{r4c}$: effective opening area of power reception antenna 2C, $A_{r5c}$: effective opening area of power reception antenna 2D, $A_{r4d}$: projection effective opening area of power reception antenna 2C, $A_{r5d}$: projection effective opening area of power reception antenna 2D, $B_1$: area of interference region $K_1$ (interference area), $B_X$: area of interference region $K_X$ (interference area), $B_2$: area of interference region $K_2$ (interference area), $B_3$: area of interference region $K_3$ (interference area), $F_1$: drag caused by descending airflow 17 in power reception antenna 2, $F_X$: drag caused by descending airflow 17 in power reception antenna 2X, $F_2$: drag caused by descending airflow 17 in power reception antenna 2A, $F_3$: drag caused by descending airflow 17 in power reception antenna 2B, $F_{ALOW}$: upper limit of allowable drag F, $\xi_1$: drag generation coefficient in power reception antenna 2, $\xi_X$: drag generation coefficient in power reception antenna 2X, $\xi_2$: drag generation coefficient in power reception antenna 2A, $\xi_3$: drag generation coefficient in power reception antenna 2B

The invention claimed is:
1. An aerial moving body comprising:
a rotary blade to generate lift by rotating;
an airframe on which the rotary blade is provided;
a power reception antenna including a power reception surface to receive a radio wave transmitting electric power, the power reception surface having an area larger than an area projecting the airframe onto a rotation axis perpendicular plane, the rotation axis perpendicular plane being a plane perpendicular to a rotation axis direction, the rotation axis direction being a direction parallel to a rotation axis of the rotary blade, and a drag reducing structure to reduce a drag caused by a descending airflow generated by rotation of the rotary blade:
a converter to convert electric power of the radio wave received by the power reception antenna into DC electric power;
a storage battery to store the DC electric power; and
an electric motor to which the DC electric power converted by the converter or the DC electric power stored in the storage battery is supplied, and to generate power to rotate the rotary blade.

2. The aerial moving body according to claim 1, wherein the power reception surface is directed downward,
the power reception antenna includes a rear surface that is a surface opposite to the power reception surface, and
the drag reducing structure is a structure in which the rear surface is disposed not to be perpendicular to the descending airflow.

3. An aerial moving body comprising:
a rotary blade to generate lift by rotating;
an airframe on which the rotary blade is provided:
a power reception antenna including a power reception surface to receive a radio wave transmitting electric power, the power reception surface having an area larger than an area projecting the airframe onto a rotation axis perpendicular plane, the rotation axis perpendicular plane being a plane perpendicular to a rotation axis direction, the rotation axis direction being a direction parallel to a rotation axis of the rotary blade, and being provided to be directed downward, and a rear surface being opposite to the power reception surface and being disposed not to be perpendicular to a descending airflow generated by rotation of the rotary blade;
a converter to convert electric power of the radio wave received by the power reception antenna into DC electric power;
a storage battery to store the DC electric power; and
an electric motor to which the DC electric power converted by the converter or the DC electric power stored in the storage battery is supplied, and to generate power to rotate the rotary blade.

4. The aerial moving body according to claim 2, comprising a plurality of sets of the rotary blades disposed distributedly when viewed in the rotation axis direction,
wherein the rear surface is provided such that flow paths of the descending airflow generated by the rotary blades are disposed distributedly when viewed from the rotation axis direction.

5. The aerial moving body according to claim 2, wherein the power reception antenna is two planar antennas that are inclined in different directions and are disposed such that upper ends of the planar antennas are close to each other.

6. The aerial moving body according to claim 5, wherein the planar antenna includes the power reception surface and the rear surface that are substantially rectangular, and
the two planar antennas are arranged such that one sides of the two planar antennas are substantially perpendicular to the rotation axis direction and are parallel to each other.

7. The aerial moving body according to claim 2, wherein an outer shape of the power reception antenna is a conic solid or a frustum, and
the rear surface is a lateral surface of the conic solid or the frustum.

8. The aerial moving body according to claim 7, wherein the rear surface is a pyramidal surface.

9. The aerial moving body according to claim 7, wherein the rear surface is a conical surface.

10. The aerial moving body according to claim 7, wherein the power reception surface is disposed on a bottom surface of the conic solid or the frustum.

11. The aerial moving body according to claim 7, wherein the power reception surface is disposed on an opposite side surface of the lateral surface of the conic solid or the frustum.

12. The aerial moving body according to claim 2, wherein the power reception antenna has a ventilation structure to pass air through the power reception surface and the rear surface.

13. The aerial moving body according to claim 10, wherein the power reception antenna has a structure in which air passes through the rear surface.

14. The aerial moving body according to claim 1, wherein the drag reducing structure has a structure in which the power reception surface is provided substantially parallel to the rotation axis direction.

15. An aerial moving body comprising:
a rotary blade to generate lift by rotating;
an airframe on which the rotary blade is provided;
a power reception antenna including a power reception surface to receive a radio wave transmitting electric power, the power reception surface having an area larger than an area projecting the airframe onto a rotation axis perpendicular plane, the rotation axis perpendicular plane being a plane perpendicular to a rotation axis direction, the rotation axis direction being a direction parallel to a rotation axis of the rotary blade, and being provided substantially parallel to hg rotation axis direction;
a converter to convert the electric power of the radio wave received by the power reception antenna into DC electric power;
a storage battery to store the DC electric power; and
an electric motor to which the DC electric power converted by the converter or the DC electric power stored in the storage battery is supplied, and to generate power to rotate the rotary blade.

16. The aerial moving body according to claim 15, wherein the power reception antenna has a ventilation structure to pass air through the power reception surface and a rear surface being a surface opposite to the power reception surface.

17. The aerial moving body according to claim 15, wherein the power reception antenna includes; a first front direction power reception surface being the power reception surface being directed to a first front direction in the rotation axis perpendicular plane, and a second front direction power reception surface being the power reception surface being directed to a second front direction intersecting with the first front direction in the rotation axis perpendicular plane.

18. The aerial moving body according to claim 17, wherein the power reception antenna includes a plurality of the first front direction power reception surfaces provided such that at least a part of each of the plurality of the first front direction power reception surfaces overlaps each other when viewed from the first front direction and a plurality of the second front direction power reception surfaces provided such that at least a part of each of the plurality of the second front direction power reception surfaces overlaps each other when viewed from the second front direction.

19. The aerial moving body according to claim 17, wherein the power reception antenna includes; a first back direction power reception surface being the power reception surface being provided on a surface opposite to the first front direction power reception surface and directed to a first back direction being a direction opposite to the first front direction, and a second back direction power reception surface being the power reception surface being provided on a surface opposite to the second front direction power reception surface and directed to a second back direction being a direction opposite to the second front direction.

20. The aerial moving body according to claim 15, wherein the power reception antenna includes; a first front direction power reception surface being the power reception surface directed to a first front direction in the rotation axis perpendicular plane, a second front direction power reception surface being the power reception surface directed to a second front direction intersecting with the first front direction in the rotation axis perpendicular plane and being adjacent to the first front direction power reception surface, and a third front direction power reception surface being the power reception surface directed to a third front direction intersecting with the first front direction in the rotation axis perpendicular plane and being adjacent to the first front direction power reception surface on a side opposite to a side where the first front direction power reception surface and the second front direction power reception surface are adjacent to each other.

21. The aerial moving body according to claim 20, wherein the power reception antenna includes; a first back direction power reception surface being the power reception surface being provided on a surface opposite to the first front direction power reception surface and directed to a first back direction being a direction opposite to the first front direction, a second back direction power reception surface being the power reception surface provided on a surface opposite to the second front direction power reception surface and directed to a second back direction being a direction opposite to the second front direction, and a third back direction power reception surface being the power reception surface provided on a surface opposite to the third front direction power reception surface and directed to a third back direction being a direction opposite to the third front direction.

22. The aerial moving body according to claim 20, wherein the power reception antenna includes; a plurality of the first front direction power reception surfaces provided such that at least a part of each of the plurality of the first front direction power reception surfaces overlaps each other when viewed from the first front direction, a plurality of the second front direction power reception surfaces provided such that at least a part of each of the plurality of the second front direction power reception surfaces overlaps each other when viewed from the second front direction, and a plurality of the third front direction power reception surfaces provided such that at least a part of each of the plurality of the third front direction power reception surfaces overlaps each other when viewed from the third front direction.

23. The aerial moving body according to claim 22, wherein the power reception antenna includes a part forming a honeycomb structure when viewed from the rotation axis direction.

24. A power transmission system to an aerial moving body, the power transmission system comprising:
the aerial moving body according to claim 1; and
a power transmission device including a power transmission antenna capable of changing an orientation direction and an orientation direction changer that directs the orientation direction to an existence direction being a direction in which the power reception antenna exists.

25. A wireless power transmission system comprising:
an aerial moving body including; a rotary blade to generate lift by rotating, an airframe on which the rotary blade is provided, a power reception antenna to receive a radio wave, the power reception antenna including a power reception surface having an area larger than an area projecting the airframe onto a rotation axis perpendicular plane, the rotation axis perpendicular plane being a plane perpendicular to a rotation axis direction, the rotation axis direction being a direction parallel to a rotation axis of the rotary blade, and being provided substantially parallel to the rotation axis direction a converter to convert electric power of the radio wave received by the power reception antenna into DC electric power, a storage battery to store the DC electric power, and an electric motor to which the DC electric power converted by the converter or the DC electric power stored in the storage battery is supplied and to generate power to rotate the rotary blade; and
a wireless power transmission device including; a power transmission antenna being a phased array antenna including a plurality of element antennas to radiate the radio wave to transmit electric power and being directed to a reference orientation direction in which an angular difference from a horizontal direction is less than or equal to a determined upper limit value and a plurality of element modules being provided for each of a predetermined number of the element antennas, each of the plurality of element modules including a phase shifter to change a phase of a transmission signal radiated as the radio wave from the element antenna and an amplifier to amplify the transmission signal, the power transmission antenna being capable of changing an orientation direction within a determined direction range including the reference orientation direction, an existence direction determiner to determine an existence direction being a direction in which the aerial moving body being a power transmission target exists, an orientation direction changer to control a phase shift amount of the phase shifter to direct the orientation direction of the power transmission antenna toward the existence direction, and a transmission signal generator to generate a transmission signal transmitted as the radio wave from the power transmission antenna.

26. The wireless power transmission system according to claim 25, further comprising a plurality of the wireless power transmission devices arranged at predetermined intervals.

27. The wireless power transmission system according to claim 26, wherein a plurality of the wireless power transmission devices are disposed such that a power reception space being a space within a range of a determined distance from the wireless power transmission device and being a space included in the direction range of the wireless power transmission device, includes an overlapping part in the wireless power transmission devices disposed adjacent to each other.

\* \* \* \* \*